US009350550B2

(12) United States Patent
Nix

(10) Patent No.: US 9,350,550 B2
(45) Date of Patent: May 24, 2016

(54) POWER MANAGEMENT AND SECURITY FOR WIRELESS MODULES IN "MACHINE-TO-MACHINE" COMMUNICATIONS

(71) Applicant: John A. Nix, Evanston, IL (US)

(72) Inventor: John A. Nix, Evanston, IL (US)

(73) Assignee: M2M and IoT Technologies, LLC, Evanston, IL (US)

( * ) Notice: Subject to any disclaimer, the term of this patent is extended or adjusted under 35 U.S.C. 154(b) by 247 days.

(21) Appl. No.: 14/023,181

(22) Filed: Sep. 10, 2013

(65) Prior Publication Data

US 2015/0071139 A1    Mar. 12, 2015

(51) Int. Cl.
*H04L 9/28*    (2006.01)
*H04L 9/08*    (2006.01)
(Continued)

(52) U.S. Cl.
CPC .............. *H04L 9/3247* (2013.01); *G06F 21/35* (2013.01); *H04L 9/006* (2013.01); *H04L 9/085* (2013.01); *H04L 9/0816* (2013.01); *H04L 9/0861* (2013.01); *H04L 9/0894* (2013.01); *H04L 9/30* (2013.01); *H04L 9/32* (2013.01); *H04L 9/321* (2013.01); *H04L 63/0272* (2013.01); *H04L 63/045* (2013.01); *H04L 63/061* (2013.01); *H04L 67/04* (2013.01); *H04W 4/005* (2013.01); *H04W 12/02* (2013.01); *H04W 12/04* (2013.01); *H04W 12/06* (2013.01); *H04W 52/0216* (2013.01); *H04W 52/0235* (2013.01); *G06F 2221/2105* (2013.01); *G06F 2221/2107* (2013.01); *G06F 2221/2115* (2013.01); *H04L 63/0442* (2013.01); *H04L 63/123* (2013.01);

(Continued)

(58) Field of Classification Search
None
See application file for complete search history.

(56) References Cited

U.S. PATENT DOCUMENTS 6,038,322  A    3/2000  Harkins
7,921,292  B1   4/2011  Pauker et al.
(Continued)

FOREIGN PATENT DOCUMENTS

CA    2775853 A1    12/2012
EP    1981 224       10/2008
(Continued)

OTHER PUBLICATIONS

ETSI, Machine-to-Machine communications (M2M), mIa, dIa, and mId interfaces, TS 102.921 v1.1.1, Feb. 2012, pp. 1-538.
(Continued)

*Primary Examiner* — Ayaz Sheikh
*Assistant Examiner* — Tarell Hampton
(74) *Attorney, Agent, or Firm* — McDonnell Boehnen Hulbert & Berghoff LLP

(57) ABSTRACT

Methods and systems are provided for power management and security for wireless modules in "Machine-to-Machine" communications. A wireless module operating in a wireless network and with access to the Internet can efficiently and securely communicate with a server. The wireless network can be a public land mobile network (PLMN) or a wireless local area network (LAN). The wireless module may include a sensor and may be installed next to a monitored unit. The wireless module may utilize active states for collecting and sending data, and sleep states at other times to conserve a battery and/or energy usage. The wireless module minimize the time spent in a radio resource control (RRC) connected state. Messages between the wireless module and server can be transmitted according to a user datagram protocol (UDP). The wireless module and server can utilize public key infrastructure (PKI) for encryption and digital signatures.

44 Claims, 12 Drawing Sheets

(51) Int. Cl.

| | |
|---|---|
| H04L 9/30 | (2006.01) |
| H04W 52/02 | (2009.01) |
| H04W 12/06 | (2009.01) |
| H04W 12/04 | (2009.01) |
| H04W 12/02 | (2009.01) |
| H04L 9/32 | (2006.01) |
| H04W 4/00 | (2009.01) |
| H04L 29/08 | (2006.01) |
| H04L 29/06 | (2006.01) |
| H04L 9/00 | (2006.01) |
| G06F 21/35 | (2013.01) |

(52) U.S. Cl.
CPC .......... H04L 2209/805 (2013.01); Y02B 60/50 (2013.01)

(56) References Cited

U.S. PATENT DOCUMENTS

| | | |
|---|---|---|
| 8,526,606 B2 | 9/2013 | Muthaiah |
| 8,555,067 B2 | 10/2013 | Schell et al. |
| 8,590,028 B2 | 11/2013 | Saxena et al. |
| 8,782,774 B1 | 7/2014 | Pahl et al. |
| 8,948,386 B2 | 2/2015 | Campagna et al. |
| 9,002,018 B2 | 4/2015 | Wilkins et al. |
| 2002/0018569 A1 | 2/2002 | Panjwani et al. |
| 2003/0003895 A1* | 1/2003 | Wallentin ................ H04L 63/08 455/410 |
| 2003/0211842 A1 | 11/2003 | Kempf et al. |
| 2004/0179684 A1 | 9/2004 | Appenzeller et al. |
| 2004/0221163 A1 | 11/2004 | Jorgensen et al. |
| 2005/0008159 A1 | 1/2005 | Grilli et al. |
| 2005/0021875 A1 | 1/2005 | Bouthemy et al. |
| 2005/0120202 A1 | 6/2005 | Cuellar et al. |
| 2005/0138353 A1 | 6/2005 | Spies et al. |
| 2005/0193199 A1 | 9/2005 | Asokan et al. |
| 2005/0246282 A1 | 11/2005 | Naslund et al. |
| 2005/0278787 A1 | 12/2005 | Naslund et al. |
| 2006/0021063 A1 | 1/2006 | Hori |
| 2006/0056355 A1* | 3/2006 | Love ................ H04W 74/0866 370/332 |
| 2006/0059344 A1 | 3/2006 | Mononen |
| 2006/0206710 A1 | 9/2006 | Gehrmann |
| 2006/0281442 A1 | 12/2006 | Lee et al. |
| 2007/0206799 A1 | 9/2007 | Wingert et al. |
| 2008/0016230 A1 | 1/2008 | Holtmanns et al. |
| 2008/0022089 A1 | 1/2008 | Leedom |
| 2008/0114978 A1 | 5/2008 | Lehtovirta et al. |
| 2008/0130879 A1 | 6/2008 | Heinonen et al. |
| 2008/0165698 A1* | 7/2008 | Dalsgaard ............. H04W 24/10 370/252 |
| 2008/0307218 A1 | 12/2008 | Logvinov |
| 2009/0028341 A1 | 1/2009 | Hamachi |
| 2009/0060197 A1 | 3/2009 | Taylor et al. |
| 2009/0077643 A1 | 3/2009 | Schmidt et al. |
| 2009/0113203 A1 | 4/2009 | Tsuge et al. |
| 2009/0116642 A1 | 5/2009 | Yang et al. |
| 2009/0125996 A1 | 5/2009 | Guccione et al. |
| 2009/0132806 A1 | 5/2009 | Blommaert et al. |
| 2009/0191857 A1 | 7/2009 | Horn et al. |
| 2009/0209232 A1 | 8/2009 | Cha et al. |
| 2009/0217348 A1 | 8/2009 | Salmela et al. |
| 2009/0268909 A1 | 10/2009 | Girao et al. |
| 2009/0282246 A1 | 11/2009 | Gunther |
| 2009/0313472 A1 | 12/2009 | Guccione et al. |
| 2010/0031042 A1 | 2/2010 | Di Crescenzo et al. |
| 2010/0062808 A1 | 3/2010 | Cha et al. |
| 2010/0098253 A1 | 4/2010 | Delerablee |
| 2010/0166167 A1 | 7/2010 | Karimi-Cherkandi et al. |
| 2010/0275028 A1 | 10/2010 | Takashima |
| 2011/0016321 A1 | 1/2011 | Sundaram et al. |
| 2011/0035584 A1 | 2/2011 | Meyerstein et al. |
| 2011/0055553 A1 | 3/2011 | Lee et al. |
| 2011/0237281 A1* | 9/2011 | Busropan ................ G01D 4/002 455/507 |
| 2011/0291803 A1* | 12/2011 | Bajic .................. G08B 13/2462 340/10.1 |
| 2011/0314287 A1 | 12/2011 | Escott et al. |
| 2012/0011360 A1 | 1/2012 | Engels et al. |
| 2012/0023336 A1 | 1/2012 | Natarajan |
| 2012/0030461 A1 | 2/2012 | Willey et al. |
| 2012/0072732 A1 | 3/2012 | Canard et al. |
| 2012/0084568 A1 | 4/2012 | Sarikaya et al. |
| 2012/0089568 A1 | 4/2012 | Manley et al. |
| 2012/0108205 A1 | 5/2012 | Schell et al. |
| 2012/0117635 A1 | 5/2012 | Schell et al. |
| 2012/0159153 A1 | 6/2012 | Shim et al. |
| 2012/0170451 A1 | 7/2012 | Viswanathan et al. |
| 2012/0190354 A1 | 7/2012 | Merrien et al. |
| 2012/0260086 A1 | 10/2012 | Haggerty et al. |
| 2012/0260090 A1 | 10/2012 | Hauck et al. |
| 2012/0260095 A1 | 10/2012 | Von Hauck et al. |
| 2012/0278490 A1 | 11/2012 | Sennett et al. |
| 2012/0300932 A1 | 11/2012 | Cambridge et al. |
| 2012/0331292 A1 | 12/2012 | Haggerty et al. |
| 2012/0331298 A1 | 12/2012 | Xu et al. |
| 2013/0007442 A1 | 1/2013 | Mao et al. |
| 2013/0012168 A1 | 1/2013 | Rajadurai et al. |
| 2013/0091556 A1 | 4/2013 | Horn et al. |
| 2013/0114810 A1 | 5/2013 | Kobayashi et al. |
| 2013/0117824 A1 | 5/2013 | Naslund et al. |
| 2013/0122864 A1 | 5/2013 | Haggerty et al. |
| 2013/0149996 A1 | 6/2013 | King et al. |
| 2013/0165073 A1 | 6/2013 | Madsen |
| 2013/0166915 A1 | 6/2013 | Desai et al. |
| 2013/0173747 A1 | 7/2013 | Kim et al. |
| 2013/0173926 A1 | 7/2013 | Morese et al. |
| 2013/0212637 A1 | 8/2013 | Guccione et al. |
| 2013/0227646 A1 | 8/2013 | Haggerty et al. |
| 2013/0231087 A1 | 9/2013 | O'Leary |
| 2013/0305345 A1 | 11/2013 | Bugenhagen |
| 2013/0322621 A1 | 12/2013 | Yoon et al. |
| 2013/0331063 A1 | 12/2013 | Cormier et al. |
| 2014/0003604 A1 | 1/2014 | Campagna et al. |
| 2014/0053241 A1 | 2/2014 | Norrman et al. |
| 2014/0073375 A1 | 3/2014 | Li et al. |
| 2014/0082358 A1 | 3/2014 | Nakhjiri et al. |
| 2014/0082359 A1 | 3/2014 | Nakhjiri et al. |
| 2014/0087790 A1 | 3/2014 | Babbage et al. |
| 2014/0101444 A1 | 4/2014 | Lee et al. |
| 2014/0108801 A1 | 4/2014 | McBride et al. |
| 2014/0115335 A1 | 4/2014 | Jorden et al. |
| 2014/0122878 A1 | 5/2014 | Cho et al. |
| 2014/0140507 A1 | 5/2014 | Park et al. |
| 2014/0143826 A1 | 5/2014 | Sharp et al. |
| 2014/0161113 A1 | 6/2014 | Cui et al. |
| 2014/0165155 A1 | 6/2014 | Zhang |
| 2014/0192976 A1 | 7/2014 | Yoon et al. |
| 2014/0219447 A1 | 8/2014 | Park et al. |
| 2014/0219448 A1 | 8/2014 | Froels et al. |
| 2014/0244994 A1 | 8/2014 | Yu |
| 2014/0273913 A1 | 9/2014 | Michel et al. |
| 2014/0287725 A1 | 9/2014 | Lee |
| 2014/0337937 A1 | 11/2014 | Truskovsky et al. |
| 2014/0351403 A1 | 11/2014 | Lin et al. |
| 2015/0012743 A1 | 1/2015 | Holtmanns et al. |
| 2015/0017910 A1 | 1/2015 | Li et al. |
| 2015/0089214 A1 | 3/2015 | Dupre |
| 2015/0092590 A1 | 4/2015 | Zhu et al. |
| 2015/0095514 A1 | 4/2015 | Yu |
| 2015/0113275 A1 | 4/2015 | Kim et al. |
| 2015/0121495 A1 | 4/2015 | Gao et al. |

FOREIGN PATENT DOCUMENTS

| | | |
|---|---|---|
| KR | 10-2013-0026352 A | 3/2013 |
| KR | 10-2013-0026958 A | 3/2013 |

(56) References Cited

FOREIGN PATENT DOCUMENTS

| WO | WO 2011/138238 | 11/2011 |
|---|---|---|
| WO | WO 2013027085 A1 | 2/2013 |
| WO | WO 2013066077 A1 | 5/2013 |

OTHER PUBLICATIONS

GSMA, Fast Dormancy Best Practices Version 1.0, 27 Jul. 2011, TS.18, pp. 1-23.
N. Chu et al, Exalted: Expanding LTE for Devices, European Commission for Information Society and Media, Oct. 31, 2012, pp. 1-141.
J. Huang et al, A Close Examination of Performance and Power Characteristics of 4G LTE Networks, Mobisys' 12, Jun. 25-29, 2012, pp. 1-14.
F. Qian et al, TOP: Tail Optimization Protocol for Cellular Resource Allocation, 18th IEEE International Conference on Network Protocols (ICNP), 2010, Oct. 5-8, 2010, pp. 285-298.
Wikipedia, RSA (algorithm), http://en.wikipedia.org/wiki/RSA_(algorithm), Sep. 9, 2013, pp. 1-12.
Wikipedia, Elliptic Curve Cryptography, http://en.wikipedia.org/wiki/Elliptic_curve_cryptography, Sep. 9, 2013, pp. 1-8.
L. Larzon, The Lightweight User Datagram Protocol (UDP-Lite), Internet Engineering Task Force RFC 3828, Jul. 2004, pp. 1-12.
Wikipedia, Digital Signature, http://en.wikipedia.org/wiki/Digital_signature, Sep. 9, 2013, pp. 1-10.
D. Cooper, Internet X.509 Public Key Infrastructure Certificate and Certificate Revocation List (CRL) Profile, Internet Engineering Task Force RFC 5280, pp. 1-133.
C. Downey, Migrating Legacy M2M Systems to the Cloud, http://www.ecnmag.com/articles/2013/02/migrating-legacy-m2m-systems-cloud, Feb. 2013, pp. 1-2.
International Search Report for PCT/US2014/068544 dated Feb. 13, 2015.
T. Pornin, Deterministic Usage of the Digital Signature Algorithm (DSA) and Elliptic Curve Digital Signature Algorithm (ECDSA), Internet Engineering Task Force RFC 6979, Aug. 2013, pp. 1-79.
J. Nix, An Embedded Universal Integrated Circuit Card Supporting Two-Factor Authentication, U.S. Appl. No. 14/099,329, filed Dec. 6, 2013.
J. Jonsson et al, Public-Key Cryptography Standards (PKCS) #1: RSA Cryptography Specifications Version 2.1, Internet Engineering Task Force RFC 3447, Feb. 2003, pp. 1-72.
D. McGrew et al, Fundamental Elliptic Curve Cryptography Algorithms, Internet Engineering Task Force RFC 6090, Feb. 2011, pp. 1-34.
3GPP, 3rd Generation Partnership Project;Technical Specification Group Services and System Aspects; 3GPP System Architecture Evolution (SAE); Security architecture, 3GPP TS 33.401 V12.9.0 (Sep. 2013) pp. 1-75.
3GPP, 3rd Generation Partnership Project; Technical Specification Group Core Network and Terminals; Non-Access-Stratum (NAS) protocol for Evolved Packet System (EPS); Stage 3, 3GPP TS 24.301 v12.2.0, Sep. 2013 pp. 1-6, 63-100.
J. Nix, Key Derivation for a Module using an Embedded Universal Integrated Circuit Card, U.S. Appl. No. 14/084,141, filed Nov. 19, 2013.
A. Wander et al, Energy Analysis of Public-Key Cryptography on Small Wireless Devices, Sun Microsystems Laboratories, pp. 1-16.
J. Nix, Power Management and Security for Wireless Modules in "Machine-to-Machine" Communications, U.S. Appl. No. 14/023,181, filed Sep. 10, 2013.
V. Martinez et al, A Survey of the Elliptic Curve Integrated Encryption Scheme, Journal of Computer Science and Engineering, vol. 2, Aug. 2010, pp. 7-13.
J. Nix, Secure PKI Communications for "Machine-to-Machine" Modules, including Key Derivation by Modules and Authenticating Public Keys, U.S. Appl. No. 14/039,401, filed Sep. 27, 2013.
J. Nix, Systems and Methods for "Machine-to-Machine" (M2M) Communications Between Modules, Servers, and an Application using Public Key Infrastructure (PKI), U.S. Appl. No. 14/055,606, filed Oct. 16, 2013.
J. Nix, A Set of Servers for "Machine-to-Machine" Communications using Public Key Infrastructure, U.S. Appl. No. 14/064,618, filed Oct. 28, 2013.
ETSI, UMTS;LTE; SIM/USIM Internal and External Interworking Aspects, TR 131 900 v.10.0.0, May 2011, pp. 1-41.
International Search Report and Written Opinion for PCT/US2014/062435 mailed Feb. 6, 2015.
ETSI, Smart Cards; UICC-Terminal Interfaces; Physical and Logical Characteristics, TS 102 221 v11.0.0, Jun. 2012, pp. 1-181.
Wikipedia, Elliptic Curve Diffie-Hellman, http://en.wikipedia.org/wiki/Elliptic_curve_Diffie%E2%80%93Hellman, Sep. 24, 2013, pp. 1-2.
Appenzeller et al., Identity-Based Encryption Architecture and Suporting Data Structures RFC 5408, 2009, pp. 1-30.
Baugher et al., Group Key Management Architecture, RFC Draft, 2001, pp. 1-20.
Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.
Boyen et al., Anonymous Hierarchical Identity-Based Encyrption (Without Random Oracles), 2006.
Boyen et al., Identity-Based Cryptography Standard (IBCS) #1: Supersingular Curve Implementations of the BF and BB1 Cryptosystems, RFC 5091, 2007, pp. 1-63.
ETSI, Smart Cards; Embedded UICC; Requirements Specification, TS 103 383 v12.1.0, Jun. 2013, pp. 1-20.
Harney et al., Group Key Management Protocol (GKMP) Architecture, 1994, pp. 1-19.
Kiltz et al., CCA2 Secure IBE: Standard Model Efficiency through Authenticated Symmetric Encryption, 2008.
Krylov, What is Kerberos Authtentication?, 2003, pp. 1-4.
Martin, Introduction to Identity-Based Encryption, ISBN-13 978-1-59693-238-8, 2008.
Merrian-Webster, Network, 2014.
Park et al., A New Practical Identity-Based Encryption System, 2003, pp. 1-27.
Park et al., Secure Profile Provisioning Architecture for Embedded UICC, 2013 IEEE, pp. 297-303.
Shih et al., "Securing M2M with Post-Quantum Public-Key Cryptography", IEEE Journal on Emerging and Selected Topics in Circuits and Systems, Mar. 7, 2013, pp. 106-116.
Voltage Security, The Identity-Based Encryption Advantage, 2015.
Yang et al., Identity-Based Key Agreement and Encyrption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, Jun. 2006, pp. 1-42.

* cited by examiner

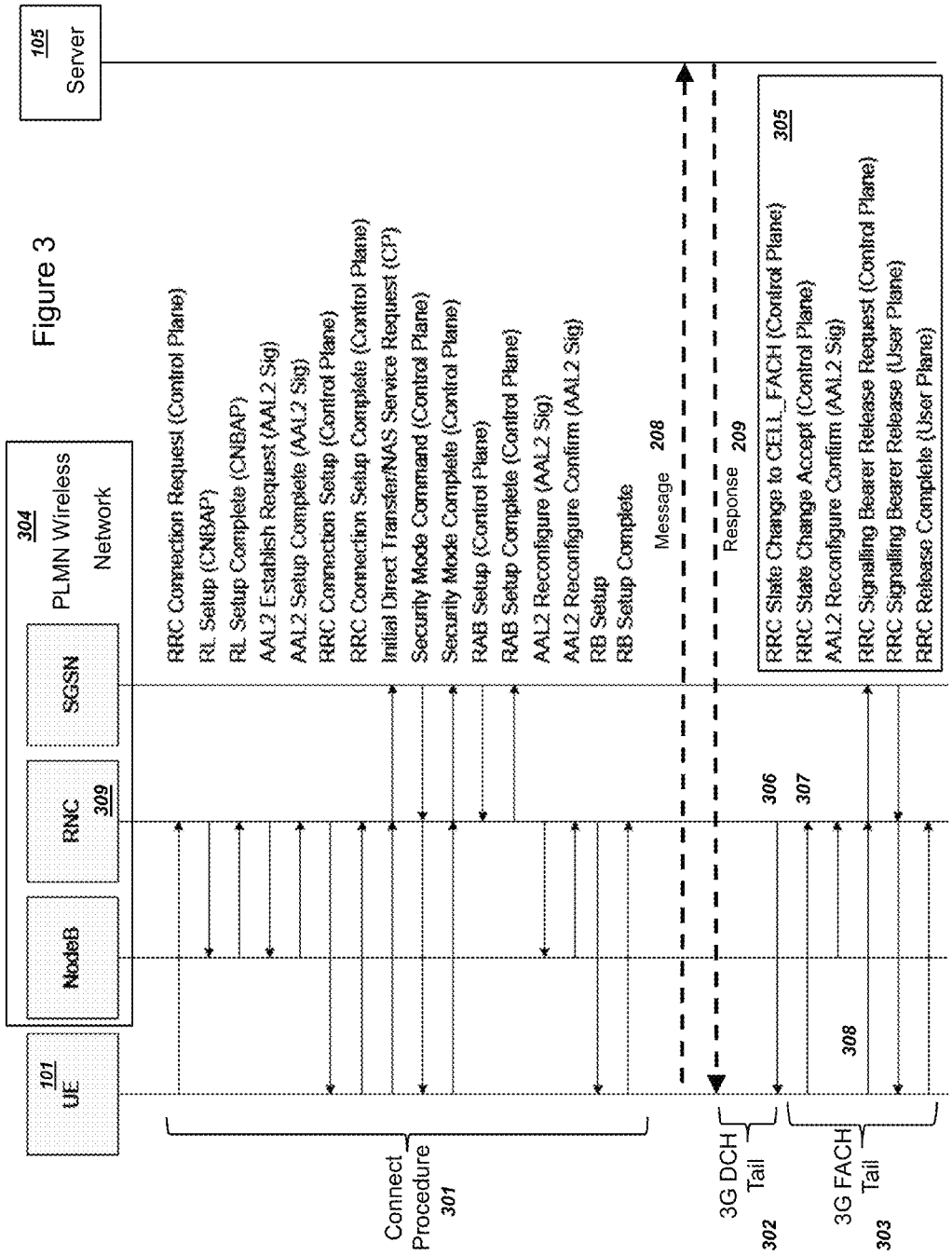

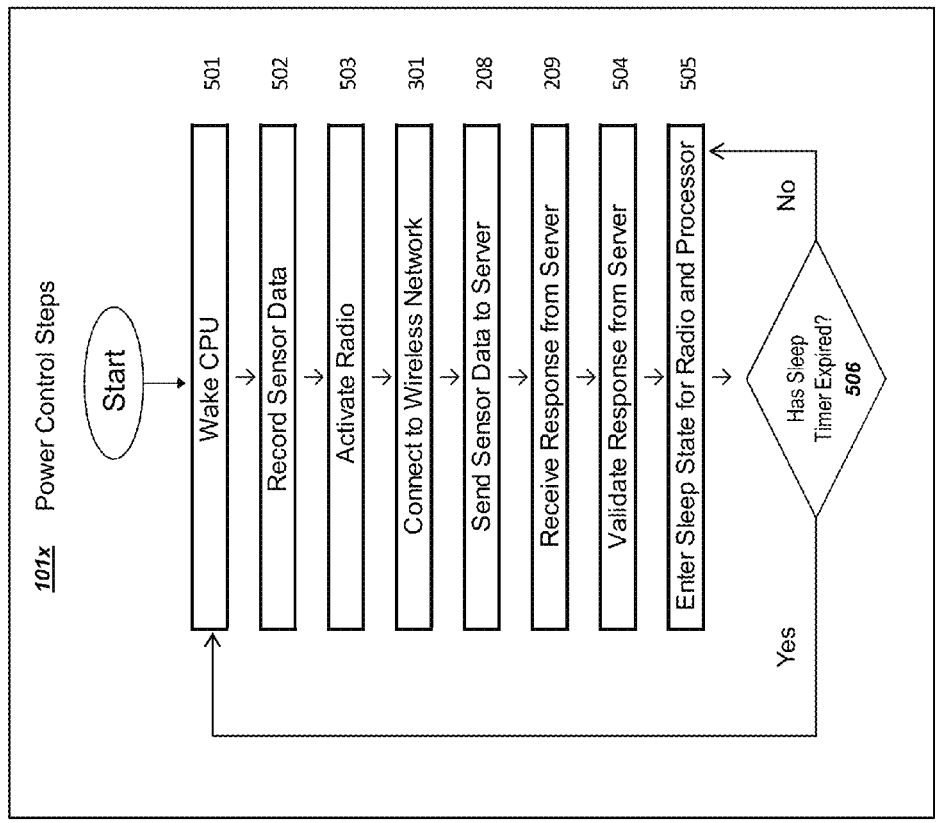

Module Program
101i

POWER MANAGEMENT AND SECURITY FOR WIRELESS MODULES IN "MACHINE-TO-MACHINE" COMMUNICATIONS

BACKGROUND

1. Technical Field

The present methods and systems relate to communications between wireless modules and a network, and more particularly, efficient methods and systems for supporting secure, energy efficient, and bandwidth efficient communications between a wireless node and a server through a wireless network.

2. Description of Related Art

The combination of "machine-to-machine" (M2M) communications and wireless networking technology is a promising and growing field. Among many potential benefits, M2M technologies allow the remote monitoring of people, assets, or a location where manual monitoring is not economic, or costs can be significantly reduced by using automated monitoring as opposed to manual techniques. Prominent examples today include vending machines, automobiles, alarm systems, and remote sensors. Fast growing markets for M2M applications today include tracking devices for shipping containers or pallets, health applications such as the remote monitoring of a person's glucose levels or heartbeat, and monitoring of industrial equipment deployed in the field.

In addition, M2M communications can provide remote control over actuators that may be connected to a M2M device, such as turning on or off a power switch, locking or unlocking a door, or similar remote control. A decision to change or adjust an actuator associated with an M2M device can utilize one or a series of sensor measurements. As one example, if a building or room is too cold, then temperature can be reported to a central server by an M2M device and the server can instruct the M2M device to turn on a switch that activates heat or adjusts a thermostat. As the costs for computer and networking hardware continue to decline, together with the growing ease of obtaining wireless Internet access for small form-factor devices, the number of economically favorable applications for M2M communications grows.

Wireless technologies such as wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include $3^{rd}$ Generation Partnership Project's (3GPP) $3^{rd}$ Generation (3G) Universal Mobile Telecommunications System (UMTS) and $4^{th}$ Generation (4G) Long-term Evolution (LTE), LTE Advanced, and the Institute of Electrical and Electronics Engineers' (IEEE) 802.16 standard, also known as WiMax. The use of wireless technologies with "machine-to-machine" communications creates new opportunities for the deployment of M2M modules in locations without fixed-wire Internet access, but also creates a significant new class of problems that need to be solved. First, many wireless wide-area networking standards were designed and optimized for mobile phones, which may be continuously connected to the network during the day (i.e. non-sleeping hours for most subscribers while they may charge phones at night), in order to receive inbound phone calls and messages. In this case, the radio may be in an idle state but utilizing discontinuous reception, but the radio is still active and drawing power in order to receive and process incoming signaling from the network such as a Public Land Mobile Network (PLMN).

A need exists in the art for the communication between a wireless module and either a PLMN network or a monitoring server (accessed by the wireless module through the PLMN) to be highly energy and bandwidth efficient in order to conserve battery life. A limiting factor for a wireless module for M2M applications deployed or installed into the field is the lifetime of the battery of the wireless module. M2M applications have unique requirements compared to traditional mobile phones, where the data transmitted may typically be relatively small messages such as a few kilobtyes or less several times a day. The energy to simply transmit a single packet can be relatively high for M2M applications. Junxian Huang et al noted in their paper to MobiSys 2012, "Based on these observations, LTE is less energy efficient during idle state and for transferring smaller amount of data. For example, if only one packet is transferred, the energy usage considering both promotion and tail energy for LTE, 3G and WiFi is 12.76J, 7.38J, and 0.04J, respectively" (A Close Examination of Performance and Power Characteristics of 4G LTE Networks", page 2). A need exists in the art to reduce power usage while sufficiently conforming to standards, in order to transmit data from a wireless module to a server.

If the transmission techniques for the wireless module are not energy efficient, the system will require more frequent manual intervention for the replacement or recharging of batteries. If the battery becomes sufficiently low, then communication with the wireless module will be lost, or the frequency decreased for (i) sensor measurements or reports sent by the wireless module or (ii) receive actuator commands sent by a monitoring server. A need exists in the art whereby the energy saving techniques to send data should preferably leverage the signaling methods described by established wireless WAN standards in order to properly support and interoperate with commercially deployed wireless networks. A need exists in the art to implement the signaling methods described by established and future wireless WAN standards in a manner that is more efficient for wireless modules than consumer mobile handsets.

A need exists in the art to secure communication between a wireless module and a server in an efficient manner. As wireless modules and servers supporting M2M communications increasingly leverage the public Internet, a need exists in the art to provide a high degree of security while balancing a competing need to maximize battery life of wireless modules. A need exists in the art for the security algorithms to support widely deployed public key infrastructure (PKI) processes and support software. And other needs exist in the art as well, as the list recited above is not meant to be exhaustive but rather illustrative.

SUMMARY

Methods and systems are provided for efficient power control of wireless modules when connecting to wireless wide area networks, including Public Land Mobile Networks. An objective of the invention is to address the challenges noted above for extending battery life and maintaining security, while also providing desirable results such as reducing complexity, increasing speed and/or efficiency of sessions to transmit data to a server, among other benefits.

A first exemplary embodiment may take the form of methods and systems for a wireless module to conserve battery life by minimizing the period of time the wireless module remains in a radio resource connected state after sending sensor data to a server. The wireless module can include a battery, a processor, a sensor, an actuator, and a radio, and the wireless module may be deployed within a wireless network such as a 4G LTE network. The wireless module can change state between a sleep state and an active state, wherein the sleep state may utilize a few milliwatts or less and the active state may utilize several hundred milliwatts of power or more. The active state of the wireless module can comprise the wireless module being in a radio resource control (RRC) connected state or a cell dedicated channel (DCH) state. After being installed next to a monitored unit, the wireless module can wake from a sleep or dormant state, utilize the sensor to collect data associated with a monitored unit, connect to the wireless network and the Internet, and send the sensor data to a server.

The sensor data sent from the wireless module to the server can be transmitted as a message using the User Datagram Protocol (UDP) protocol. The message as a UDP datagram can be a UDP Lite datagram and also with checksums partially or entirely disabled. The UDP datagram with sensor data can include channel coding for the body of the datagram to mitigate the effect of bit errors. The UDP datagram can be sent to an IP address and port number (IP:port) of the server. The sever can receive the message and send a response, using the IP:port number as a source port number in the response. The destination IP:port number of the response can be the source IP:port number of the message received by the server, wherein the destination IP:port number of the response from the server can be different than the source IP:port number used by the wireless module, if the wireless network utilizes a firewall with network address translation (NAT). By using UDP instead of transport control protocol (TCP), the wireless module can minimize the time the wireless module remains in a radio resource connected state, since a total of only two datagrams are required, with a first datagram for the message and a second datagram for the response, while TCP would require additional datagrams for a TCP handshake and closing the TCP connection. The response sent from a server may include a command or instruction, and can also include a setting for an actuator associated with the wireless module or a monitored unit.

After receiving the response, the wireless module can return to the dormant state, before the wireless module performs any of (a) receiving a radio bearer reconfiguration message, (b) receiving a radio resource control state change message, (c) sending a radio resource control state change message, (d) receiving a radio resource control connection release, and (f) sending a signaling connection release indication (SCRI) message. The wireless module can return to the dormant state both (i) after receiving and processing the response from the server, and (ii) before sending or receiving a layer 3 radio control message (other than the frequent outer loop power control messages) with wireless network 102. In addition, the wireless module can send a detach message to the wireless network after receiving the response, wherein the detach message is sent (i) after the wireless module enters a radio resource control connected state and (ii) before the wireless module uses a short or long discontinuous receive (DRX) state. The dormant state of the wireless module may comprise powering down a radio in order to conserve battery life.

By returning to the dormant state before sending or receiving any further radio control messages with the wireless network, the wireless module can minimize the duration of a 4G LTE radio resource control connected tail period, thereby conserving battery life and minimizing use of wireless network 102 resources. The tail period of an active radio after receiving the response from the server can be minimized with other wireless networking technologies and standards as well. For example, if the wireless network utilizes 3G technology, the wireless module can minimize the tail period in the Dedicated Transport Channel (DCH) state, and/or the 3G Forward Access Channel (FACH) state. By minimizing the tail period after receiving the response from the server, the wireless module can conserve battery life and extend the time for operating the wireless module without manual intervention required to recharge or replace the battery of the wireless module. After successfully processing the response from the server, the wireless module can change state from the active state to the sleep or dormant state, including disconnecting from the wireless network and powering down the radio. The wireless module can include a sleep timer, wherein the wireless module wakes upon expiration of the sleep timer, and subsequently repeats the process of collecting sensor data and sending a message to the server.

A second exemplary embodiment may take the form of methods and systems for a wireless module and a server to securely communicate in an efficient manner while using the public Internet. The wireless module can include a private key associated with the wireless module and a public key associated with a server. The server can include a private key associated with the server and a public key associated with the wireless module. The private and public keys can leverage established public key infrastructure (PKI) standards, such as X.509 v3 certificates and RSA or elliptic curve cryptography (ECC) algorithms. The private and public keys may preferably utilize ECC based keys and algorithms in order to increase the security for a given key length, compared to RSA, thereby increasing the efficiency and reducing power and bandwidth consumption and maximize battery life.

In this second exemplary embodiment, the wireless module can also include a battery, a processor, a sensor, an actuator, and a radio, and the wireless module may be deployed within a wireless network such as a 4G LTE network. The wireless module can change state between a sleep state and an active state, wherein the sleep state may utilize a few milliwatts or less and the active state may utilize several hundred milliwatts of power or more. The active state of the wireless module can comprise the wireless module being in a radio resource control (RRC) connected state. After being installed next to a monitored unit, the wireless module can wake from a sleep or dormant state, utilize the sensor to collect data associated with the monitored unit, connect to the wireless network and the Internet, and send the sensor data to a server.

The wireless module can wake from a sleep state, enter an active state, and send the sensor data to the server through the wireless network and Internet. The sensor data sent from the wireless module to the server can be transmitted as a message using the User Datagram Protocol (UDP) protocol. The message as a UDP datagram can be a UDP Lite datagram and also with checksums partially or entirely disabled. The UDP datagram with sensor data can include channel coding for the body of the datagram to mitigate the effect of bit errors. The wireless module can (i) utilize the server public key to encrypt the sensor data within the message and (ii) utilize the wireless module private key to create a digital signature of the wireless module in the message. The message can also include a wireless module identity and a security token. The server can receive the message and (i) verify the digital signature of the wireless module by utilizing the wireless module public key, and (ii) decrypt the sensor data by utilizing the server private key.

After receiving the message, the server can send a response back to the wireless module, wherein the response can include an acknowledgement that the message has been properly received by the server. Since the UDP protocol is connectionless, the wireless module may need a confirmation that the message has been properly received by the server. The response sent from the server may optionally include a configuration or instruction for the wireless module, wherein the configuration or instruction can change parameters or function of the wireless module for collecting data from a monitored unit. According to this second exemplary embodiment, the configuration or instruction can be sent from the server to the wireless module after the wireless module sends the message. In this manner, the wireless module can receive the configuration or instruction because at other times, such as before wireless module sends the message, (i) the wireless module may be in a sleep or dormant state and unable to receive the configuration or instruction, and (ii) a firewall associated with the wireless network may block incoming packets to the wireless module unless the wireless module had first send a packet to the server within a firewall port-binding timeout period.

The server can process a response to the message from the wireless module. The server can (i) utilize the wireless module public key to encrypt the acknowledgement and/or configuration or instruction within the response and (ii) utilize the server private key to create a digital signature of the server in the response. The server can send the response to the wireless module. The response can also include a server identity and a security token. The wireless module can receive the response and (i) verify the digital signature of the server by utilizing the server public key, and (ii) decrypt the acknowledgement and/or configuration or instruction by utilizing the server private key. After successfully receiving and processing the response from the server, the wireless module can change state from the active state to the sleep or dormant state, including disconnecting from the wireless network and powering down the radio. The wireless module can include a sleep timer, wherein the wireless module wakes upon expiration of the sleep timer, and subsequently repeats the process of collecting sensor data and sending a message to the server.

A third exemplary embodiment may take the form of methods and systems that combine the methods and systems of the first and second exemplary embodiments. After being installed next to a monitored unit, a wireless module can wake from a sleep or dormant state, utilize a sensor to collect data associated with a monitored unit, connect to a wireless network and the Internet, and send a message including sensor data to a server. The sensor data sent from the wireless module to the server can be transmitted as a message using the User Datagram Protocol (UDP) protocol. The message as a UDP datagram can be a UDP Lite datagram and also with checksums partially or entirely disabled. The UDP datagram with sensor data can include channel coding for the body of the datagram to mitigate the effect of bit errors. The UDP datagram can be sent to an IP address and port number (IP:port) of the server.

The wireless module can include a private key associated with the wireless module and a public key associated with a server. The server can include a private key associated with the server and a public key associated with the wireless module. The private and public keys can leverage established public key infrastructure (PKI) standards, such as X.509 v3 certificates and RSA or elliptic curve cryptography (ECC) algorithms. The wireless module can (i) utilize the server public key to encrypt the sensor data within the message and (ii) utilize the wireless module private key to create a digital signature of the wireless module in the message. The message can also include a wireless module identity and a security token. The server can receive the message and (i) verify the digital signature of the wireless module by utilizing the wireless module public key, and (ii) decrypt the sensor data by utilizing the server private key.

The server can process a response to the message from the wireless module. The server can (i) utilize the wireless module public key to encrypt the acknowledgement and/or configuration or instruction within the response and (ii) utilize the server private key to create a digital signature of the server in the response. The destination IP:port number of the response can be the source IP:port number of the message received by the server, wherein the destination IP:port number of the response can be different than the source IP:port number used by the wireless module, if the wireless network utilizes a firewall with network address translation (NAT).

After successfully receiving and processing the response from the server, the wireless module can change state from the active state to the sleep or dormant state, including disconnecting from the wireless network and powering down the radio. The wireless module can return to the sleep or dormant state, before the wireless module performs any of (a) receiving a radio bearer reconfiguration message, (b) receiving a radio resource control state change message, (c) sending a radio resource control state change message, (d) receiving a radio resource control connection release, and (e) sending a signaling connection release message. The wireless module can return to the dormant state both (i) after receiving and processing the response from the server, and (ii) before sending or receiving layer 3 radio control messages with wireless network 102 (other than open loop or closed loop power control messages). In addition, the wireless module can send a detach message to the wireless network after receiving the response, wherein the detach message is sent (i) after the wireless module enters a radio resource control connected state and (ii) before the wireless module uses a discontinuous receive (DRX) state. Upon entering the sleep or dormant state, the wireless module can include a sleep timer, wherein the wireless module wakes upon expiration of the sleep timer, and subsequently repeats the process of collecting sensor data and sending a message to the server.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 3 is a simplified message flow diagram illustrating exemplary steps for a wireless module to connect to a wireless network, send sensor data to a server, and disconnect from the wireless network, in accordance with exemplary embodiments;

FIG. 5 is a flow chart illustrating exemplary power control steps for a wireless module, in accordance with exemplary embodiments;

DETAILED DESCRIPTION OF EXEMPLARY EMBODIMENTS OF THE INVENTION

FIG. 1a

Figure 1A:
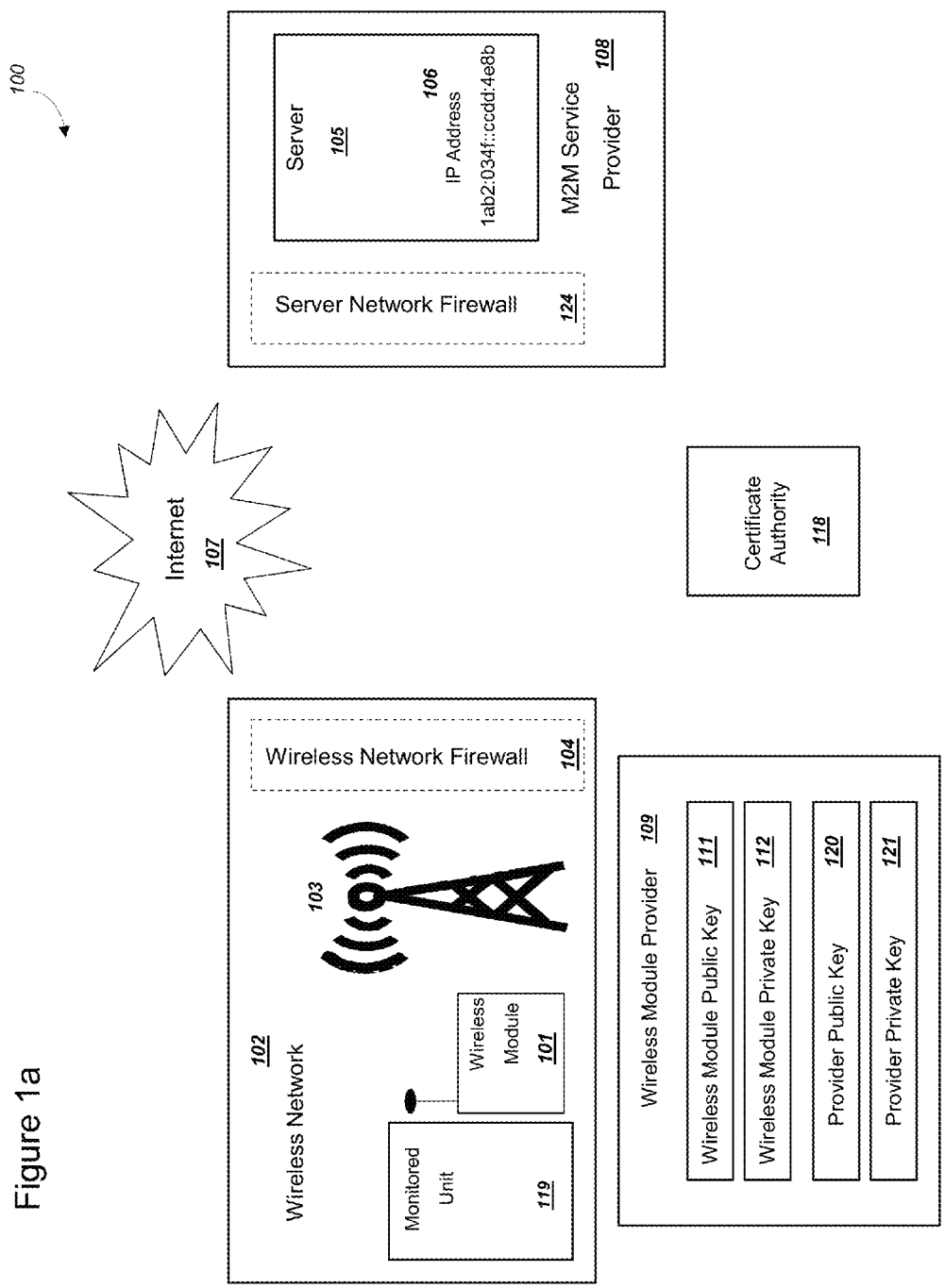
FIG. 1a is a graphical illustration of an exemplary system, where a server and a wireless network connect to the Internet, where the wireless network includes a wireless module for "machine-to-machine" communications, in accordance with exemplary embodiments.

FIG. 1a is a graphical illustration of an exemplary system, where a server and a wireless network connect to the Internet, where the wireless network includes a wireless module for "machine-to-machine" communications, in accordance with exemplary embodiments. The system 100 includes a wireless module 101 operating within a wireless network 102. System 100 can also include a wireless module provider 109, an Internet 107, and an M2M service provider 108, a wireless network 102, and a wireless module 101. M2M service provider 108 can include a server 105. System 100 is illustrated without specific packet transmissions between wireless module 101 and M2M service provider 108. Examples of the communications and messages pertaining to the present invention will be illustrated in later Figures. As contemplated herein, machine-to-machine communications may comprise communication between a wireless module 101 and a server 105, such that data can be transferred between the two without manual intervention, other than the manual intervention required to set up system 100 and any occasional manual maintenance required. As contemplated herein, machine-to-machine communications may also be referred to as "the Internet of things" (IoT).

Wireless module 101 and wireless network 102 can communicate using a base station 103. Wireless module 101 and wireless network 102 can utilize a variety of wireless technologies to communicate, including WiFi, WiMax, a $2^{nd}$ generation wireless wide area network (WAN) technology such as General Packet Radio Services (GPRS) or Enhanced Data rates for GSM Evolution (EDGE), $3^{rd}$ Generation Partnership Project (3GPP) technology such as 3G, 4G LTE, or 4G LTE Advanced, and other examples exist as well. Wireless network 102 may comprise a wireless wide area network (WAN). Wireless network 102 and wireless module 101 can support future versions of wireless WANs as well. Although wireless module 101 is illustrated in FIG. 1 as operating in a wireless network 102, the efficient and secure techniques for communication described in the present invention can apply to a wired module as well. In this case, the wired module would replace wireless module 101, and the wired module can connect to the Internet 107 via a wired connection such as Ethernet.

Wireless network 102 could also utilize future wireless technologies, such as the white space spectrum recently approved for use by the Federal Communications Commission (FCC), and in this case base station 103 could be a Mode II device according to FCC Memorandum Opinion and Order (FC-12-36) and related white space regulation documents. Generally, the communication techniques described herein can be independent of the network technologies utilized at the physical and data-link layers, so long as the underlying network provides access to the Internet 107 and supports Internet Protocols (IP). The Internet 107 can be an IPv4 or an IPv6 packet-switched based network that utilizes standards derived from the Internet Engineering Task Force, such as RFC 786 (User Datagram Protocol) and related protocols. The Internet 107 can be the public Internet comprising globally routable IP addresses, or a private network that utilizes private IP addresses. Although Internet 107 is illustrated as the globally routable public Internet in FIG. 1, Internet 107 could also be a private Internet that is not globally routable and only accessible to authorized devices and servers. As one example of a private Internet 107, Internet 107 could use private IP addresses for nodes on the network, and in this case Internet 107 could be referred to as an intranet or private network. Alternatively, Internet 107 could be a private network layered on top of the publicly routable Internet via secured and encrypted connections.

Wireless module 101 can access the Internet 107 via the wireless network 102. Wireless module 101 can be a wireless handset, a cellular phone, a smartphone, a tablet computer, a laptop, a computer with a radio, a tracking device, or a circuit board with a radio that accesses wireless network 102. A more detailed depiction of exemplary components of wireless module 101 is included in FIGS. 1b and 1c below. Examples of wireless modules that utilize a wireless WAN such as 2G and 3G networking technologies include the Motorola® G24-1 and Huawei® MC323. Example manufacturers of wireless modules in 2012 include Sierra Wireless® and Telit®.

Wireless network 102 can include a monitored unit 119 associated with wireless module 101. Wireless module 101 can collect data regarding monitored unit 119 and periodically report status to an M2M service provider 108. Examples of monitored unit can include a vending machine, an alarm system, an automobile, a standard 40-foot or 20-foot shipping container. Additional examples of a monitored unit 119 include can also include a pallet for shipping or receiving goods, an individual box of pharmaceuticals, a health monitoring device attached to a person such as a pacemaker or glucose monitor, a gate or door for opening and closing. Other examples exist as well without departing from the scope of the present invention. Wireless module 101 can utilize a sensor to measure and collect data regarding a parameter of monitored unit 119 such as temperature, physical location potentially including geographical coordinates from a Global Positioning System (GPS) receiver, humidity, weight, vibration and/or shock, and similar measurements. If monitored unit 119 is a person or a health monitoring device associated with a person, then relevant health data could be recorded by wireless module 101 in order to transmit to a M2M service provider 108, which could be associated with a health service such as a hospital or doctors office. Wireless module 101 could also periodically record a picture or image on or around monitored unit 119. Monitored unit 119 does not need to have any particular relationship or association with wireless network 102 other than wireless module 101 can be associated with monitored unit 119, and wireless module 101 can communicate with wireless network 102.

As illustrated in FIG. 1, wireless network 102 may include a wireless network firewall 104 and M2M service provider 108 may include a server network firewall 124. These firewalls may be used to secure communication at the data link, network, transport, or application layer of communications using the Internet 107. Firewalls 104 and 124 could perform network address translation (NAT) routing or operate as symmetric firewalls, and selectively filter packets received through Internet 107 in order to secure system 100. The firewall functionality of firewalls 104 and 124 could be of many possible types, including a symmetric firewall, a network-layer firewall that filters inbound packets according to pre-determined rules, an application-layer firewall, or a NAT router, as examples. Although a single firewall 104 and 124 is illustrated in wireless network 102 and M2M service provider 108, respectively, firewall 104 and 124 may each comprise multiple firewalls that operate in conjunction and the combined operation may be considered a single firewall 104 and 124, respectively.

Wireless module 101 may also be associated with a wireless module provider 109. Wireless module provider 109 could be a manufacturer or distributor of wireless module 101, or may also be the company that installs and services wireless module 101 or associates wireless module 101 with monitored unit 119. Wireless module provider 109 preferably generates a wireless module public key 111 and a wireless module private key 112, although these keys associated with wireless module 101 could be obtained or generated from other sources besides wireless module provider 109. The wireless module public key 111 can optionally be signed by a certificate authority 118 in order to confirm the identity of wireless module 101 and/or the identity of wireless module provider 109. Alternatively, wireless module provider 109 may have its own provider public key 120 and provider private key 121. Wireless module provider 109 may have its provider public key 120 signed by a certificate authority 118, and then wireless module provider 109 could sign wireless module public key 111. Thus, the validity of wireless module public key 111 could be checked with wireless module provider 109, and the wireless module provider's 109 provider public key 120 could be checked against certificate authority 118. Other configurations are possible as well without departing from the scope of the present invention.

Public keys and private keys as contemplated in the present invention, including wireless module public key 111 and wireless module private key 112 and additional keys described herein, may leverage established standards for Public Key Infrastructure (PKI). These keys may be formatted according to the X.509 series of standards, such as X.509 v3 certificates, and subsequent or future versions, and these keys may be considered cryptographic keys. The keys can support standards such as the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards. As one example, wireless module public key 111 and wireless module private key 112, as well as the other private and public keys described within the present invention, could be generated using standard software tools such as Openssl, and other tools to generate public and private keys exist as well. Public and private keys as contemplated herein could be recorded in a file such as a *.pem file (Privacy-enhanced Electronic Mail), a file formatted according to Basic Encoding Rules (BER), Canonical Encoding Rules (CER), or Distinguished Encoding Rules (DER), or as text or binary file. Other formats for public and private keys may be utilized as well, including proprietary formats, without departing from the scope of the present invention. As contemplated herein, a key may also comprise either a public key or a private key. A public key as contemplated herein may also be considered a certificate or a public certificate. A private key as contemplated herein may also be considered a security key.

Other configurations besides the one illustrated in FIG. 1 are possible as well. Server 105 could reside within wireless network 102 in a data center managed by wireless network 102. Wireless network 102 could also operate as a wireless module provider 109. Although a single wireless module 101 and server 105 are illustrated in FIG. 1, system 100 could comprise a plurality of these elements. Wireless module 101 could also record sensor data pertaining to a plurality of monitored units 119. Wireless module 101 could be mobile, such as physically attached to a truck or a pallet, and wireless module 101 could connect to a series of different wireless networks 102 or base stations 103 as wireless module 101 moves geographically.

FIG. 1b

Figure 1B:
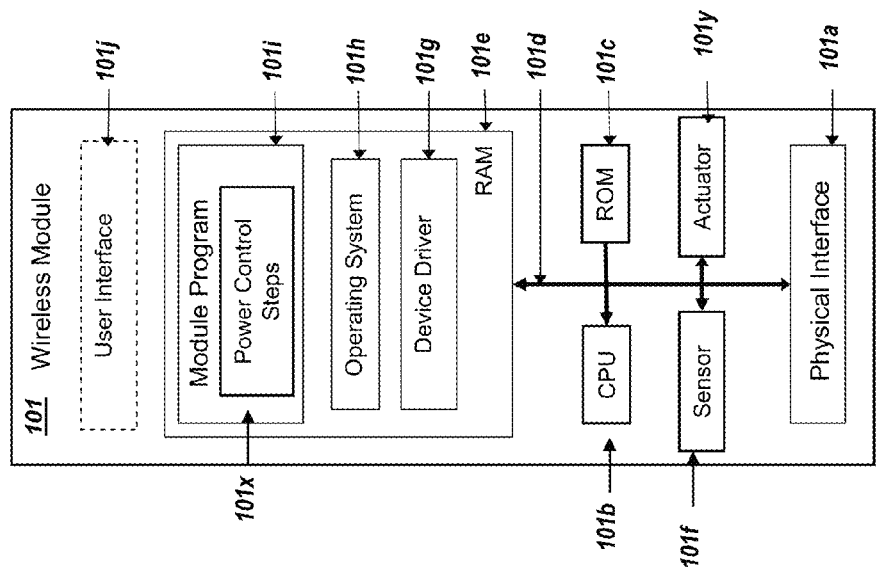
FIG. 1b is a graphical illustration of hardware, firmware, and software components for a wireless module, in accordance with exemplary embodiments.

FIG. 1b is a graphical illustration of hardware, firmware, and software components for a wireless module, in accordance with exemplary embodiments. FIG. 1b is illustrated to include many common components within a wireless module 101. Wireless module 101 may consist of multiple components in order to collect sensor data or control an actuator associated with a monitored unit 119. The physical interface 101a of wireless module 101 may support radio-frequency (RF) communications with networks including a wireless network 102 via standards such as GSM, UMTS, mobile WiMax, CDMA, LTE, and/or other mobile-network technologies. The physical interface 101a may also provide connectivity to local networks such as 802.11 WLAN, Bluetooth, or Zigbee among other possibilities.

The physical interface 101a can include associated hardware to provide the connections such as radio-frequency (RF) chipsets, a power amplifier, an antenna, cable connectors, etc., and additional exemplary details regarding these components are described below in FIG. 1c. Device driver 101g can communicate with the physical interfaces 101a, providing hardware access to higher-level functions on wireless module 101. Device drivers may also be embedded into hardware or combined with the physical interfaces. Wireless module 101 may preferably include an operating system 101h to manage device drivers 101g. The operating systems can also manage other resources such as memory and may support multiple software programs operating on wireless module 101 at the same time. The operating system 101h can include Internet protocol stacks such as a User Datagram Protocol (UDP) stack, Transmission Control Protocol (TCP) stack, a domain name system (DNS) stack, etc., and the operating system 101h may include timers and schedulers for managing the access of software to hardware resources. The operating system shown of 101h can be appropriate for a low-power device with limited memory and CPU resources. An example operating system 101h for wireless module 101 includes Linux, Android® from Google®, Windows® Mobile, or Open AT® from Sierra Wireless®.

A module program 101i may be an application programmed in a language such as C or C++ and could provide functionality to support M2M applications such as remote monitoring of sensors and remote activation of actuators. Module program 101i could also be a software routine, subroutine, linked library, or software module, according to one preferred embodiment. Module program 101i can include power control steps 101x, which can provide the functionality or CPU 101b instructions for the power control steps described in the present invention. Many of the logical steps for operation of wireless module 101 can be performed in software by various combinations of sensor 101f, actuator 101y, physical interface 101a, device driver 101g, operating system 101h, module program 101i, and power control steps 101x. When wireless module 101 is described herein as performing various actions such as acquiring an IP address, connecting to the wireless network, monitoring a port, transmitting a packet, or encrypting or signing a message, specifying herein that wireless module 101 performs an action can refer to software, hardware, and/or firmware operating within wireless module 101 performing the action. Note that wireless module 101 may also optionally include user interface 101j which may include one or more devices for receiving inputs and/or one or more devices for conveying outputs. User interfaces are known in the art and generally are simple for wireless modules such as a few LED lights or LCD display, and thus user interfaces are not described in detail here. As illustrated in FIG. 1b, wireless module 101 can optionally omit a user interface 101j, since no user input may be required for many M2M applications, although a user interface 101j could be included with wireless module 101.

Wireless module 101 may be a computing device that includes computer components for the purposes of collecting data from a sensor or triggering an action by an actuator. Wireless module 101 may include a central processing unit (CPU) 101b, a random access memory (RAM) 101e, and a system bus 101d that couples various system components including the random access memory 101e to the processing unit 101b. The system bus 101d may be any of several types of bus structures including a memory bus or memory controller, a peripheral bus, and a local bus using any of a variety of bus architectures including a data bus. Note that the computer components illustrated for the wireless module 101 in FIG. 1b may be selected in order to minimize power consumption and thereby maximize battery life. In addition, the computer components illustrated for the wireless module 101 in FIG. 1b may also be selected in order to optimize the system for both long periods of sleep relative to active RF communications and also may be optimized for predominantly uplink (i.e. device to network) communications with small packets or messages.

Wireless module 101 may include a read-only memory (ROM) 101c which can contain a boot loader program. Although ROM 101c is illustrated as "read-only memory", ROM 101c could comprise flash memory, erasable-programmable memory (EPROM) or other long-term memory storage chipsets or physical units. ROM 101c could also comprise a nonvolatile memory, such that data is stored within ROM 101c even if no electrical power is provided to ROM 101c. If data can be written to ROM 101c, a primary difference between ROM 101c and RAM 101e may be that reading and writing operations to ROM 101c (such as if ROM 101c is flash memory) can be slower whereas reading and writing operations to RAM 101e may be faster, which may be required for processing sensor signals and securely communicating with a server. For example, module program 101i, power control steps 101x, operating system 101h, or device driver 101g could be stored in ROM 101c when the wireless module is powered off. These components and/or instructions could be and moved into RAM 101e when the wireless module is powered on. In addition, RAM 101e can function as flash memory, such that module program 101i, power control steps 101x, operating system 101h, or device driver 101g remain resident in random access memory even when the mobile module 101 is powered off, or powered off for the first time after wireless module 101 is installed or becomes active in wireless network 102. Note that ROM 101c could be optionally omitted or included in a memory unit within CPU 101b (not shown).

Although the exemplary environment described herein employs ROM 101c and RAM 101e, it should be appreciated by those skilled in the art that other types of computer readable media which can store data that is accessible by a wireless module 101, such as memory cards, local miniaturized hard disks, and the like, may also be used in the exemplary operating environment without departing from the scope of the invention. The memory and associated hardware illustrated in FIG. 1b provide nonvolatile storage of computer-executable instructions, data structures, program modules, module program 101i, and other data for computer or wireless module 101. Note the wireless module 101 may include a physical data connection at the physical interface 101a such as a miniaturized universal serial bus adapter, firewire, optical, or other another port and the computer executable instructions such as module program 101i, power control steps 101x, operating system 101h, or device driver 101g can be initially loaded into memory such as ROM 101c or RAM 101e through the physical interface 101a before wireless module 101 is given to an end user, shipped by a manufacturer to a distribution channel, or installed by a technician. In addition, the computer executable instructions such as module program 101i, power control steps 101x, operating system 101h or device driver 101g could be transferred wirelessly to wireless module 101. In either case (wired or wireless transfer of computer executable instructions), the computer executable instructions such as module program 101i, power control steps 101*x*, operating system 101*h*, or device driver 101*g* could be stored remotely on a disk drive or optical disk (both not shown).

A number of program modules may be stored RAM 101*e*, ROM 101*c*, or possibly within CPU 101*b*, including an operating system 101*h*, device driver 101*g*, an http client (not shown), a DNS client, and related software. Program modules include routines, sub-routines, programs, objects, components, data structures, etc., which perform particular tasks or implement particular abstract data types. Aspects of the present invention may be implemented in the form of a module program 101*i* and/or power control steps 101*x* which are executed by the mobile device 101 in order to provide remote monitoring and/or control via an actuator 101*y*. In addition, the module program 101*i* and/or power control steps 101*x* can include routines, sub-routines, and similar components to support secure and bandwidth and radio-frequency (RF) efficient communication with a server 105 utilizing the techniques described in the present invention. Further, the module program 101*i* and/or power control steps 101*x* can perform the various actions described in the present invention for the wireless module through instructions the module program 101*i* and/or power control steps 101*x* provide to the CPU 101*b*.

A user may enter commands and information into wireless module 101 through an optional user interface 101*j*, such as a keypad, keyboard (possibly miniaturized for a mobile phone form-factor), and a pointing device. Pointing devices may include a trackball, an electronic pen, or a touch screen. A user interface 101*j* may also include a display (not shown) such as a wireless module screen. A display may also be connected to system bus 101*d* via an interface. The display can comprise any type of display devices such as a liquid crystal display (LCD), a plasma display, and an organic light-emitting diode (OLED) display. Wireless module 101 may also include a camera (not shown) connected to or integrated with wireless module 101 through a physical interface 101*a*, and the camera can comprise a video camera for the wireless device 101 to collect sensor data that includes video or images. The camera (not shown) can be a CCD (charge-coupled device) camera, a CMOS (complementary metal-oxide-semiconductor) camera, or a similar device to collect video input. Other arrangements could be used as well, without departing from the invention.

FIG. 1*c*

Figure 1D:
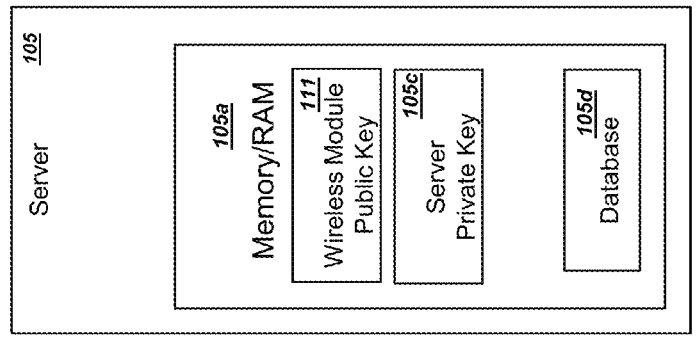
FIG. 1d is a graphical illustration of the components within a server that communicates with the wireless module, in accordance with exemplary embodiments.
Figure 1C:
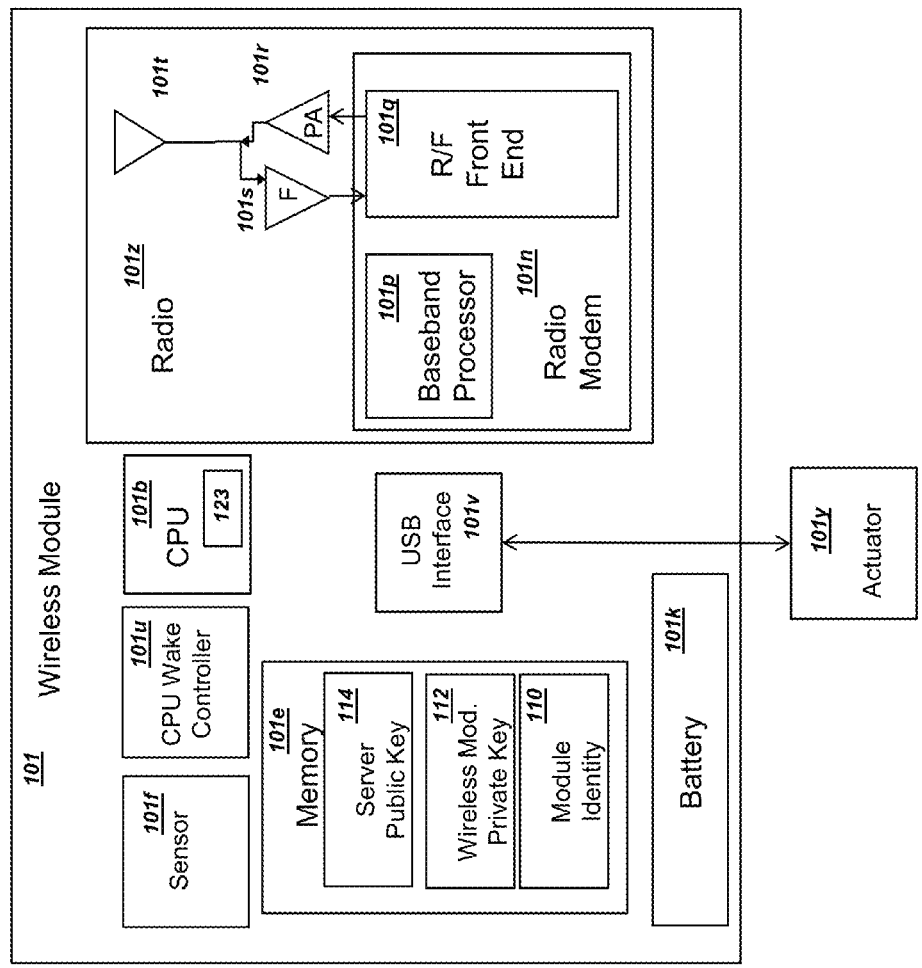
FIG. 1c is a graphical illustration of the components within a wireless module, in accordance with exemplary embodiments.

FIG. 1*c* is a graphical illustration of the components within a wireless module, in accordance with exemplary embodiments. FIG. 1*c* is illustrated to show the combination of components useful for leveraging the efficient and secure communication techniques described in the present invention. In addition to the components illustrated in FIG. 1*b* above, wireless module 101 can include a battery 101*k*, a server public key 114, a wireless module private key 112, a connection to an actuator 101*y*, a USB interface 101*v*, a CPU wake controller 101*u*, and a radio 101*z*.

The CPU 101*b* can comprise a general purpose processor appropriate for the low power consumption requirements of a wireless module 101, and may also function as a microcontroller. In a preferred exemplary embodiment, the CPU 101*b* is responsible for maintaining a state machine for network and transport layer commands with wireless network 102, and managing the overall connection of radio 101*z* with wireless network 102. CPU 101*b* can include additional elements not shown, such as registers, cache memory, an arithmetic logic unit (ALU), which performs arithmetic and logical operations, and a control unit (CU), which extracts instructions from memory and decodes and executes them, calling on the ALU when necessary. The CPU 101*b* wake and dormant or sleep states may be controlled by a CPU wake controller 101*u* to put the wireless module in a dormant state in order to conserve battery life in battery 101*k* when sensor measurements, actuator control, or radio communications are not needed. The CPU wake controller 101*u* could optionally be integrated into CPU 101*b*. The CPU wake controller 101*u* can also include a timer to periodically wake the CPU 101*b* in order to perform sensor measurements or communicate with wireless network 102 or server 105.

Note that CPU wake controller 101*u* can monitor sensor 101*f* in order to determine a wake condition for CPU 101*b*, wherein the CPU 101*b* remains dormant until sensor 101*f* reads a state that requires sending a message to a server 105. An example could be sensor 101*f* comprising a shock and vibration detector or a temperature measuring device such as a thermocouple, and other examples exist as well. The CPU wake controller 101*u* can leave CPU 101*b* in a dormant state until a certain threshold of shock and vibration or temperature is recorded by the sensor 101*f*, and in this manner battery 101*k* can be conserved so that CPU 101*b* wakes when a threshold sensor measurement or an alarm condition is reported. The exemplary certain threshold of shock and vibration or temperature recorded by the sensor 101*f* can also comprise an alarm condition. When CPU 101*b* is dormant, CPU wake controller 101*u* can monitor a voltage level output by sensor 101*f*, and once a threshold voltage level is read by CPU wake controller 101*u*, CPU wake controller 101*u* can change CPU 101*b* from the dormant state to an active state in order to run a module program 101*i*. Even without an alarm condition, CPU wake controller 101*u* can periodically wake CPU 101*b* to collect sensor data, connect to wireless network 102, and send sensor data to server 105.

CPU 101*b* can include one or more cores of a processor, where each core is an independent actual central processing unit, and the cores can be the units that read and execute program instructions. The instructions can be ordinary CPU instructions such as add, move data, and branch. A dormant state of CPU 101*b* can comprise a sleep state where a power level used by a core in the processor is less than 0.010 milliwatts during a one second measurement sample, such as when the power supply is essentially removed from the core but power is supplied to volatile memory within the CPU, such as cache 123, in order to allow a rapid waking of the CPU 101*b* or core. In other words, the sleep state can allow volatile memory such as cache 123 in the CPU 101*b* to retain data during sleep. The dormant state of CPU 101*b* can alternatively comprise a shutdown state where a power level used by the processor is less than 0.002 milliwatts during the one second measurement sample, such as when the power supply to the core and the volatile memory, including cache 123, is removed. In this shutdown state, CPU 101*b* will lose data in the volatile memory, requiring more steps and time in order to wake and restore CPU 101*b* functionality to an operating system 101*h*. The dormant state of CPU 101*b* may comprise comprises (i) all cores in the processor being simultaneously in a shutdown state and (ii) a random access memory (RAM) 101*e* in the processor, such as cache 123, retaining data. The shutdown state of the CPU 101*b* could comprise RAM, including a processor cache 123, being flushed. If the RAM or processor cache 123 is flushed, then additional time and energy may be required to repopulate the RAM or processor cache when the CPU 101*b* returns to the active state.

Sensor 101*f* could be a device to collect environmental data or data regarding a monitored unit 119. Sensor 101*f* could collect data such as temperature, humidity, pressure, visible light levels, radiation, shock and/or vibration, voltage, current, weight, pH levels, orientation/motion, or the presence of specific chemicals. Sensor 101f could also collect biometric data such as heart rate, glucose levels, body temperature, or other health measurements and in this case monitored unit 119 could be a person. The sensor 101f can provide data to the CPU 101b in the form of analog or digital data, which can be communicated via a system bus 101d or physical interface 101a and other electrical interfaces are possible as well. A sensor measurement can comprise the analog or digital data collected by CPU 101b from sensor 101f. A sensor measurement can include processing of the analog or digital data input CPU 101b by sensor 101f, such as averaging over time, using mathematic formulas to convert the raw data from sensor 101f into a usable form. Wireless module 101 may also collect sensor data or sensor values using a sensor 101f and CPU 101b, where the data or values are derived from electrical signals output by a sensor 101f. A sensor measurement can comprise the sensor data or sensor values. Although a single sensor 101f is shown in FIG. 1c, a wireless module could include multiple sensors. In addition, although sensor 101f is shown as integrated into wireless module 101, sensor 101f could be external to wireless module 101.

Actuator 101y could be a device to control a parameter or state for a monitored unit 119, such as changing a voltage or current, activating a switch or relay, turning on or off a microphone or speaker, activating or deactivating a light, and other examples are well known in the art. Actuator 101y could be controlled by wireless module 101 via a digital or analog output from CPU 101b, which could also be transmitted or sent via system bus 101d or a physical interface 101a. Although actuator 101y is illustrated as external to wireless module 101 in FIG. 1c, actuator 101y could also be internal to wireless module 101, and wireless module 101 could include multiple actuators 101y. Sensors and actuators are well known to those of ordinary skill in the art, and thus are not described in detail herein.

Note that wireless module 101 can include a Universal Serial Bus (USB) interface 101v, which could provide a general and standards-based interface for external connection to a wide variety of sensors 101f and actuators 101y. Wireless module 101 could also obtain power or recharge the battery 101k through the USB interface 101v. Software programs or instructions to wireless module 101 could be provided locally through USB interface 101v. Module program 101i, operating system 101h, or wireless module private key 112 could be loaded into wireless module 101 via USB interface 101v. In order to support the small form factor of a wireless module 101, the USB interface 101v could preferably utilize either a micro-USB or mini-USB physical interface. Although a USB interface 101v is illustrated in FIG. 1c, alternative interfaces for external communication could be provided, such as a Joint Test Action Group (JTAG) connection, optical, or a proprietary interface such as a "Lightning" connection from Apple, Inc.

In accordance with exemplary embodiments, radio 101z includes an antenna system 101t, a power amplifier 101r, an RF filter 101s, and a radio modem 101n. Radio modem 101n includes a RF front end 101q, and a baseband processor 101p. Although not illustrated in FIG. 1c, CPU 101b could be combined with the baseband processor 101p, which is commonly found in commercial mobile phone handsets. The antenna system 101t of wireless module 101 can receive and transmit radio signals in the operating frequency ranges for wireless module 101. Although not illustrated, separate antennas for reception and transmission could be implemented, and even multiple antennas could be used. The antenna system 101t is shown as integrated within wireless module 101 according to a preferred exemplary embodiment, but the antenna system 101t could optionally be connected to the wireless module 101 externally, to support a greater range in rural areas or higher power transmission levels, for instance. In order to support multiple mobile network standards and frequencies, the antenna system 101t can preferably be a tunable antenna, which can change resonance frequencies for effective transmission and reception over a range frequency bands, such as GPRS 900 Mhz, UMTS 850 Mhz, LTE 700 Mhz. Radio 101z can also support wireless LAN standards such as WiFi, Bluetooth, and Zigbee, or similar wireless LAN standards. The baseband processor 101p can be selected to support the desired network standards such as GPRS, UMTS, LTE and the appropriate frequency band, such at 700 Mhz (LTE), 900 or 1800 Mhz (GPRS), and 2100 Mhz (UMTS). The baseband processor 101p can also support WiFi, the IEEE standard IEEE 802.15.4, or Bluetooth, in addition to other wireless LAN technologies.

In terms of flow of signals for received data such as the beginning of a packet received by wireless module 101, antenna system 101t can receive radio signals from a base station 103. The radio signals could include the data or packet received. Filter 101s can amplify the signal-to-noise ratio in the desired frequency range of communications by filtering out unwanted signals. For example, if the preferred frequency range of wireless module 101 was to support 2G EDGE technology in the 850 Mhz range, filter 101s could be selected to pass 850 Mhz signals, while significantly attenuating signals at 900 Mhz. The filtered radio frequency (RF) signal would pass to RF front end 101q as illustrated in FIG. 1c. RF front end 101q can convert the RF signal to an intermediate frequency (IF), such as In-Phase (I) and Quadrature (Q) signals. Baseband processor 101p can convert the I and Q signals output from radio front end 101q to baseband digital signals, which can be processed by CPU 101b. The connection between baseband processor 101p and radio front end 101q could be either analog or digital. According to an exemplary preferred embodiment illustrated in FIG. 1c, when receiving RF signals from the wireless network 102, the baseband processor 101p preferably converts the intermediate frequency as an analog input into a digital baseband output for further processing by the CPU 101b for received radio signals.

The RF filter 101s can provide bandpass filtering and enhances the signal-to-noise ratio of the radio signals received by the antenna system 101t within the operating frequency range of the wireless module 101, and the RF filter 101s could comprise of SAW filters, for example. The RF front end 101q manages the conversion of signals between the radio signals and intermediate frequencies. For the processing of received radio frequency input, the RF front end 101q may include low-noise amplifiers, band-pass filters, and a matching circuit. For the processing of transmitted signals, the RF front end 101q may include a phase detector, a voltage controlled crystal oscillator, amplifiers, and a mixer. The RF front end 101q and radio 101z can support wireless standards appropriate for the operating location and operating needs of wireless module 101 and wireless network 102 such as GPRS, EDGE, UMTS, LTE, WiMAX, and/or CDMA 2000. In general, the radio components of the RF front end 101q and radio 101z are well known to one of ordinary skill in the art, and the present invention leverages this widespread commercial use and knowledge of an RF front end, baseband processing, and a radio in a novel manner, such as to minimize the energy usage of an RF front end 101q, a power amplifier 101r, and/or a radio 101z when a wireless module 101 communicates with a server 105, by minimizing the bandwidth required while also maintaining a highly secured system.

In terms of flow of signals for transmissions or sending data or messages from wireless module 101 to the wireless network 102, CPU 101b send signals such as the beginning of a packet transmitted or sent to the baseband processor 101p, preferably using digital signals on the system bus 101d. Although not illustrated in FIG. 1b or 1c, baseband processor 101p is also preferably connected to a system bus 101d. Baseband processor 101p converts the signals received from CPU 101b into an intermediate frequency (IF) such as analog In-Phase (I) and Quadrature (Q) signals. The analog signals output from the baseband processor 101p for transmitting data are sent to the RF front end 101q for conversion into the radio frequencies. RF front end 101q can convert the IF frequencies to RF frequency, and send them to the power amplifier 101r. The power amplifier 101r amplifies the transmit signals received from the RF front end 101q before transmission through the antenna system 101t. Base station 103 can receive the RF signals sent by wireless module 101, which can include the packet transmitted or sent.

When operating in a wireless LAN, radio 101z can function as either a client/node or a base station to support communication from other wireless nodes. When radio 101z functions as a base station, wireless module 101 can operate as a gateway, providing Internet access to nodes in the LAN. Radio 101z can simultaneously function as a base station in a wireless LAN such as WiFi and a client/subscriber on a wireless WAN such as a PLMN. Radio 101z can be selected to support multiple different wireless LAN technologies in addition to WiFi, such as the IEEE 802.15.4 standard or Bluetooth. If radio 101z supports IEEE 802.15.4, then wireless network 102 could be a Zigbee network, a ISA100.11a standards based network, or a 6LoWPAN network as described by IETF RFC 4944.

In accordance with exemplary embodiments, wireless module 101 can store wireless module private key 112, server public key 114, and module identity 110 in memory/RAM 101e during operation, such as when CPU 101b is active and the wireless module 101 is connected to wireless network 102 during data transmissions. Wireless module private key 112 and module identity 110 preferably are recorded in nonvolatile memory such as flash or ROM 101c, so that wireless module 101 has access to its private key and identity after installation, including times when the battery 101k has been fully drained or removed from wireless module 101. Wireless module private key 112 and module identity 110 could be written into nonvolatile memory upon manufacture or distribution of wireless module 101. The CPU 101b preferably moves wireless module private key 112 and module identity 110 from nonvolatile memory into volatile memory before transmissions are sent to wireless network 102, in order to speed computations. As a minimum, wireless module private key 112 and module identity 110 will need to be loaded into registers of CPU 101b during computations that require wireless module private key 112 and module identity 110, and this move of the data into registers of CPU 101b constitutes a move of wireless module private key 112 and module identity 110 into volatile memory. Registers in CPU 101b cache 123 would be considered volatile memory, since data recorded in the registers but nowhere else would be lost upon (i) the removal of power from CPU 101b or (ii) CPU 101b entering a shutdown state.

Module identity 110 is preferably a unique identifier of wireless module 101, and could comprise a number or string such as a serial number, an international mobile subscriber identity number (IMSI), or an Ethernet MAC address. Module identity 110 can function as a basic identifier for services from M2M service provider 108 or server 105 in order to properly identify wireless module 101 among a plurality of wireless modules. Wireless module private key 112 could be unique to wireless module 101 and uniquely associated with module identity 110, according to a preferred embodiment. Alternatively, a group of wireless modules 101 could share a common wireless module private key 112, which would simplify the complexity of key management and distribution, but would also potentially add additional security risks in case wireless module private key 112 was compromised on one of the multiple wireless modules that could share the common private key.

Server public key 114 in wireless module 101 could be obtained from downloading the key over the Internet, or optionally also written into nonvolatile memory of wireless module 101 upon manufacture or distribution. Server public key 114 could be obtained using a domain name or Internet address that is recorded in nonvolatile memory upon the configuration of wireless module 101, such as during installation or distribution, and wireless module 101 could fetch the key upon connecting to wireless network 102. Server public key 114 can be the public key associated with server 105 or M2M service provider 108. Although a single server public key 114 is illustrated in FIG. 1c, wireless module 101 could record a plurality of server public keys 114. Server public key 114 can optionally be signed by a certificate authority 118 in FIG. 1, such that when wireless module 101 communicates with server 105, wireless module 101 can have a high level of certainty that server 105 is properly identified and belongs to M2M service provider 108, as opposed to being an imposter or part of a "man in the middle" attack.

Note that the term "public key" as contemplated herein includes a key that is shared with other elements, where the other elements may not be under the direct control of the same entity that holds the corresponding private key. However, the term "public key" as used herein does not require that the public key is made available to the general public or is publicly disclosed. An additional layer of security may be maintained in the present invention by preferably only sharing public keys on a confidential basis with other entities. For example, wireless module public key 111 may be created by wireless module provider 109 when generating wireless module private key 112, and wireless module provider 109 may share wireless module public key 111 with M2M service provider 108 in order to record wireless module public key 111 in server 105, but wireless module provider 109 preferably does need to share wireless module public key 111 with other entities, such as wireless network 102 or the Internet 107.

Although a single public key and private key for (i) wireless module 101 and (ii) server 105 are illustrated in FIGS. 1c and 1d below, respectively, both wireless module 101 and server 105 may each utilize several different public keys and private keys. As one example, wireless module 101 may record a first private key 112 used for a digital signature and a second private key 112 for decryption. In this example, a first wireless module public key 111 could be utilized to verify the digital signature, and a second wireless module public key 111 could be utilized to encrypt messages sent to wireless module 101. Similarly, either wireless module 101 or server 105 may use private key 112 or 105c, respectively, to derive secondary private and public keys (not shown). The secondary private and public keys could be utilized for specific tasks for functions. Wireless module 101 could utilize a first pair of secondary private and public keys (corresponding to key 112 and key 111) to communicate with a first server 105c and a second pair of secondary private and public keys to communicate with a second server 105c. Likewise, M2M service provider 108 illustrated in FIG. 1a could utilize a first pair of secondary private and public keys with a first server 105, and a second pair of secondary private and public keys with a second server 105. As contemplated herein, the term "private key" can also refer to secondary keys derived from a private key such as key 112, and the term "public key" can also refer to (i) secondary, shared keys derived from a private key such as key 112, or (ii) secondary, shared keys associated with a public key such as key 111. Other possibilities exist as well for a key to represent derived or associated keys without departing from the scope of the present invention.

FIG. 1d

FIG. 1d is a graphical illustration of the components within a server that communicates with the wireless module, in accordance with exemplary embodiments. Server 105 can include a database 105d, a server private key 105c, and a wireless module public key 111, which are illustrated as located in RAM memory 105a in FIG. 1d, but could also be stored in a disk drive associated with server 105 (not shown). Since server 105 can preferably support communications with a plurality of wireless modules 101, server 105 can utilize database 105d to store and query data regarding a plurality of wireless modules 101, monitored units 119, and the overall M2M service. The server 105 can store a plurality of wireless module public keys 111 associated with a plurality of wireless devices in the database 105d, and the server 105 can use the module identity 110 of wireless device 101, received in a message such as a UDP packet, to query the database 105d and select the public key 111 associated with the wireless device 101. Examples of database 105d could include MySQL, Oracle, hash tables, or text files. The server private key 105c and wireless module public key 111 can be utilized by server 105 to secure communication with wireless module 101, as described in FIG. 8 through FIG. 10 below.

Server 105 may be a general purpose computer connected to Internet 107 via a wired connection such as Ethernet or a fiber optic connection. Server 105 may comprise components similar to a wireless module 101 illustrated in FIG. 1b, except with higher-end, greater power, and higher capacity components. Thus, although not illustrated in FIG. 1d, server 105 may include a physical interface 101a, a CPU 101b, bus 101d, RAM 101e, operating system 101h, and a user interface 101j. The operation of these components within a server 105 can be similar to the operation and functionality of these components depicted and described in connection with FIG. 1b. Server 105 may also comprise a collection of individual computers, where the individual computers could be either centrally located or geographically dispersed, but the individual computers may function in a coordinated manner to operate as a server 105. Server 105 may be a "virtualized" server, with computing resources shared with other processes operating on a computer.

FIG. 2

Figure 2:
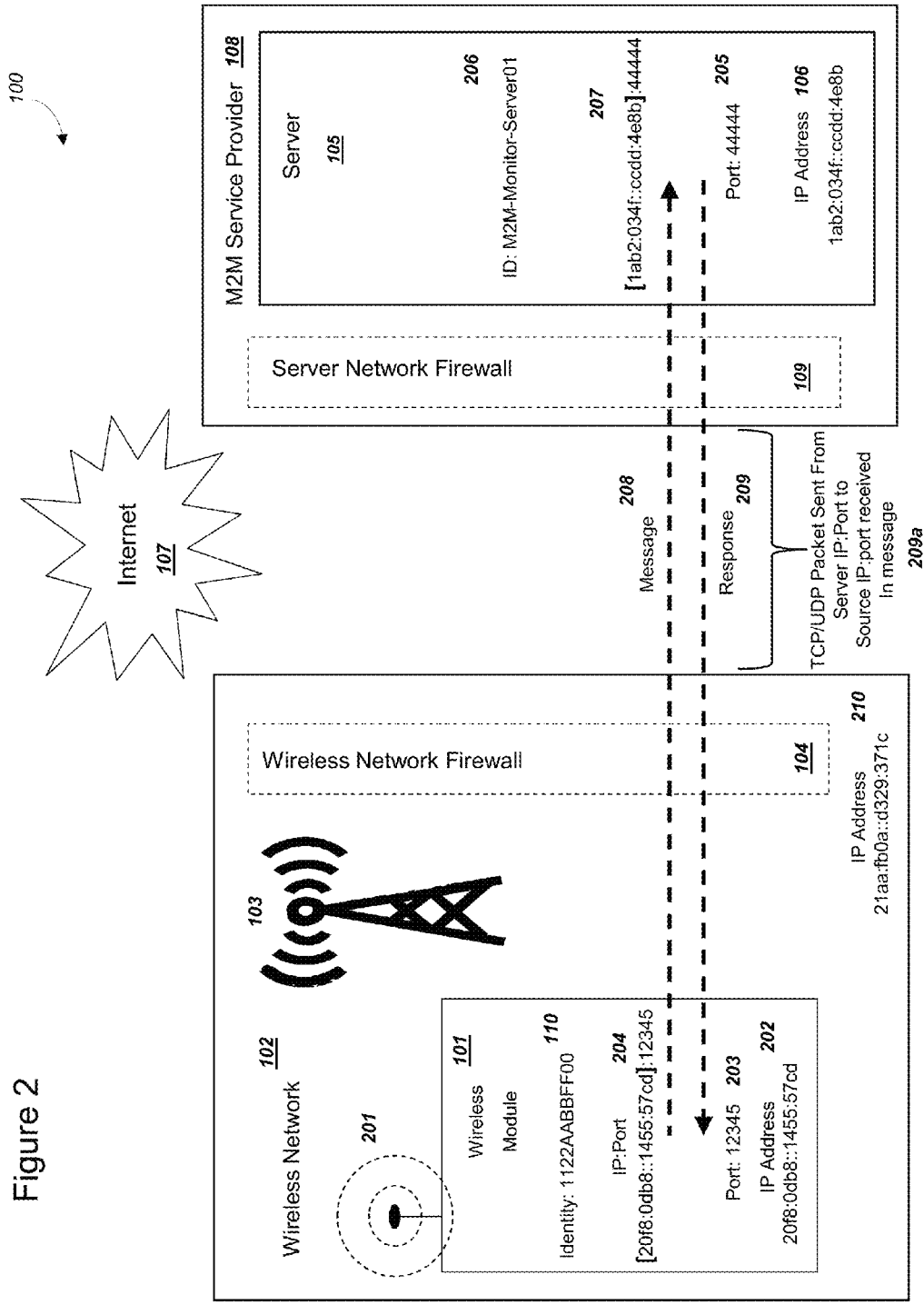
FIG. 2 is a graphical illustration of an exemplary system, where a wireless module sends a message to a server, and where the server responds to the message, in accordance with exemplary embodiments.

FIG. 2 is a graphical illustration of an exemplary system, where a wireless module sends a message to a server, and where the server responds to the message, in accordance with exemplary embodiments. System 100 as illustrated in FIG. 2 includes RF signals 201, module IP address 202, port number 203, module IP:port 204, server port number 205, server ID 206, server IP:port number 207, message 208, response 209, and wireless network firewall address 210. Wireless module 101 can wake from a dormant state in order perform (i) remote and automated monitoring and (ii) control functions such as collecting a sensor 101f measurement, communicating with server 105, and controlling an actuator 101y. If wireless module 101 is connected to land-line power or a long-lasting power source such as a generator or solar power, then wireless module may remain in an active state and bypass the dormant state.

Upon waking from the dormant state and starting communication with a server 105, wireless module 101 can begin transmitting RF signals 201 to base station 103. Although the antenna system 101t may emit some RF signals when wireless module 101 is not transmitting, such as emitting thermal noise, (i) an active state of radio 101z or (ii) the transmission of RF signals 201 could comprise emitted RF power greater than 1 milliwatt as radiated by antenna system 101t. The wireless module can acquire an IP address 202 from the wireless network 102. IP address 202 is illustrated as being an IPv6 address, but IP address 202 could also be an IPv4 address. IP address 202 could also be a subset of IPv6 addresses such as the last 32 or 64 bits in a full 128 bit IPv6 address, and wireless network 102 could append the beginning 96 or 64 bits, respectively, of the IPv6 address when wireless module 101 sends packets to the Internet 107.

In order to transmit or send data from wireless module 101 to server 105, wireless module 101 can use module program 101i to collect data from a sensor 101f in order to update server 105. Module program 101i can request a port number 203 from operating system 101h in order to have a source IP:port for sending data using IP protocols such as TCP and UDP. The terminology "IP:port" as described herein refers to combining an IP address with a port number. Wireless module IP address 202 and port number 203 can be combined to form IP:port number 204. IP:port number 204 can be utilized as a source IP:port number for packets transmitted from wireless module 101, as well as a destination IP:port number for packets received by wireless module 101, when communicating with server 105. The UDP protocol is specified an IETF RFC 768 and related and subsequent standards. As contemplated herein, the UDP Lite protocol can be preferably considered a subset of the UDP protocol or alternatively may be considered a distinct protocol.

In order to utilize Internet 107, wireless module 101 may also need a destination IP address and port number in order to send packets to server 105. Before sending data to server 105, wireless module 101 preferably retrieves server IP address 106 and server port number 205 from RAM 101e. Server IP address 106 could be recorded in RAM 101e via (i) a DNS query using server name 206 or (ii) queries to M2M service provider 108 or wireless network 102. CPU 101b may copy server IP address 106 and server port number 205 into volatile memory such as a register for processing to send a packet to server 105. Server name 206 could also be a server identity. (A) Server IP address 106 or server name 206 and (B) server port number 205 could be recorded in a nonvolatile memory such as ROM 101c or a flash memory so that wireless module 101 can store the proper destination of packets transmitted even when wireless module is dormant or shutdown, which avoids the processing and bandwidth requirements of obtaining server IP address 106 and server port number 205 every time the wireless module 101 wakes from the dormant or shutdown state. (A) Server IP address 106 or server name 206 and (B) server port number 205 could also be recorded in a configuration file, which is periodically received by wireless module 101 between a plurality of wake and dormant states. Server IP address 106 and server port number 205 can be combined into a server IP:port number 207.

After collecting data from a sensor, wireless module 101 can send a packet from IP:port 204 to IP:port 207, and the packet could comprise a message 208 that may include the data from the sensor. Note that message 208 does not need to include sensor data, and message could potentially be a periodic registration message or keep-alive message. Message 208 could also include multiple sensor measurements gathered between active RF signals 201, such that wireless module 101 wakes every 10 minutes to collect sensor data, but wireless module 101 only activates radio 101z every 30 minutes in order to send the multiple sensor measurements in one message 208. Other possibilities and combinations for frequency of sensor measurements and RF activation exist as well without departing from the scope of the present invention. Also, as contemplated herein, the term "sensor measurement" can refer to data associated with or derived from a sensor 101f. A sensor measurement, as described below including step 502 of FIG. 5, can comprise a string containing data regarding a parameter of a monitored unit 119 and collected by a sensor 101f. The sensor measurement as sent in a message 208 can also represent a string (alphanumeric, binary, text, hexadecimal, etc.), where the string comprises a transformation or processing of sensor data collected by a CPU 101b, such including formatting, compressing, or encrypting, etc. of sensor data.

In order to minimize bandwidth and time required for RF signals 201 to be active, wireless module 101 can send the message 208 as a single UDP datagram in accordance with a preferred exemplary embodiment. The single UDP datagram can preferably be the only packet sent from wireless module 101 to server 105 or M2M service provider 108 during a wake state for the wireless module 101 when the radio 101z is active and transmitting, such as in a radio resource control (RRC) connected state. In other words, according to this preferred exemplary embodiment, the message 208 sent by wireless module 101 can preferably be the only message or packet sent by the wireless module to the server 105 between dormant periods of either (i) a "radio off" state 505b as depicted and described in connection with FIG. 6 below, and (ii) when the radio 101z is detached from the wireless network or shutdown. In this manner, both battery 101k is conserved and utilization of valuable RF spectrum is reduced. Message 208 could also comprise a series of associated UDP messages.

The UDP datagram for message 208 could also be formatted according to the UDP Lite protocol, as specified in IETF RFC 3828, which is also incorporated by reference herein. The term "UDP Lite" described in the present invention may also refer to any connectionless protocol widely supported on Internet 107 where checksums may be disabled, thereby supporting the transfer of bit errors within a datagram. The advantages of UDP over TCP is that UDP can be quickly sent, while TCP requires a "handshake" with the server which requires more time and bandwidth, which would utilize more energy from battery 101k. Weak or "noisy" RF signals between wireless module 101 and wireless network 102 may degrade or slow TCP transmissions, resulting in unwanted and unnecessary retransmission of individual TCP messages in the standard TCP "handshake" and connection close procedures. Also, the sensor data may be relatively small, such as a dozens of bytes, and UDP can provide significantly less signaling overhead than TCP, especially with small messages for the duration of the session. However, some M2M applications may prefer or require TCP and in this case message 208 can be formatted according to TCP. Thus, according to a second exemplary embodiment, both message 208 and response 209 can be TCP messages. In this second exemplary embodiment, message 208 and response 209 could each comprise a series of TCP messages such as a TCP SYN, SYN ACK, ACK, ACK w/data, FIN ACK, etc.

According to a preferred exemplary embodiment, wireless module 101 sends the same sensor data in multiple copies of the same UDP packet. Each of the multiple copies of the same UDP packet can also optionally be formatted according to the UDP Lite protocol. As one example, wireless module sends three identical copies of the UDP Lite packet that include the same sensor data. The benefit of sending three copies of UDP Lite include (i) the RF signals 201 received by the base station 103 could include bit errors, which could result in a regular (RFC 768) UDP packet being dropped, since a bit error could result in a UDP checksum mismatch, as received and processed by wireless network 102. Note that the use of checksums is mandatory in IPv6, and thus checksums cannot be disabled in IPv6. With UDP Lite packets transmitted by wireless module 101, where the mandatory checksum for IPv6 can cover the packet header, wireless network 102 can forward all packets received, potentially including bit errors, to server 105 over the Internet 107.

Server 105 can receive the multiple copies of the UDP Lite packets, which could include bit errors received, and server 105 could compare or combine the multiple copies or each individual UDP Lite packet in order to remove bit errors. Note that UDP Lite is not required, and wireless module 101 could send the message using a single UDP packet, or multiple copies of a regular UDP (i.e. non UDP Lite) packet. However, using UDP Lite with multiple packets sent can provide benefits such as if the sensor data is encrypted in the packet, then a single bit error would normally break the receiver's ability to decipher the data using a public key, unless the encrypted data was channel coded and the channel coding could recover from the bit error in order to present an error-free input of the encrypted data to a deciphering algorithm.

Further, between periods of sleep when the wireless module 101 becomes active and transmits RF signals 201, wireless module 101 could send the sensor data in a single UDP Lite packet where the packet includes channel coding, which can also be referred to forward error correction. Note that since large segments of message 208 could include encrypted or hashed data, those segments may not be appropriate for compression since the data is often similar to random strings which have limited information entropy. Channel coding techniques for the data in message 208 could include block codes and convolution codes. Block codes could include Reed-Solomon, Golay, BCH, Hamming, and turbo codes. According to a preferred exemplary embodiment, data within message 208 is sent as a UDP Lite packet using a turbo code to correct multiple bit errors within a packet or datagram sent by wireless module 101 and received by server 105.

In system 100 illustrated in FIG. 2, server 105 can use IP:port 207 to receive the packet from wireless module 101 and sent from source IP:port 204 to IP:port 207, and the packet could comprise a message 208 that may include the data from a sensor associated with wireless module 101 or monitored unit 119. Note that server 105 can use IP:port 207 to receive a plurality of messages 208 from a plurality of wireless modules 101. Server 105 preferably listens for UDP packets on IP:port 207, although TCP packets could be supported as well. If server 105 receives multiple copies of the same UDP packet from wireless module 101, server 105 preferably includes a timer. The timer can start when the first packet in the series of same packets is received, and packets received outside the expiration of the timer would be discarded. In this manner, server 105 would be protected from replay attacks. The timer could be a relatively short value such as less than 5 seconds.

After receiving the message 208 and processing the message according to the techniques described below, server 105 can send a response 209. Since wireless module 101 may belong to a wireless network 102 which includes a firewall 104, the source IP:port of the message 208 received could be different from the source IP:port 204 utilized by wireless module 101. The source IP:port in message 208 could be changed if firewall 104 performs network address translation (NAT), as one example. Server 105 may not readily know if a NAT translation has been performed on the message 208. Alternatively, firewall 104 may not perform NAT, but could still block data from the Internet 107 which does not properly match the firewall rules. As one example, firewall 104 could be a symmetric firewall, where only packets from IP:port 207 to IP:port 204 are allowed to pass the firewall after message 208 has been sent by wireless module 101. In either case, where firewall 104 may or may not perform NAT routing, server 105 preferably sends the response 209 from the server IP:port 207 to the source IP:port it receives in message 208. According to a preferred exemplary embodiment, response 209 is a UDP packet sent from server 105 with (i) a source IP:port 207 and (ii) a destination IP:port equal to the source IP:port received in message 208, as illustrated in packet 209*a*. In this manner, the UDP packet can traverse a firewall 104, if firewall 104 is present. If firewall 104 is present and performs NAT routing, then firewall 104 can receive the response 209 and change the destination IP address and port within response 209 to equal IP:port 204.

FIG. 3

FIG. 3 is a simplified message flow diagram illustrating exemplary steps for a wireless module to connect to a wireless network, send sensor data to a server, and disconnect from the wireless network, in accordance with exemplary embodiments. FIG. 3 is illustrated according to the 3G specification and includes a connect procedure 301, 3G Dedicated Transport Channel (DCH) tail 302, a 3G Forward Access Channel (FACH) tail 303, and a 3G public land mobile network (PLMN) 304. As illustrated, the wireless module 101 may also be referred to as User Equipment. The 3G PLMN 304 can be a wireless network 102 as illustrated in FIG. 1. FIG. 3 illustrates the significant number of steps required for a wireless module to connect with a wireless network 102, using a connect procedure 301, and connect procedure 301 is illustrated according to 3G standards. The connect procedure 301 can include an radio resource connect request to a radio network controller (RNC), messages between the RNC and a Node B (which may function as a base station 103), radio resource connection setup messages from the RNC back to the wireless module 101, security mode commands, etc. The steps that wireless module 101 can utilize for a connect procedure 301 may also refer to conducting the connect procedure 301, as contemplated herein.

After the connect procedure 301 is complete, the wireless module 101 can send message 208 and receive response 209. The message 208 could be a single UDP datagram, multiple copies of the same UDP datagram, a single UDP Lite datagram, multiple copies of the same UDP Lite datagram, a series of TCP messages, or similar protocols to encapsulate and transfer sensor data to a server 105 over the Internet 107. According to a preferred exemplary embodiment, message 208 could also be sent as more than one UDP Lite datagram, wherein the sensor data is channel coded across the series of multiple UDP Lite packets, and the sensor data could be fully recovered by a server 105 even with the loss of a UDP Lite packet in the series. The response 209 could be an acknowledgement of the successful receipt of the data contained in message 208. Response 209 could also be sent from the server 105 to wireless module 101 as a single UDP datagram, multiple copies of the same UDP datagram, a single UDP Lite datagram, multiple copies of the same UDP Lite datagram, a series of TCP messages, or similar protocols to encapsulate and transfer sensor data to a server 105 over the Internet 107.

After the wireless module 101 receives the response 209, according to conventional technology, the wireless module can enter the 3G DCH tail 302 period. This represents a period when the wireless module is actively connected to the wireless network, but no further data is being transferred. Note that the DCH tail period is a time when battery 101*k* resources are not efficiently utilized, because the wireless module 101 must remain sufficiently powered to remain connected to the wireless network but no data is being transferred. The duration of the 3G DCH tail may vary according to settings within the wireless network 102, but typically is several seconds. Upon the ending of the 3G DCH tail period, the wireless module can enter the 3G Forward Access Channel (FACH) tail 303 period. During the 3G FACH tail, the wireless module 101 can transmit and receive messages such as a radio resource control state change messages through a radio resource control release complete message. After the transfer of these messages, the wireless module 101 can return to a sleep state or a shutdown state. Average power to the radio 101*z* will be lower in the sleep state, and battery 101*k* can be conserved.

The series of messages between wireless module 101 and wireless network 102 after the receipt of response 209 may comprise radio control messages 305. Although radio control messages 305 are illustrated in FIG. 3 according to 3G technology for the wireless network 102, similar radio control messages 305 are applicable for 4G LTE networks and other wireless wide area networks as well. Radio control messages 305 can comprise layer 3 control messages of 3GPP protocols, where layer 3 control messages include radio resource control messages and radio resource management messages. Radio control messages 305 can comprise messages to control radio resources utilized by wireless module 101 and wireless network 102, including the radio control messages for a 3G network in the ETSI (3GPP) specification TS 125.331 titled "UMTS Radio Resource Control: Protocol Specification", which is incorporated herein by reference. A 3G wireless network 102 as contemplated herein also includes a 3G High Speed Downlink Packet Access (HSDPA) network and a 3G Evolved HSPA network (also known as HSPA+). Radio control messages 305 can also comprise radio control messages for a 4G LTE network in the ETSI (3GPP) specification TS 136.331 titled "LTE: Evolved Universal Terrestrial Radio Access Radio Resource Control (RRC): Protocol Specification", which is incorporated herein by reference. As illustrated in FIG. 3, radio control messages 305 may comprise messages received from a radio network controller 309. As contemplated in the present invention, radio control message 305 may comprise radio control messages from wireless network 102 that exclude messages for open loop and/or closed loop power control of radio 101*z*, such as power control messages defined in 3GPP TS 36.213. In addition, radio control message 305 may comprise a radio resource control message.

Radio resource control as comprising layer 3 is illustrated in FIG. 1 of 3GPP/ETSI standard 3GPP TS 36.201(v. 8.1.0), and thus a radio control message 305 can comprise a layer 3 radio resource control message. Note that layer 1 and layer 2 of a wireless network are also illustrated in FIG. 1 of 3GPP TS TS 36.201(v. 8.1.0), and thus a layer 1 message may be between a wireless module 101 and a wireless network at layer 1, and a layer 2 message may be between a wireless module 101 and a wireless network at layer 2. As contemplated in the present invention, radio control messages 305 can comprise messages that change the radio 101*z* state of a wireless module 101, including from a connected state to an idle state, but exclude open loop and/or close loop power control messages.

As illustrated in FIG. 3, the transition from the Cell_DCH state to the Cell_FACH state can be triggered by a radio bearer reconfiguration message 306. Radio bearer reconfiguration message 306 can be the "PHYSICAL CHANNEL RECONFIGURATION" message as specified in the 3GPP standard TS 25.303, paragraph 6.2.3.3. Radio bearer reconfiguration message 306 can comprise a layer 3 message from wireless network 102 to wireless module 101 in order to control radio resources utilized by wireless module 101. Radio bearer reconfiguration message 306 can also change the state of a radio 101z within wireless module 101, such as removing wireless module 101 from an actively connected state including the Cell_DCH and RRC_Connected states.

Wireless module 101 may also send messages pertaining to radio resource control after receiving response 209. As illustrated in FIG. 3, these messages, also comprising radio control messages 305 sent by a wireless module 101, can include a radio resource control state change message 307, a signaling connection release message 308. Other possibilities exist as well without departing from the scope of the present invention.

FIG. 4a

Figure 4B:
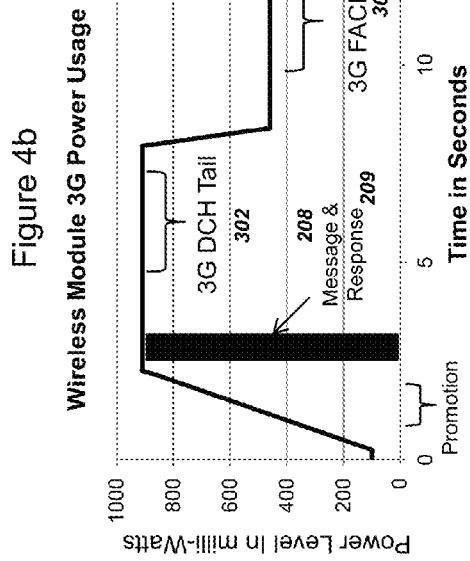
FIG. 4b is a graphical illustration of the power usage of a wireless module to send data to a server and receive a response in a 3G network, in accordance with exemplary embodiments.
Figure 4D:
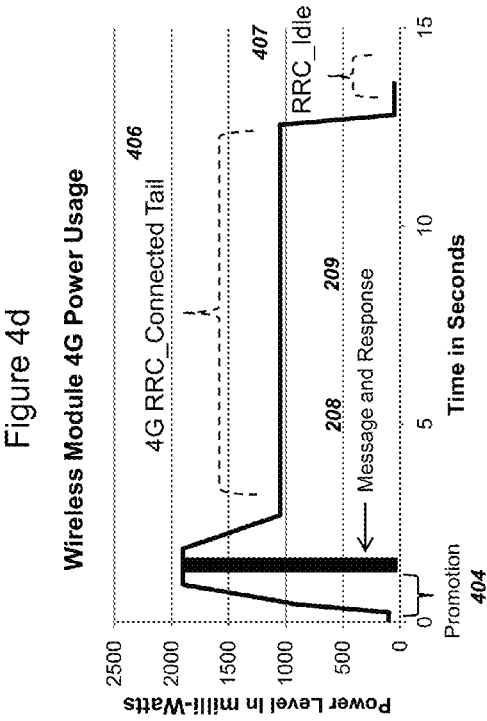
FIG. 4d is a graphical illustration of the power usage of a wireless module to send a message to a server and receive a response in a 4G LTE network, in accordance with exemplary embodiments.
Figure 4A:
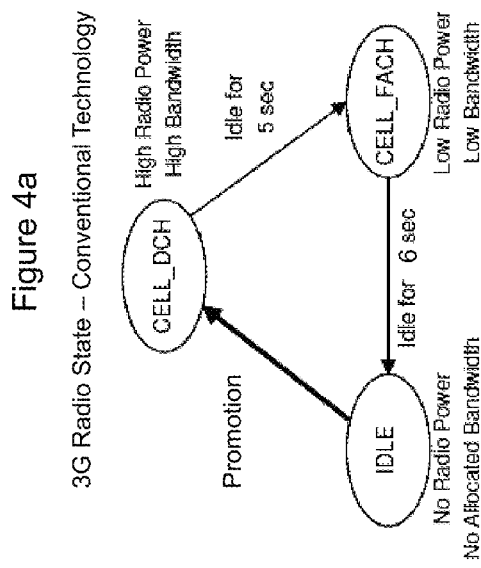
FIG. 4a is a flow chart illustrating exemplary steps for a wireless module to change the radio state in a 3G network, in accordance with conventional technology.

FIG. 4a is a flow chart illustrating exemplary steps for a wireless module to change the radio state in a 3G network, in accordance with conventional technology. With conventional 3G technology, a regular mobile phone would normally remain in the idle state. Upon the acquisition of sensor 101f data, or to simply connect with server 105, the wireless module 101 will need to enter the Cell_DCH state, where the wireless module 101 is actively connected to wireless network 102 and can continuously transmit and receive data from the Internet 107. This state change, also illustrated as a promotion in FIG. 4a, can be completed through a connect procedure 301 illustrated in FIG. 3. Message 208 and response 209 can be transferred in the Cell_DCH state. After a first period of being idle, such as the 3G DCH tail 302 illustrated in FIG. 3, which can be the 5 seconds illustrated in FIG. 4a, the wireless module can change state to the Cell_FACH state.

After a second period of being idle, such as the 3G FACH tail 303 illustrated in FIG. 3, which can be the 6 seconds illustrated in FIG. 4a, the wireless module can change state to the idle state. Note that the 3G Cell_FACH state may optionally be omitted in some 3G wireless networks 102, and in this case the wireless module 101 can change state from Cell_DCH to idle, without changing to the Cell_FACH state. Although not illustrated in FIG. 4a, additional states for wireless module 101 are possible within a 3G network, such as the cell paging channel (Cell_PCH) state and the URA paging channel (URA_PCH). However, the wireless module 101 does not have uplink resources in these states and thus cannot send a message 208 to a server 105, and thus these states may not be applicable for communication from wireless module 101 and thus are omitted in FIG. 4a. Other possibilities exist as well for the wireless module 101 to change state with a 3G wireless network 102 without departing from the scope of the present invention.

FIG. 4b

FIG. 4b a is a graphical illustration of the power usage of a wireless module to send data to a server and receive a response in a 3G network. FIG. 4b illustrates the power usage of a wireless module 101 versus time for promotion, transferring data, the DCH tail, changing to the FACH tail, and returning to the idle state. The power levels illustrated in FIG. 4b are exemplary for a wireless module 101, but a wireless module 101 may change between these exemplary states and power levels when using conventional 3G technology to send message 208 and receive response 209. In FIG. 4b, a wireless module 101 can start in a disconnected state, such as before the wireless module 101 transmits or receives packets with the Internet 107 through wireless network 102. After selecting wireless network 102 using a beacon radio frequency signal transmitted by base station 103, wireless module 101 can promote from the disconnected state to the Cell_DCH state using a connect procedure 301. The exemplary power level used by a wireless module 101 can increase from approximately 100 milliwatts to approximately 1 watt.

After entering the DCH state, the wireless module 101 can send the message 208 and receive the response 209. According to conventional technology 3G, the wireless module 101 then enters the DCH tail 302 period. Note that the power level for the wireless module during the DCH tail is approximately the same as the power level during the active transfer of data shown in FIG. 4b. After the DCH tail, the wireless module can enter the FACH tail 303 period. The power level during this period is significantly lower than during the DCH state, but also significantly greater than the idle or disconnected state, as shown. After the FACH tail 303 period, the wireless module can return to the idle state and/or disconnected state. Note that the FACH state may not be implemented on all 3G wireless networks 102, and some 3G wireless networks may optionally omit this state. In this case, the wireless module 101 can move from the DCH state to the idle state, but the DCH tail 302 period will remain, and this period represents power consumption by a radio 101z of a battery 101k, even though wireless module 101 may not be sending data through Internet 107 during the tail period.

FIG. 4c

Figure 4C:
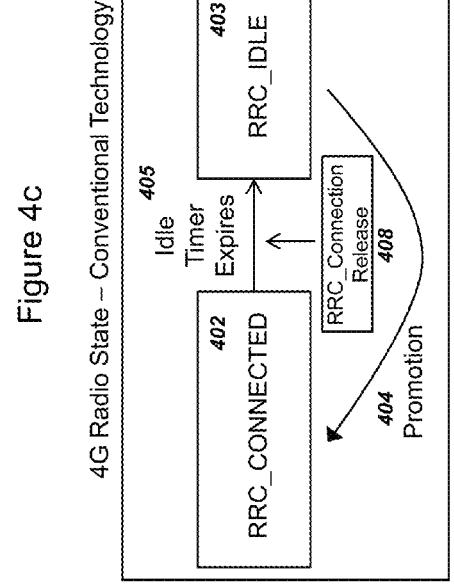
FIG. 4c is a flow chart illustrating exemplary steps for a wireless module to change the radio state in a 4G LTE network, in accordance with conventional technology.

FIG. 4c is a flow chart illustrating exemplary steps for a wireless module to change the radio state in a 4G LTE network, in accordance with conventional technology. With conventional 4G technology, a mobile phone such as a smartphone would normally remain in the idle state upon power up, illustrated as RRC_IDLE 403 in FIG. 4c. Upon the acquisition of sensor 101f data, or to simply connect with server 105, the wireless module will need to change state to the RRC_Connected 402 state, where the wireless module 101 is actively connected to 4G LTE wireless network 102 and can transmit and receive data from the Internet 107. This state change, also illustrated as a promotion 404 in FIG. 4c, can be completed through a 4G LTE connect procedure similar to the 3G connect procedure 301 illustrated in FIG. 3. Note that the 4G LTE connect procedure will not be identical to 3G connect procedure 301, but the series of messages to connect wireless module 101 to a 4G LTE wireless network are well known in the art. After wireless module 101 enters the 4G LTE RRC_Connected state 402, message 208 can be sent and response 209 can be received. In the RRC_Connected state 402, other messages between a wireless module 101 and server 105 can be transmitted as well, such as domain name service (DNS) queries and responses, registration messages, location update procedures, etc. After a period of being idle and upon the expiration of an idle timer 405, the wireless module 101 can return to the RRC_Idle 403 state.

As illustrated in FIG. 4c, the transition from RRC_Connected 402 to RRC_Idle 403 may be triggered by the issuance of a radio resource control connection release message 408. This message may be sent from a 4G LTE wireless network 102 to wireless module 101 after the expiration of an inactivity timer. An example of radio resource control connection release message 408 includes the RRC_Connection Release message specified in ETSI TS 136.331 (version 11.4.0), paragraph 5.3.8.

FIG. 4d

FIG. 4b a is a graphical illustration of the power usage of a wireless module to send a message to a server and receive a response in a 4G LTE network. FIG. 4d illustrates the power usage of a wireless module 101 versus time for promotion, transferring data, the 4G LTE RRC_Connected tail, and returning to the idle state. The power levels illustrated in FIG. 4d are exemplary for a wireless module 101, but a wireless module 101 can change between these exemplary states and power levels when using conventional 4G LTE technology to send message 208 and receive response 209. In FIG. 4d, a wireless module 101 can start in either a disconnected state or the RRC_Idle 403 state, such as before the wireless module 101 sends and receives messages through the Internet 107. Note that as contemplated herein, the disconnected state may also comprise a detached state. After selecting wireless network 102 using a beacon radio frequency signal transmitted by base station 103, wireless module 101 can promote to the RRC_Connected 402 state illustrated in FIG. 4c using a 4G LTE connect procedure similar to the 3G connect procedure 301 illustrated in FIG. 3. The exact steps for promotion in a 4G LTE network will be different than a 3G network illustrated in FIG. 3, but a similar sequence of steps will be required for the wireless device to enter the RRC_Connected 402 state, and the sequence of steps are well known in the art. The exemplary power level used by a wireless module 101 can increase to approximately 2 watts.

After entering the RRC_Connected 402 state, the wireless module 101 can send the message 208 and receive the response 209. According to conventional 4G LTE technology, the wireless module 101 then enters the RRC_Connected tail 406 period. When the wireless module 101 is in the RRC_Connected tail 406 period, the wireless module 101 may utilize a short or long discontinuous receive (DRX) timer, such as actively "listening" to receive data from a 4G LTE wireless network 102 and exemplary every 40 milliseconds. Note that the power level for the wireless module during the RRC_Connected tail 406 period is significantly greater than the RRC_Idle power 407, and power consumed during the RRC_Connected tail 406 period is illustrated as an exemplary 1 watt for about 10 seconds in FIG. 4d. Although the exact power level used by a wireless module 101 during the RRC_Connected tail 406 period will vary, the power will be significantly higher than the RRC_Idle power 407, and represents the usage of a battery 101k without transmitting or receiving data between a wireless module 101 and a server 105 through the Internet 107. After the RRC_Connected tail 406 period, the wireless module can return to the RRC_Idle 403 state or detached/disconnected state, which is illustrated as an exemplary 50 milliwatts in FIG. 4d. As contemplated herein, a RRC_Connected tail 406 period can include all time after receiving response 209 that the wireless module 101 remains in a RRC_Connected state 402.

FIG. 5

FIG. 5 is a flow chart illustrating exemplary power control steps for a wireless module, in accordance with exemplary embodiments. In order to optimize limited battery life 101k, wireless module 101 can follow a sequence of power control steps 101x for waking from a sleep state 501, recording sensor data 502, activating a radio 503, connecting to a wireless network 301, sending a message 208, receiving a response 209, validating the response 504, and returning to the sleep state 505. The processes and operations of the system 100 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

According to a preferred exemplary embodiment illustrated in FIG. 5, a wireless module 101 can wake a CPU 101b at step 501, wherein the wireless module was in a dormant or sleep state before step 501. A wireless module could use a CPU wake controller 101u as described in FIG. 1c to wake CPU 101b from the dormant state or sleep state. Example dormant or sleep states are also described in FIG. 1c. Power control steps 101x could wake the CPU 101b in step 501 at specified timing intervals, such as an exemplary every 1 hour or every day, or at specified events such as upon a threshold sensor input such as voltage from a sensor 101f due to temperature, shock, vibration, throwing of a switch, light level, sound level, etc.

After waking in step 501, wireless module 101 may record sensor data at step 502. The sensor data could be recorded (i) from a transducer associated with sensor 101f, and (ii) into either a volatile memory such a RAM 101e or non-volatile memory such as a ROM 101c. The transducer associated with sensor 101f could convert a physical input in sensor 101f such as temperature, pressure, light level, etc. into a voltage value or other electrical signal for bus 101d, and the CPU 101b can record data associated with the physical input. By recording sensor data at step 502 before the activating radio in step 503, the amount of time the radio is active, or in a connected state with wireless network 102 can be reduced and therefore power further conserved. Sensor data could also alternatively be recorded after step 503 or connecting the radio at step 301. Although not illustrated in FIG. 5, the wireless module 101 could optionally jump to the sleep or dormant state after step 502, if the sensor data is below threshold values.

After recording sensor data in step 502, the wireless module may activate a radio 101z at step 503. Various exemplary steps for activating a radio could include providing power from battery 101k to (i) a radio modem 101n, (ii) a baseband processor 101p, and (iii) a power amplifier 101r. Activating a radio could comprise powering up a radio from a power off, power standby, or idle state, and these steps or powering up a radio are well known in the art. The substeps for activating a radio may comprise changing the radio from the power off state to a powered state. As contemplated herein, the term "changing" can comprise taking steps to alter a state from an initial state to an end state, where the initial and end states are different. After activating a radio 101z in step 503, the wireless module 101 can connect to a wireless network 102 using a connect procedure 301. Although FIG. 3 illustrates connect procedure 301 according to the 3G standards, a similar connect procedure 301 could be utilized for a 4G LTE network or other wireless networks, and may include the synchronization of timing between a wireless module 101 and a base station 103, the allocation of radio resources to wireless module 101, and the authentication of wireless module 101 with wireless network 102.

After connecting to the wireless network 102 using a connect procedure 301, the wireless module 101 can send sensor data to server 105, which could be message 208 illustrated in FIG. 5 and FIG. 2. Message 208 may be the first message sent through an Internet 107, after the wireless module 101 connects to the wireless network 102 in step 301. Message 208 may further comprise the only message or datagram that wireless module 101 sends after the wireless module connects to the network in step 301 (i.e. between periods of sleep). Message 208 could comprise a series of sensor 101f measurements or also a series of TCP or UDP packets. In order to conserve the battery life of a battery 101k, message 208 can be sent quickly after radio 101z achieves the connected state, such as the Cell_DCH state in a 3G network or RRC_Connected 402 in a 4G LTE network. As one example, message 208 can be sent within 100 milliseconds or less after wireless module 101 is connected to wireless network 102. After sending message 208, wireless module may receive a response 209 from server 105, as illustrated in FIG. 5. Response 209 could be a TCP or UDP packet acknowledging server 105 has received message 208.

After receiving response 209, wireless module 101 can optionally validate response 209 from server 105 in step 504. Validating response 209 may comprise verifying a signature of server 105 within response 209, as depicted and described in connection with FIG. 9b below. As contemplated herein, validating response 209 may also comprise successfully decrypting a server encrypted data 905 as depicted and described in connection step 914 in FIG. 9b below. Although validating response 209 is illustrated in step 504, the wireless module 101 can omit step 504 and still utilize the efficient power management techniques described herein. After receiving response 209, wireless module preferably enters a sleep state for radio 101z and CPU 101b, as illustrated in step 505 of FIG. 5. The sleep state for radio 101z at step 505 may comprise powering down a radio 101z, such as reducing voltage below a threshold value to a radio 101z, a radio modem 101n, a baseband processor 101p, and/or a power amplifier 101r. The threshold voltage could be an exemplary low voltage threshold such as less than 0.2 volts, such that the power consumed by all components within a radio 101z is less than 5 milliwatts. Powering down a radio 101z may also comprise reducing the voltage below the threshold value for an extended duration (relative to radio resource control power control loop frequencies), such as an exemplary 60 seconds or longer.

The sleep state for radio 101z in step 505 could also comprise a dormant state or an "off" state for a radio 101z, such that the power consumed by all components within a radio 101z is less than 1 milliwatts, or comprises the radio 101z being effectively turned "off". Note that power leakage through radio 101z could continue even when wireless module 101 enters the radio "off" state for radio 101z at step 505, but the power consumed by the radio 101z is sufficiently low that a portable, small battery 101k for wireless module 101 could sustain radio 101z in the radio "off" state for several months or longer. The portable, small battery 101k for wireless module 101 could comprise a battery with an exemplary capacity of 1-10 amp hours, supporting a voltage of 1-6 volts. Other possibilities exist as well without departing from the scope of the present invention. A sleep or dormant state for CPU 101b at step 505 may comprise the sleep or dormant state for CPU 101b as depicted and described in connection with FIG. 1c.

At step 506, wireless module 101 can determine if a sleep timer has expired. The duration of a sleep timer may be recorded within a memory 101e. The sleep timer could be monitored by a CPU wake controller 101u. If the sleep timer has not expired, such as a sleep time of an exemplary 1 hour has not transpired since the wireless module 101 entered the sleep state in step 505, the wireless module can continue within the sleep state. Other values for exemplary sleep timers are possible as well, without departing from the scope of the present invention. If the sleep timer has expired at step 506, wireless module 101 can preferably return to step 501 to wake the CPU and subsequently record and send sensor data to a server 105, as illustrated in FIG. 5.

FIG. 6*a*

Figures 6A, 6B, 6C:
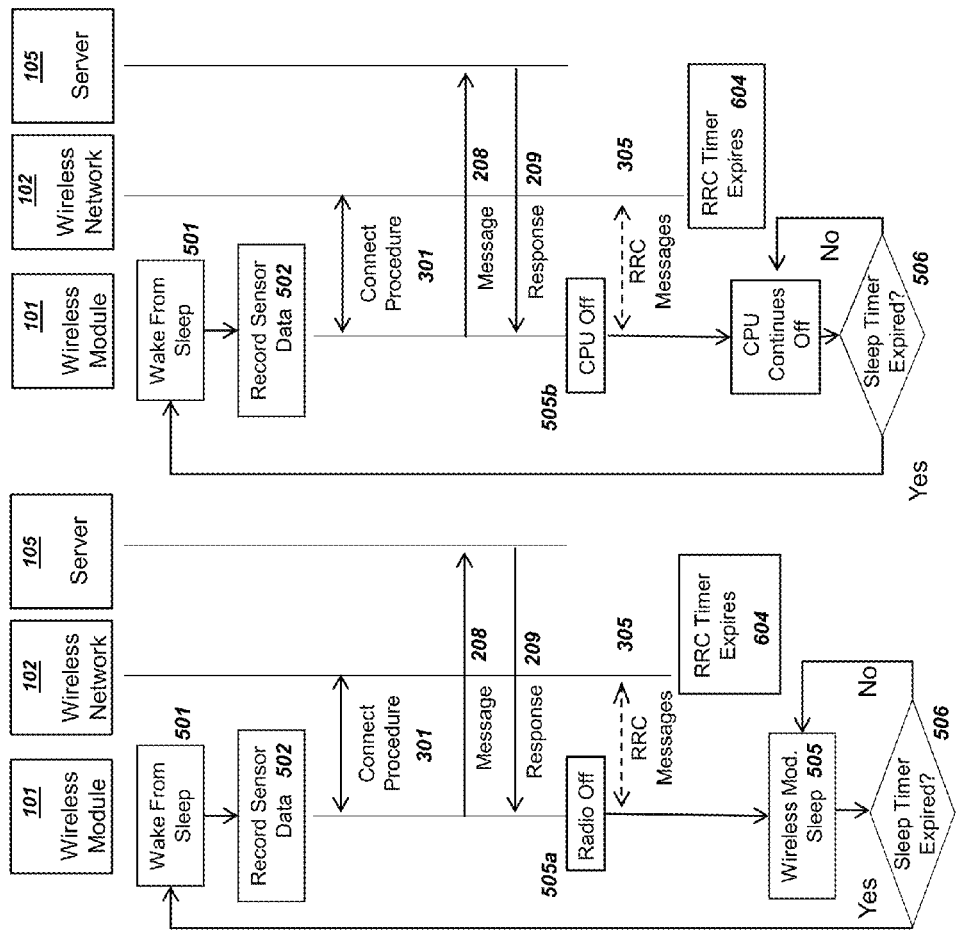
FIG. 6a is a simplified message flow diagram illustrating exemplary steps for a wireless module to detach from a wireless network, in accordance with exemplary embodiments.
FIG. 6b is a simplified message flow diagram illustrating exemplary steps for a wireless module to power down a radio before sending or receiving radio resource control messages from a wireless network, in accordance with exemplary embodiments.
FIG. 6c is a simplified message flow diagram illustrating exemplary steps for a wireless module to change the CPU into a dormant state before sending or receiving radio resource control messages from a wireless network, in accordance with exemplary embodiments.

FIG. 6*a* is a simplified message flow diagram illustrating exemplary steps for a wireless module to detach from a wireless network, in accordance with exemplary embodiments. As illustrated in FIG. 6*a*, a wireless module can utilize the power control steps 101*x* illustrated in FIG. 5. The wireless module 101 can wake from a sleep state 501, record sensor data 502, connect to a wireless network 102 using a connect procedure 301, send a message 208 to a server 105, and receive a response 209 from the server. As shown in FIG. 6*a*, wireless module 101 can optionally validate the response 209 from server 105 using the steps 504, which are also depicted and described in FIG. 9*b*. Note that validating response 209 may be included within the steps to receive response 209. According to one exemplary embodiment, after receiving the response 209, the wireless module 101 can then send a detach message 601 to wireless network 102.

The detach message 601 may be sent after receiving response 209 and before wireless module 101 sends or receives any other layer 3 messages to wireless network 102 or server 105. After receiving response 209, detach message 601 can be sent by wireless module 101 before (i) receiving a radio bearer reconfiguration message 306, and (ii) receiving a radio resource control connection release message 408. Detach message 601 can also be sent by wireless module 101 before the wireless module sends sending a radio resource control state change message. Note that a radio bearer reconfiguration message 306 as described herein and throughout the present invention can also include both (i) a radio bearer release message, since release of radio bearer resources can comprise a reconfiguration of radio bearer resources (i.e. the configuration is the unallocation of radio resources), and (ii) a radio bearer configuration message, since configuration of radio resources can comprise a reconfiguration of radio resources (since a configuration of radio resources has taken place after message 208 was sent and the receipt of a subsequent radio bearer configuration message may thus be considered a "radio bearer reconfiguration message" as described throughout the present invention).

Also as described throughout the present invention, a "radio bearer reconfiguration" message can refer to a physical channel reconfiguration message. Thus, "radio bearer reconfiguration" as used in the above paragraph and elsewhere herein can refer to the "PHYSICAL CHANNEL RECONFIGURATION" message as specified in the 3GPP standard TS 25.303 (herein incorporated by reference), paragraph 6.2.3.3 and FIG. 15 of TS 25.303. Paragraph 6.2.3.3 specifies the messages for transition from Cell_DCH state to Cell_FACH state illustrated in FIG. 4*a* of the present invention. In general the terms "radio bearer" and "physical channel" may be considered synonymous. Consequently, if wireless module 101 is attached to a 3G wireless network 102, detach message 601 may be sent before wireless module 101 receives a command from wireless network 102 to change from the Cell_DCH to another state such as Cell_FACH or the idle state (or possibly Cell_PCH or URA_PCH). Note that after the expiration of a timer, such as an exemplary 3-6 seconds, wireless network 102 sends wireless module 101 a radio bearer reconfiguration message if wireless module 101 takes no action and simply remains in the Cell_DCH state after receiving response 209 and awaits instruction from wireless network 102.

Detach message 601 can be sent after receiving response 209 and before receiving a radio resource control connection release message 408. When operating in a 4G LTE network, if wireless module 101 takes no action and simply remains in the RRC_Connected state after receiving response 209 and awaits instruction from wireless network 102, then a 4G LTE wireless network 102 would normally send the radio resource control connection release message 408 after expiration of a timer, such as an exemplary 10 seconds illustrated in FIG. 4*c*. Note that 4G LTE Advanced may also comprise a 4G LTE wireless network as contemplated in the present invention, and 4G LTE may further comprise a 4G wireless network. Detach message 601 as contemplated in the present invention, when wireless module 101 connects to a 4G LTE wireless network, may comprise include a "detach request" message sent to wireless network 102 and may also comprise a detach procedure as specified in section 5.5.2.1 and 5.5.2.2 of ETSI/3GPP TS 24.301 (version 11.7.0, and herein incorporated by reference) and related standards. Detach message 601 may also comprise a similar message in 3G and also future wireless standards to indicate a complete disconnect of wireless module 101 from wireless network 102.

Although the radio resource control and radio bearer messages described above and throughout the present invention may pertain to specific messages within 3G and/or 4G LTE wireless wide area networking technologies, the detach message 601 can be sent (i) before wireless module 101 sends or receives radio control messages 305 with wireless network 102 that control radio resources for any appropriate wireless networking technology, (ii) after the response from the server has been received by the mobile device, and (iii) while the wireless device is actively connected to the wireless network. "Actively connected" in the previous sentence can mean the wireless module 101 can both send and receive data across the Internet 107 in the actively connected state, and examples of the actively connected state include the RRC_Connected state (4G LTE) or Cell_DCH state (3G). Further, the radio control messages 305 may comprise layer 3 messages within a wireless network 102 for the allocation and control of radio resources between a wireless module 101 and wireless network 102, but excluding open loop and closed loop power control messages. In addition, if wireless network 102 utilized 2.5G or 2.75G (i.e. Enhanced Data Rates for GSM Evolution, or "EDGE"), the wireless module can send the detach message (i) while the wireless module comprises a general packet radio service (GPRS) ready state and (ii) before the wireless module utilizes a GPRS standby state, after receiving the response 209. Being actively connected to the wireless network may also comprise a state where the wireless module operates in a continuous receive mode and does not utilize a discontinuous receive (DRX) timer.

In addition to the timing for wireless module 101 to send detach message 601 listed in the previous paragraph, wireless module 101 could also send the detach message 601 after receiving response 209 and before either (i) sending a signaling connection release message 308 or (ii) sending a radio resource control state change message 307. Thus, according to an exemplary preferred embodiment, wireless module 101 can send detach message 601 before sending a radio control message 305. If wireless network 102 comprises a 3G wireless network, the wireless module can send the detach message 601 (i) while the wireless module comprises a 3G dedicated channel (3G DCH) state, and (ii) before the wireless module utilizes a 3G forward access channel (3G FACH) state, with these states illustrated in FIG. 4*a*. If wireless network 102 comprises a 4G LTE wireless network, the wireless module can send the detach message 601 (i) while the wireless module comprises a radio resource control connected (RRC_CONNECTED) state and (ii) before the wireless module utilizes either a short or long discontinuous reception (DRX) state.

By sending the detach message soon after receiving response 209, preferably in an exemplary short time such as less than 1 second after response 209 has been received, the duration that a wireless module 101 remains in the Cell_DCH state (3G network) or RRC_Connected state 402 (4G LTE network) can be minimized. As contemplated in the present invention, a 4G network can also comprise a 4G LTE network. By utilizing the efficient power management techniques described in the present invention, battery life can be conserved by reducing or minimizing the time the wireless module remains in the Cell_DCH or RRC_Connected states, or the equivalent active state, or connected state without use of a discontinuous receive, in future wireless network standards. Since the wireless module has transmitted sensor data in a message 208, the wireless module 101 may have no more sensor data to transmit, and, thus, remaining in a state connected to the wireless network 102 would inefficiently utilize battery 101k resources.

After sending the detach message 601, the wireless module 101 can receive a radio resource connection release message 602. Although not illustrated in FIG. 6a, the radio resource connection release message 602 may comprise a series of messages between wireless module 101 and wireless network 102. This series of messages can be different for a 3G wireless network 102 and a 4G LTE wireless network 102, but the exact steps to complete the release of radio resources are known in the art. The series of messages for a radio resource connection release could include messages shown within a 3G FACH tail 303 illustrated in FIG. 3, such as a radio resource release complete message, if the wireless network 102 supports 3G technology.

After receiving a radio resource connection release message 602, the wireless module 101 can enter the sleep state 505. As described above, a sleep state for wireless module 101 may comprise (i) a sleep state for a radio 101z, a CPU 101, or subsystems within a radio 101z, (ii) a dormant state for a radio 101z, CPU 101b, or subsystems within a radio 101z, or (iii) an idle state for radio 101z, CPU 101b, or subsystems within a radio 101z. Sleep state 505 can comprise power supply being effectively removed or disconnected from a radio 101z. After entering the sleep state 505, the wireless module can then periodically check a sleep timer at step 506, and wake from sleep if the timer has expired and report subsequent data from a sensor 101f to a server 105.

FIG. 6b

FIG. 6b is a simplified message flow diagram illustrating exemplary steps for a wireless module to power down a radio before receiving radio resource control commands from a wireless network, in accordance with exemplary embodiments. As illustrated in FIG. 6b, a wireless module can utilize the power control steps 101x illustrated in FIG. 5. The wireless module 101 can wake from a sleep state 501, record sensor data 502, connect to a wireless network 102 using a connect procedure 301, send a message 208 to a server 105, and receive a response 209 from the server.

According to preferred exemplary embodiments, after receiving the response 209, the wireless module 101 can then power down radio by changing to the "radio off" state 505a before sending or receiving radio control messages 305 with wireless network 102. The "radio off" state 505a is depicted and described in connection with FIG. 5 above, specifically step 505 where the wireless module enters a sleep state. Although not shown in FIG. 6b, before entering the "radio off" state 505a, wireless module 101 can optionally validate the response 209 from server 105 using the steps 504 depicted and described in connection with FIG. 5 above, which are also depicted and described in FIG. 9b below. Note that validating response 209 may be included within the steps to receive response 209. Note that in this "radio off" state 505a, the radio 101z can operate at a sufficiently low power where at least one of (i) a layer 1 message received at an antenna 101t of the wireless module 101 is not passed to a layer 1 processing algorithm within baseband processor 101p or RAM 101e, (ii) a base transceiver station beacon from any base stations 103 are not monitored, (iii) power to a radio frequency power amplifier 101r is reduced below an operating threshold value, and (iv) the radio 101z or baseband processor 101p do not utilize a discontinuous receive (DRX) timer. In the "radio off" state 505a, the radio 101z can operate at a sufficiently low power where two or more combinations of the conditions (i)-(iv) in the above sentence apply.

Note that conventional wireless networking technology with mobile devices, such as mobile phones, does not contemplate the mobile device automatically entering the "radio off" state 505a after sending a message 208 and receiving a response 209. A mobile phone would not normally automatically enter a "radio off" state 505a, since, when sufficient battery life for the mobile phone remains, such as greater than 5% battery life remaining, a subscriber would want to receive incoming phone calls and incoming text messages. With conventional technology, a mobile device would enter an idle state, whereby the mobile device utilizes a discontinuous receive timer to periodically listen for incoming signaling from wireless network 102. The "radio off" state 505a can completely disconnect the radio 101z from wireless network 102 and utilize a much lower power level than an idle state, such as RRC_Idle state 403, since radio 101z does not need to utilize a discontinuous receive mode in the "radio off" state 505a.

The "radio off" state 503 can thus comprise a lower power state than either (i) the RRC_Idle 403 state shown in FIG. 4c for 4G LTE networks and (ii) the idle state shown in FIG. 4a for 3G networks in FIG. 4a. In both of the idle states in the previous sentence, a wireless module would normally utilize a DRX timer and discontinuous reception in order to receive incoming messages. Supporting standard 3G and 4G discontinuous reception and the idle state would utilize more power than simply powering down radio 101z to the radio off state 503. The power consumption for a radio 101z during radio off state 505a for a wireless module 101 may preferably be lower than the power consumption in a mobile handset when an end-user places their mobile phone in "airplane mode", for common smart phones as of 2013 such as the Samsung® Galaxy® S4 or Apple® iPhone® 5. As noted above as described in FIG. 5, a radio 101z could still consume power in the "radio off" state 505a, such as supporting standard leakage current to components within radio 101z, but the power consumed in the "radio off" state 505a can be more than an order of magnitude lower than the standard idle state of the 3G and 4G LTE specifications. In addition, by combining the "radio off" 505a state with the "CPU off" state 505b described in FIG. 6c below, total power consumption for a wireless module 101 can be many times lower than "airplane mode" for a traditional smart phone.

As illustrated in FIG. 6b, wireless module 101 can change to the "radio off" state 505a before sending or receiving radio control messages 305 with wireless network 102. The radio control messages 305 are illustrated in FIG. 6b as a dashed line to indicate these messages may be entirely omitted or bypassed since the wireless module 101 has entered the "radio off" state 505a. Radio control messages 305 are depicted and described in connection with FIG. 3 above. Thus, according to an exemplary preferred embodiment, wireless module 101 can change to the "radio off" state 505a both (i) after receiving response 209 and (ii) before sending a radio control message 305 after receiving the response. Wireless module 101 can change to the "radio off" state 505a both (i) after receiving and processing response 209, and (ii) before sending or receiving any further radio control messages 305 with wireless network 102. These radio control messages 305 could include any of (i) sending a signaling connection release message 308, (ii) sending a radio resource control state change message 307, (iii) receiving a radio bearer reconfiguration message 306, (iv) receiving a radio resource control connection release message 408, and (v) sending a signaling connection release indication (SCRI) message. In other words, the wireless module 101 can change to the "radio off" state 505a (i) before wireless module 101 sends or receives messages with wireless network 102 that control radio resources, including layer 3 radio control messages 305 but excluding open loop or closed loop power control messages, (ii) after the response from the server has been received by the mobile device, and (iii) while the wireless device 101 is actively connected to the wireless network. As illustrated in FIG. 6b, wireless module 101 can change to the "radio off" state 505a before receiving a radio control message 305, excluding open loop or closed loop power control messages.

As depicted and described in connection with FIG. 3, a radio control message 305 can exclude messages pertaining to open loop or closed loop power control, such as a power control message. Open loop and closed loop power control messages can adjust the power level used by radio 101z, such as effectively increasing or decreasing the radio frequency signal strength and/or power emitted by an antenna 101t. Thus, according to a preferred exemplary embodiment, wireless module 101 can change to the "radio off" state (i) after receiving the response and (ii) before receiving a radio control message 305 that excludes a power control message. One reason can be that an open loop or closed loop power control message may be sent by wireless network on the order of every millisecond, and the receipt of a power control message does not contemplate the receipt an open loop or closed loop power control message.

If wireless network 102 comprises a 3G wireless network, the wireless module can preferably enter the "radio off" state 505a (i) while the wireless module comprises a 3G dedicated channel (3G DCH) state, and (ii) before the wireless module utilizes a 3G forward access channel (3G FACH) state, with these states illustrated in FIG. 4a. If wireless network 102 comprises a 4G wireless network, the wireless module can preferably enter the "radio off" state 505a (i) while the wireless module comprises a radio resource control connected (RRC_CONNECTED) state and (ii) before the wireless module utilizes either a short or long discontinuous reception (DRX) state.

After receiving entering the "radio off" state 505a, the wireless network 102 may preferably expire one or more radio resource control timers at step 604. Expiration of the radio resource control timers can indicate to the wireless network 102 that the wireless module 101 is no longer connected to the network. An example timer expiration would be if a handset suddenly lost power when the handset was in the RRC_Connected state for a 4G network or the Cell_DCH state in a 3G network, and the wireless network 102 received no radio resource control messages from the handset. By expiring the timers, the wireless network 102 can continue to operate normally for all other users, and the wireless module can subsequently return to the connected state at a later time.

After the wireless module 101 or the radio 101z enters the "radio off" state 505a, the wireless module can enter the sleep state 505. As described in the Figures above, a sleep state for wireless module 101 may comprise (i) a sleep state for a radio 101z, a CPU 101, or subsystems within a radio 101z, (ii) a dormant state for a radio 101z, CPU 101b, or subsystems within a radio 101z, or (iii) an idle state for radio 101z, CPU 101b, or subsystems within a radio 101z. After entering the sleep state 505, the wireless module can then periodically check a sleep timer at step 506, and wake from sleep if the timer has expired and report subsequent data from a sensor 101f to a server 105.

FIG. 6c

FIG. 6c is a simplified message flow diagram illustrating exemplary steps for a wireless module to change the CPU into a dormant state before receiving radio resource control commands from a wireless network, in accordance with exemplary embodiments. As illustrated in FIG. 6c, a wireless module 101 can utilize the power control steps 101x illustrated in FIG. 5. The wireless module 101 can wake from a sleep state 501, record sensor data 502, connect to a wireless network 102 using a connect procedure 301, send a message 208 to a server 105, and receive a response 209 from the server. Although not shown in FIG. 6c, wireless module 101 can optionally validate the response 209 from server 105 using the step 504, which are also depicted and described in FIG. 9b and FIG. 5. Note that validating response 209 may be included within the steps to receive response 209.

According to a preferred exemplary embodiment, after receiving the response 209, the wireless module 101 can then power down a CPU 101b by changing to the "CPU off" state 505b before sending or receiving radio control messages 305 with wireless network 102. The "CPU off" state 505d is depicted and described in connection with FIG. 5 above, specifically step 505 where the wireless module enters a sleep state. Thus, according to an exemplary preferred embodiment, wireless module 101 can change to the "CPU off" state 505b both (i) after receiving response 209 and (ii) before sending a radio control message 305 after receiving the response. Note that in this "CPU off" state 505a, the CPU 101b can enter a dormant state as depicted and described in connection with FIG. 1c. The dormant state of CPU 101b can comprise a sleep state where a power level used by a core in the processor is less than 0.010 milliwatts during a one second measurement period or longer, such as when the power supply is essentially removed from the core but power is supplied to cache memory 123 within the CPU in order to allow a rapid waking of the CPU 101b or core.

In other words, the "CPU off" state 505b can allow volatile memory such as cache 123 in the CPU 101b to retain data during sleep or dormancy. The "CPU off" state 505b or CPU 101b can alternatively comprise a shutdown state where a power level used by the processor is less than 0.002 milliwatts during the one second measurement period or longer, such as when the power supply to the core and the volatile memory including cache 123 is removed. In this shutdown state, CPU 101b can lose data in the volatile memory, requiring more steps and time in order to wake and restore full CPU 101b functionality to an operating system 101h. The "CPU off" state 505b of CPU 101b may also comprise comprises (i) all cores in the processor being simultaneously in a shutdown state and (ii) a random access memory (RAM) 101e in the processor, such as cache 123, retaining data.

The "CPU off" state 505b can comprise a state where a processor in wireless module 101 can operate at a sufficiently low power such that a layer 3 message received at an antenna 101*t* of the wireless module 101 is not passed to a layer 3 processing algorithm or recorded in a RAM 101*e*. As illustrated in FIG. 6*c*, wireless module 101 can change to the "CPU off" state 505*b* before sending or receiving radio control messages 305 with wireless network 102. In the "CPU off" state 505*b*, the CPU 101*b* may operate at sufficiently low power that the wireless module 101 or CPU 101*b* can no longer send radio control messages 305 to a radio 101*z*. The radio control messages 305 are illustrated in FIG. 6*b* as a dashed line to indicate these messages may be entirely omitted or bypassed since the wireless module 101 has entered the "CPU off" state 505*b*. These omitted radio control messages 305 could include any of (i) sending a signaling connection release message, (ii) sending a radio resource control state change message, (iii) receiving a radio bearer reconfiguration message, (iv) receiving a radio resource control state change message, and (v) receiving a radio resource control connection release message.

If wireless network 102 comprises a 3G wireless network, the wireless module can preferably enter the "CPU off" state 505*b* (i) while the wireless module comprises a 3G dedicated channel (3G DCH) state, and (ii) before the wireless module utilizes a 3G forward access channel (3G FACH) state, with these states illustrated in FIG. 4*a*. If wireless network 102 comprises a 4G LTE wireless network, the wireless module can preferably enter the "CPU off" state 505*b* (i) while the wireless module comprises a radio resource control connected (RRC_CONNECTED) state and (ii) before the wireless module utilizes a short or long discontinuous reception (DRX) state.

After receiving entering the "CPU off" state 505*b*, the wireless network 102 may preferably expire one or more radio resource control timers at step 604. Expiration of the radio resource control timers can indicate to the wireless network 102 that the wireless module 101 is no longer connected to the network. An example timer expiration would be if a handset suddenly lost power when the handset was in the RRC_Connected state for a 4G network or the Cell_DCH state in a 3G network, and the wireless network 102 received no radio resource control messages from the handset. By expiring the timers, the wireless network 102 can continue to operate normally for all other users, and the wireless module 101 can subsequently return to the connected state at a later time.

After the wireless module 101 enters the "CPU off" state 505*b*, the wireless module can enter the sleep state 505. As described in the Figures above, a sleep state for wireless module 101 may comprise (i) a sleep state for a radio 101*z*, a CPU 101, or subsystems within a radio 101*z*, (ii) a dormant state for a radio 101*z*, CPU 101*b*, or subsystems within a radio 101*z*, or (iii) an idle state for radio 101*z*, CPU 101*b*, or subsystems within a radio 101*z*. After entering the sleep state 505, the wireless module can then periodically check a sleep timer at step 506, and wake from sleep if the timer has expired and report subsequent data from a sensor 101*f* to a server 105.

Although not illustrated in FIGS. 6*a*-6*c*, wireless module 101 could optionally combine "radio off" state 505*a* and "CPU off" state 505*b*, such that wireless module 101 enters both states after receiving response 209 and before the transmission of any radio control messages 305. In this manner, by combining both "radio off" state 505*a* and "CPU off" state 505*b*, the resources of battery 101*k* can be further conserved by reducing power to both a radio 101*z* and a CPU 101*b* before the wireless module 101 must wait for the processing or radio control messages 305 with a wireless network 102.

FIG. 7

Figure 7:
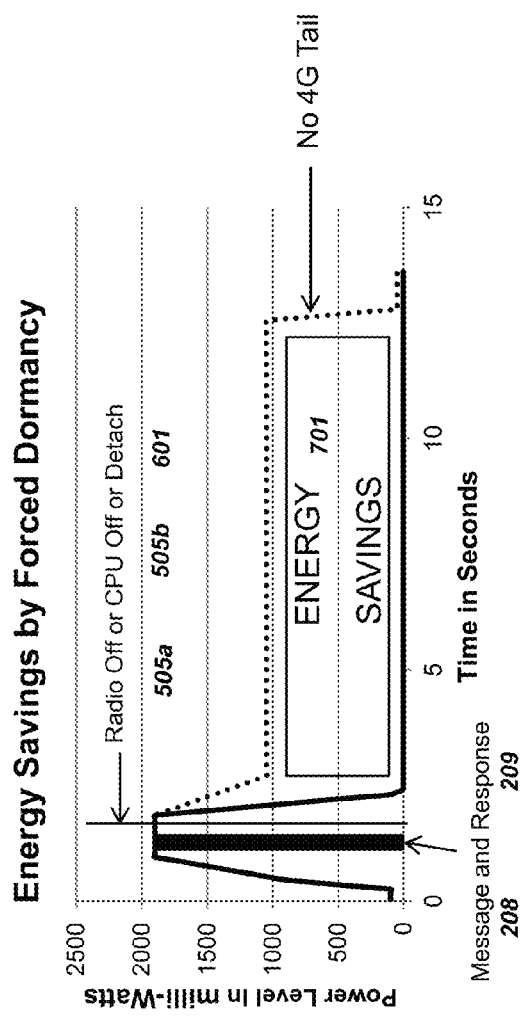
FIG. 7 is a graphical illustration of the power usage of a wireless module to (i) send sensor data to a server and (ii) receive a response by avoiding power usage during a 4G tail period, in accordance with exemplary embodiments.

FIG. 7 is a graphical illustration of the power usage of a wireless module to (i) send sensor data to a server and (ii) receive a response by avoiding power usage during a 4G tail period, in accordance with exemplary embodiments. FIG. 7 includes an exemplary graph of the power used and the power saved by a wireless module by utilizing the efficient power management techniques described in the present invention. The power levels shown on the y-axis and the time interval shown on the x-axis are exemplary, and these levels will vary depending upon the wireless module 101 and the wireless network 102.

After waking from a sleep or dormant state and collecting sensor data, wireless module 101 can power up a radio 101*z* and connect to wireless network 102. Connecting to a wireless network 102 may comprise conducting a connect procedure 301. The radio power consumed is illustrated as the rise in power before message 208 is sent and response 209 is received. The wireless module 101 enters a connected state with the wireless network 102, with an exemplary power consumption illustrated as approximately 1900 milliwatts. The connected state can be a radio resource control connected (RRC_Connected) state in a 4G LTE wireless network. After sending message 208 and receiving response 209 as illustrated in FIG. 7, also while in the connected state, wireless module 101 can disconnect from the wireless network 102 using the techniques depicted and described in connection with FIG. 5, and FIGS. 6*a*-6*c*. The disconnection from wireless network 102 illustrated in FIG. 7 may comprise the wireless module 101 entering a "radio off" state 505*a*, a "CPU off" state 505*b*, and/or sending a detach message 601. As noted in FIGS. 6*a*-6*c*, wireless module 101 entering a "radio off" state 505*a*, a "CPU off" state 505*b*, and/or sending a detach message 601 can be initiated after receiving response 209 and before the wireless module sends and/or receives any further radio resource control messages, including a radio control message 305.

As illustrated in FIG. 7, the power consumed by radio 101*z* drops rapidly when wireless module 101 enters the "radio off" state 505*a*, a "CPU off" state 505*b*, and/or sends the detach message 601. The dashed line represents the alternative power consumption with conventional technology with the wireless module remaining in the RRC_Connected state 402 with a discontinuous receive timer running for several seconds, until wireless network 102 commands wireless module 101 to enter the RRC_Idle state 403. Energy savings 701 can be achieved by wireless module 101 entering a "radio off" state 505*a*, a "CPU off" state 505*b*, and/or sending a detach message 601 after receiving a response 209. The exemplary energy savings 701 illustrated in FIG. 7 is approximately 10 joules, while the total energy required for wireless module 101 to connect to the network, send the message 208 and receive the response 209, and power down the radio is illustrated as an exemplary 4 joules. Other possibilities exist as well without departing from the scope of the present invention.

FIG. 8

Figure 8:
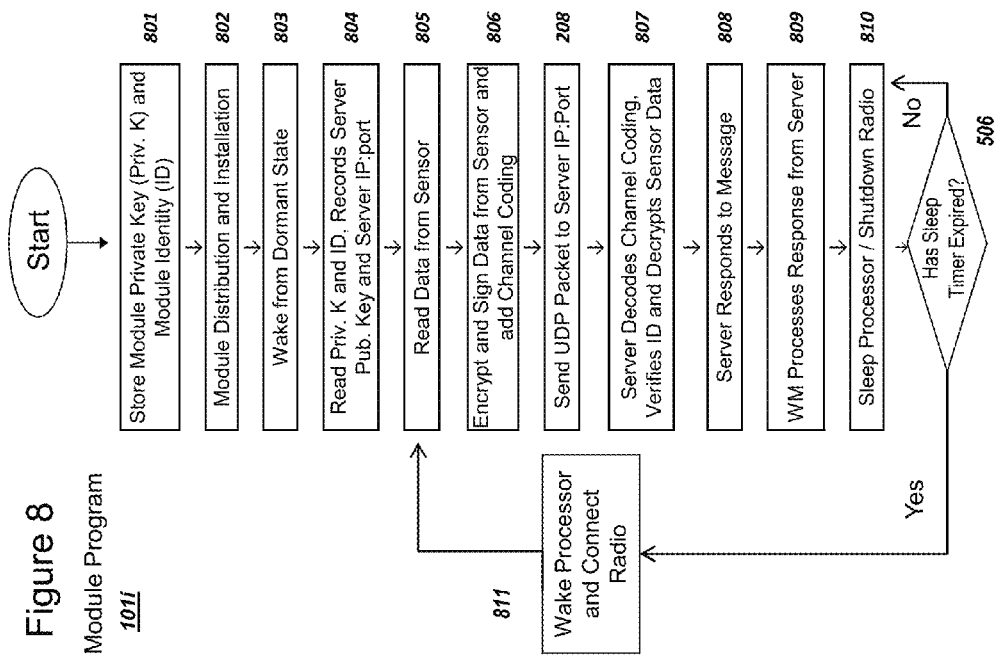
FIG. 8 is a flow chart illustrating exemplary steps for a wireless module to send sensor data to a server, in accordance with exemplary embodiments.

FIG. 8 is a flow chart illustrating exemplary steps for a wireless module to send sensor data to a server, in accordance with exemplary embodiments. The steps illustrated in FIG. 8 may comprise steps in a module program 101*i* used by a wireless module 101 and illustrated in FIG. 1*b*. At step 801, before final distribution of the wireless module to a sales channel, equipment distributors, or end users, a wireless module private key 112 and wireless module identity 110 could be recorded in non-volatile memory 101*c* of the wireless module 101. The wireless module private key 112 could be a private key formatted according to the X.500 series of standards published by the International Organization for Standardization (ISO) in ISO/IEC 9594 or similar and subsequent standards, or alternatively according to another format including a propriety format. The wireless module private key 112 could be formatted using RSA encryption algorithms or ECC encryption algorithms, and other possibilities exist as well for the format of encryption and/or decryption keys without departing from the scope of the present invention.

Wireless module identity 110 can be a unique identifier associated with wireless module 101, and can represent a number or a string. The wireless module private key 112 and wireless module identity 110 could be recorded in non-volatile memory 101c by the manufacturer, or a service provider. Alternatively, the wireless module private key 112 and wireless module identity 110 could be recorded in non-volatile memory 101c by the end users. Wireless module private key 112 and wireless module identity 110 could be recorded in a Subscriber Identity Module (SIM) card that is inserted into wireless module 101. At step 802, the wireless module is distributed and installed in physical proximity to a monitored unit 119. Although step 801 is illustrated as occurring before step 802 according to an exemplary embodiment, step 801 can take place after step 802 or concurrently with step 802, and other possibilities exist as well without departing from the scope of the present invention.

After installation of the wireless module 101, wireless module 101 can wake from a dormant state in step 803. The dormant state can comprise a state of low power usage as described in FIG. 1c, in order to conserve battery life and wireless spectrum resources. At step 803, the wireless module private key 112, wireless module identity 110, and server identity 206 and/or server address 106 could be moved from non-volatile memory 101c into RAM 101e. At step 804, the wireless module 101 can read the wireless module private key 112 and wireless module identity 110 recorded in RAM 101e, and also record the server public key 114 and server IP:port 207. The server public key 114 and server IP:port 207 could also be either locally stored previous to step 804 in a non-volatile memory 101c, or obtained through the Internet 107 via a query to M2M service provider 108. As one example, wireless module 101 could obtain the server public key 114 by establishing an Internet connection through wireless network 102 and downloading the server public key 114 from server 105. The location of server 105 could be obtained via a DNS query using the server identity 206. Although not illustrated in FIG. 8, server identity 206 and server IP:port 207 could also be recorded in non-volatile memory at step 801. Other means are possible as well for wireless module 101 to obtain server public key 114 and server IP:port 207.

At step 805, the wireless module 101 can read data from a sensor 101f. The data can comprise information regarding a monitored unit 119, as illustrated in FIG. 1a. At step 806, the wireless module can encrypt the data from sensor 101f using the server public key 114 and sign the encrypted data using the wireless module private key 112. According to a preferred exemplary embodiment, the wireless module can add channel coding to the data resulting from the steps taken in the previous sentence, although the channel coding can optionally be omitted. A more detailed description of the steps for encrypting and signing data from the sensor are included in FIGS. 9a and 9b below. After encrypting and signing sensor data, the wireless module can send the data to the server 105 in message 208, where message 208 is formatted and sent according to a either a TCP or UDP packet. Message 208 could be sent using the UDP Lite protocol, although the message could also be sent in a TCP datagram, after completing the initial TCP "handshakes" with server 105. Message 208 in the form of a UDP or TCP datagram can be sent from the wireless module IP:port 204 to the server IP:port 207. Message 208 can also comprise sending the sensor data in multiple datagrams, including two or more copies of the same data.

At step 807, the wireless module 101 waits for the server 105 to process and decode the message 208, and the decoding process can comprise the server 105 (i) processing and removing any channel coding in order to eliminate and correct potential bit errors, (ii) optionally verifying the digital signature of the wireless module 101 using the wireless module public key 111, and (iii) decrypting the sensor data using the server private key 105c. At step 808, the server 105 can then send a response 209, where response 209 can be encrypted with the wireless module public key 111 and signed with the server private key 105c. Additional details regarding step 808 are depicted and described in connection with FIG. 9a below. An exemplary format of the response 209 is also depicted and described in connection with FIG. 10 below. The wireless module 101 can then receive a the encrypted response 209 to message 208 in a datagram 209a that is sent from server IP:port 207 and received at wireless module IP:port 204. Note that server 105 may send response 209 from server IP:port 207 to the source IP:port received in message 208, which could represent the source IP:port on a wireless network firewall 104, wherein the source IP:port on the wireless network firewall 104 contains the firewall IP address 210. The wireless network firewall 104 could forward the response 209 to wireless module IP:port 204.

At step 809, the wireless module 101 can process the response 209 by both (i) decrypting the response 209 using the wireless module private key 112, and (ii) optionally verifying a digital signature of response 209 using the server public key 114. Although not shown in FIG. 8, if the wireless module 101 cannot decrypt the response 209 or verify the digital signature of response 209, then the wireless module 101 can drop the response 209 and optionally send message 208 again. Additional details regarding step 809 are depicted and described in connection with FIG. 9b below. After the wireless module 101 successfully processes response 209, as shown in step 810, the wireless module 101 can sleep the CPU 101b and/or shutdown the radio 101z. Step 810 could comprise the wireless module 101 entering the "radio off" state 505a as described in FIG. 6b and/or entering the "CPU off" state 505b as described in FIG. 6c. Thus, according to a preferred exemplary embodiment, wireless module 101 can omit sending or receiving any further radio resource control messages, such as a radio control message 305, after processing the encrypted and/or signed response 209.

After entering the sleep state in step 810, the wireless module can then periodically check a sleep timer at step 506, and wake from sleep if the timer has expired and report subsequent data from a sensor 101f to a server 105 in step 811.

FIG. 9a

Figure 9A:
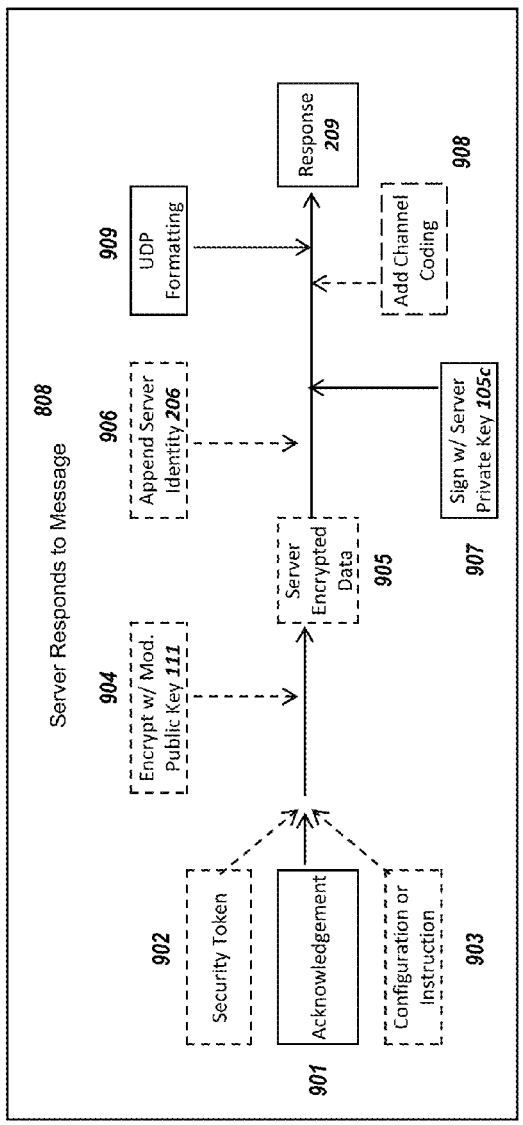
FIG. 9a is a flow chart illustrating exemplary steps for a server to process a response to a message from the wireless module, including sending and signing an acknowledgement, in accordance with exemplary embodiments.

FIG. 9a is a flow chart illustrating exemplary steps for a server to process a response to a message from the wireless module, including sending and signing an acknowledgement, in accordance with exemplary embodiments. Since message 208 and response 209 may traverse the public Internet 107, a wireless module 101 and a server 105 may prefer to take additional steps in order to maintain security of a system 100. Server 105 can process a response 209 to a message 208 from wireless module 101 using a wireless module public key 111 and a server private key 105c, according to a preferred exemplary embodiment. Note that the security methods described herein are optional, and message 208 and response 208 can be sent without the additional security steps described herein, but the use of these security steps may be preferred. FIG. 9a can contain the messages and steps shown within step 808 of FIG. 8, where a server 105 responds to a message 208.

After receiving message 208, server 105 can prepare an acknowledgement 901. The acknowledgement 901 can be a simple text, binary, or hexadecimal string to confirm that message 208 has been received by server 105. Since message 208 may be transmitted via a UDP or UDP Lite packet, wireless module 101 may preferably need a reply message from server 105 containing acknowledgement 901. Alternatively, if TCP is used to transmit message 208, an acknowledgement 901 may be used at the application layer of the Open Systems Interconnection (OSI) model, wherein a simple TCP ACK message may operate at the lower transport layer. In processing a response 209, server 105 may optionally add a security token 902, which could also be a random number, or a randomly generated text, binary, or hexadecimal string. Security token 902 could be a random number or string that is included in response 209 in order to make each response 209 unique and thus avoid any replay attacks when response 209 traverses Internet 107.

In other words, the use of security token 902 can ensure to a high level of certainty that each response 209 will be different and thus the data within response 209 would not be sent more than once. Note that security token 902 may be generated by wireless module 101 in message 208, and in this case server 105 can use the same security token received in message 208. Security token 902 can be generated by server 105 and different than any security token received in message 208. As one example, server 105 could use a first security token received in message 208 to process a second security token 902, according to a pre-agreed algorithm between wireless module 101 and server 105. In any case, security token 902 illustrated in FIG. 9a can be derived or process from using message 208 in accordance with preferred exemplary embodiments.

Server 105 may also optionally add a configuration or instruction 903 when preparing a response 209. The configuration or instruction 903 could be a string that contains instructions or configuration parameters for wireless module 101, such as an order to change state, parameters regarding the monitoring of monitored unit 119, server names or addresses, radio frequency parameters, wireless network 102 authentication parameters or keys, etc. Configuration or instruction 903 may also comprise an instruction to change the state of actuator 101y, a timer value, a sensor threshold value, the threshold for an alarm state, and information for display at a user interface 101j. Configuration or instruction 903 may further comprise an updated wireless module private key 112, and updated server public key 114, or the address or name of a new server 105 added to M2M service provider 108.

In order to control wireless module 101, server 105 would normally need to include configuration or instruction 903 in the response 209 after receiving message 208, since the server 105 would normally not be able to send messages to a wireless module at arbitrary times, such as before a message 208 has been received by the server 105. The reasons are (i) the wireless module would normally be in a sleep or dormant state, including the "radio off" state 505a, where an unsolicited incoming Internet packet from server 105 would not be received by wireless module 101, and (ii) wireless network 102 may frequently include a firewall 104 that would prevent packets from the Internet 107 from reaching wireless module 101 unless wireless module 101 had previously first sent a packet to server 105 within a port-binding timeout period of firewall 104. The port-binding timeout period of a firewall 104 may be a period such as 20-60 seconds for UDP packets and several minutes for TCP packets. Note that configuration or instruction 903 may optionally be omitted, such that some response 209 messages may include configuration or instruction 903, and other response 209 messages may omit configuration or instruction 903, but include an acknowledgement to message 208. Also note that according to the exemplary embodiment described herein, the use of optional strings or steps can be depicted in FIG. 9a and FIG. 9b through the use of dashed lines for the various elements illustrated.

Server 105 may then use as input the acknowledgement 901, security token 902, and configuration or instruction 903 into an encryption algorithm 904. The encryption algorithm 904 can utilize the wireless module public key 111 as an encryption key. The encryption algorithm 904 may be processed according to RSA algorithms, elliptic curve cryptography (ECC) algorithms, or other algorithms for public key cryptography. The use and application of RSA algorithms and cryptography are described within IETF RFC 3447, herein incorporated by reference, among other published standards. The use of an RSA algorithm for encryption and decryption, including with encryption algorithm 914 and other description of encryption or decryption algorithms, can also be processed according to the description of the RSA algorithm according to the Wikipedia entry for "RSA (algorithm)" as of Sep. 9, 2013, which is incorporated by reference herein. The use and application of ECC cryptography and algorithms are described within IETF RFC 6637 (herein incorporated by reference), among other published standards. The use of an ECC algorithm for encryption and decryption, including with encryption algorithm 914 and other description of encryption or decryption algorithms, can also be processed using to the description of the ECC algorithm according to the Wikipedia entry for "Elliptic curve cryptography" as of Sep. 9, 2013, which is incorporated by reference herein. ECC algorithms may utilized according to exemplary preferred embodiments in order to maintain high security with small key lengths, compared to RSA, thereby helping to comparably reduce the message lengths, radio frequency spectrum utilization, and processing power required by wireless module 101. Thus, the use of ECC algorithms within an encryption algorithm 904 may help conserve battery life of wireless module 101 while maintaining the objective of securing system 100. Note that as contemplated herein, other cryptographic algorithms besides ECC and RSA algorithms may be also be used.

The output of encryption algorithm 904, using acknowledgement 901, security token 902, and configuration or instruction 903 as input, can be server encrypted data 905, as illustrated in FIG. 9a. Server encrypted data 905 could be a string or number, including a text, binary, or hexadecimal string or series of numbers or bits, and other possibilities for the formal of server encrypted data 905 exist as well without departing from the scope of the present invention. By using wireless module public key 111 in the encryption algorithm 904, server encrypted data 905 may only be reasonably decrypted by wireless module 101 using wireless module private key 112, as described below in FIG. 9b, and thus the response 209 transmitted across an Internet 107 may be reasonably considered secure.

Server 105 can then process server encrypted data 905 by appending or including server identity 206. Note that server identity 206 can be appended or included after the operation of encryption algorithm 904, since the server identity 206 may optionally be openly readable within a response 209 transmitted or sent to wireless module 101. Additional details on a preferred structure of response 209 are illustrated in FIG. 10 below. By including server identity 206 after encryption algorithm 904, the wireless module can read the server identity 206 and verify a digital signature within response 209 without having to first decrypt data within response 209 using the wireless module private key 112 as described in FIG. 9b below. Note that server identity 206 could alternatively be included within server encrypted data 905, but then a wireless module 101 may not be able to readily verify a digital signature of response 209 if a plurality of different servers 105 with different server private keys 105c are used in system 100. In other words, including server identity 206 after encryption algorithm 904 can be used by wireless module 101 to select the proper server public key 114 when verifying a digital signature of response 209.

Server 105 can then process a server digital signature 907 using the server private key 105c. The server digital signature 907 can be processed according to public key infrastructure (PKI) standards such as the National Institute of Standards (NIST) "FIPS 186-4: Digital Signature Standard" (which is hereby incorporated herein by reference), or IETF RFC 6979 titled "Deterministic Usage of the Digital Signature Algorithm (DSA) and Elliptic Curve Digital Signature Algorithm (ECDSA)" (which is hereby incorporated herein by reference). The use of a server digital signature 907 can be processed according to the description of a digital signature according to the Wikipedia entry for "Digital Signature" as of Sep. 9, 2013, which is incorporated by reference herein in its entirety. Also note that other uses of a digital signature as contemplated within the present invention may refer to the above three references and related standard techniques for processing and creating digital signatures. Other PKI standards for securely generating a server digital signature 907 may be utilized as well. According to a preferred exemplary embodiment, ECC algorithms for generating server digital signature 907 may be utilized in order to minimize the key length compared to RSA algorithms. Server digital signature 907 may comprise a secure hash signature using a hash algorithm such as secure hash algorithm 1 (SHA-1), or subsequent standards such as SHA-2 and SHA-3, and other possibilities exist as well.

Server 105 can then continue processing response 209 by including channel coding 908. Channel coding techniques for channel coding 908 could include block codes and convolution codes. Block codes could include Reed-Solomon, Golay, BCH, Hamming, and turbo codes. According to a preferred exemplary embodiment, channel coding 908 can utilize a turbo code, so that wireless module 101 can correct bit errors received by wireless module 101 in response 209. The use of channel coding 908 can be preferred, since any bit errors received by wireless module 101 within server encrypted data 905 or server digital signature 907 in response 209 could break a decryption or signature verification algorithm used by wireless module 101. Thus, the use of channel coding 908 can ensure the decryption of response 209 is robust to bit errors potentially generated intermediate network links and nodes as response 209 traverses wireless network 102 or Internet 107.

As illustrated in FIG. 9a, server 105 can then add UDP formatting 909 to create response 209. Other options are available as well, including TCP formatting, but UDP formatting may be preferred in order to minimize the number of packets transmitted as well as TCP overhead. Note that TCP overhead when using IPv6 can be significant, since the full series of TCP messages to establish a TCP session and transmit the response 209 after receiving message 208 may include about 4-6 packets where each message includes a TCP header and a full 128 bit address for both the source IP address and the destination IP address. In contrast, UDP may require only a single packet for message 208 and a single packet for response 209, thus significantly reducing the overhead and conserving battery life by reducing the data transmitted and received by wireless module 101. According to a preferred exemplary embodiment, UDP formatting 909 can be formatted according to the UDP Lite protocol (IETF RFC 3828) with IPv6, whereby UDP checksums can be partially disabled and channel coding 908 can be included to correct for bit errors. Note that the UDP Lite protocol may be updated in the future with subsequent standards, but the UDP formatting 909 may preferably continue to include both (i) partially or fully omitted UDP checksums within the packet header and (ii) channel coding within the packet body. Also note that if IPv4 is utilized by wireless module 101 and server 105, regular UDP (i.e. according to RFC 768) formatting may be utilized with channel coding 908 and checksums in the packet header may be disabled.

As illustrated in FIG. 9a, after adding UDP formatting 909, server 105 may record a fully formatted response 209. Response 209 can be sent across the Internet 107 and wireless network 102 to wireless module 101, as illustrated in FIG. 2. Additional details regarding the structure of response 209 after taking the steps in FIG. 9a are shown in FIG. 10 below. The security and efficiency features of response 209 can be useful for wireless module 101 to efficiently balance potentially competing priorities of conserving battery life while maintaining security. As one example, response 209 could include a configuration or instruction 903, and without proper security, wireless module 101 could potentially receive commands or instructions from sources other than server 105, such as hackers. According to a preferred exemplary embodiment, the efficient power management techniques illustrated above in FIG. 6a-6c may optionally include the security techniques described in FIGS. 8-10 in order to offer both a secure and efficient system 100.

FIG. 9b

Figure 9B:
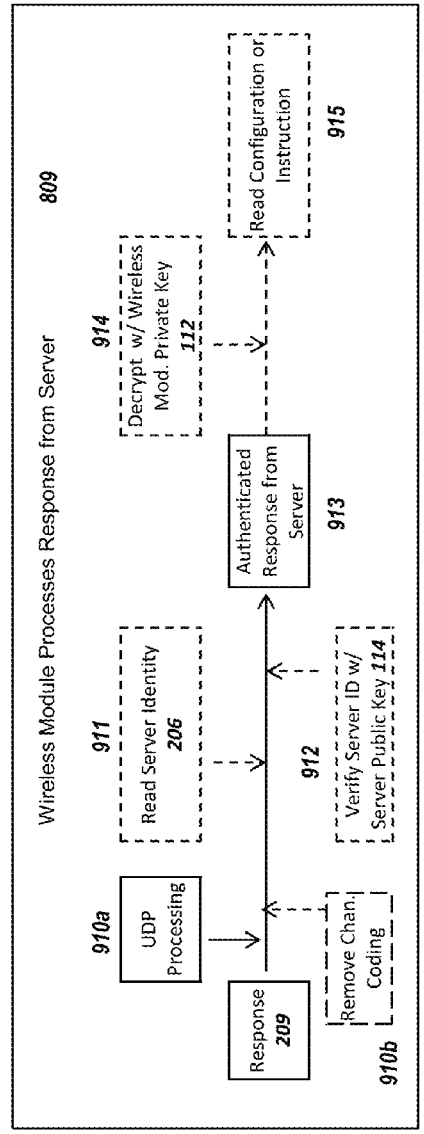
FIG. 9b is a flow chart illustrating exemplary steps for a wireless module to process a response from the server, including verifying a server's identity and decrypting instructions, in accordance with exemplary embodiments.
Figure 10:
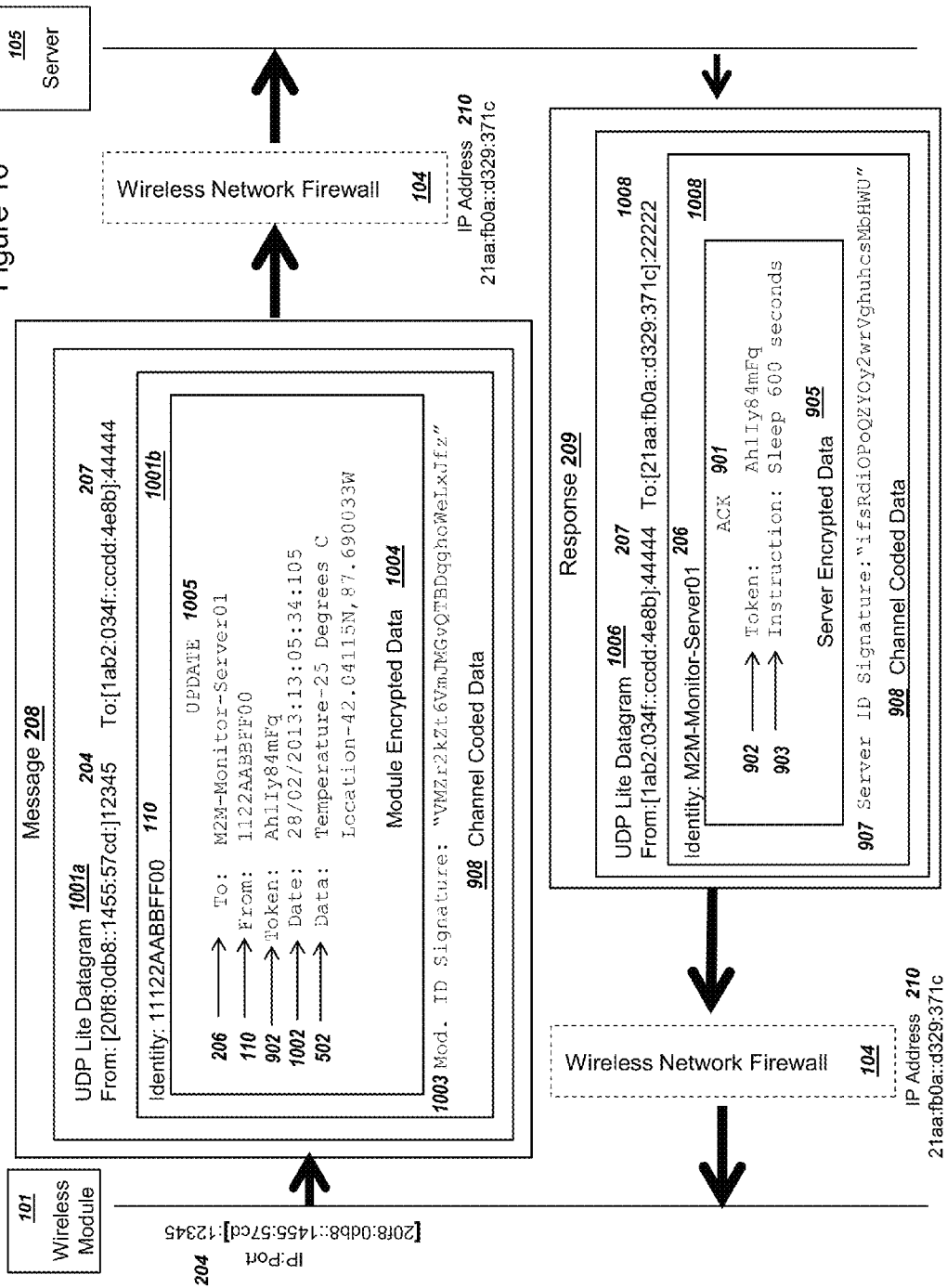
FIG. 10 is a simplified message flow diagram illustrating an exemplary message sent from a wireless module to a server and an exemplary response received by the wireless module, in accordance with exemplary embodiments.

FIG. 9b a is a flow chart illustrating exemplary steps for a wireless module to process a response from the server, including verifying a server's identity and decrypting instructions, in accordance with exemplary embodiments. Wireless module 101 can perform the steps illustrated in FIG. 9b in order to securely and efficiently process a response 209 from server 105. The steps illustrated in FIG. 9b may comprise step 808 illustrated in FIG. 8. Wireless module 101 can receive response 209 using IP:port 204, as illustrated in FIG. 2. Response 209 can be formatted according to the UDP protocol or UDP Lite protocol, although other possibilities exist as well.

At step 910a, wireless module 101 can process the packet using the appropriate transport layer protocol, such as UDP. In this step 910a, the body of the packet comprising response 209 can be extracted, and a checksum, if any, can be calculated to verify the integrity. Note that if the UDP Lite protocol is utilized, the checksum may optionally only apply to the packet header. At step 910b, wireless module 101 can remove channel coding, if present in response 209. Channel coding techniques utilized in step 910b could include block codes and convolution codes, and can use the same algorithms used in channel coding 908. By processing channel coding in step 910b, wireless module 101 can correct potential bit errors received in response 209. As noted above, the use of channel coding 908 can be preferred, since any bit errors received within server encrypted data 905 in response 209 could break (i) a decryption algorithm used by wireless module 101 at step 914, and/or (ii) the verification of server digital signature 907 at step 912.

At step 911, the wireless module can read and record the server identity 206. Server identity 206 may preferably be a string that is external to server encrypted data 905 within response 209, as illustrated in FIG. 10 below. The server identity 206 can preferably match a server identity 206 used in message 208. The server identity 206 could also comprise the source IP address 106 of response 209, or a domain name resolving to the source IP address 106, or a domain name associated with IP address 206. At step 912, wireless module 101 can validate and verify the server identity 206 using the server digital signature 907 inserted by server 105. As described in FIG. 9a above, server digital signature 907 can comprise a secure hash signature, where server 105 generated the hash signature using the server private key 105c. Wireless module 101 can utilize the server public key 114 recorded in memory to securely validate the server digital signature 907.

The server digital signature 907 can be verified according to public key infrastructure (PKI) standards such as the National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". Other PKI standards for securely verifying a server digital signature 907 may be utilized as well. Steps 911 and 912 are not required to utilize the efficient techniques described herein, and may optionally be omitted. As one example, security could be maintained at the network layer through the use of wireless network firewall 104 and server network firewall 124, such that only an inbound response 209 to wireless module 101 could be received from server 105 after wireless module 101 sends message 208. However, the use of steps 911 and 912 may be preferred, such as the case when wireless module provider 109 may not control or know the presence or configuration of any wireless network firewall 104. As one example, if IPv6 is used in system 100 and all IP addresses are publicly routable, then any node on the Internet 107 could potentially send a response 209, and in this case steps 911 and 912 may be preferred. Alternatively, steps 911 and 912 could be omitted, while subsequent steps such as 914 may be used to ensure response 209 was sent by server 105.

After verifying server digital signature 907 in step 912, wireless module 101 can record an authenticated response 913 from server 105. Authenticated response 913 may comprise an acknowledgement that server 105 received message 208. Authenticated response 913 may be useful if the UDP or UDP Lite protocol is used to send message 208, since UDP is a connectionless protocol and wireless module 101 may need confirmation that server 105 received message 208. Note that if steps 911 and 912 are omitted, then authenticated response 913 may comprise a simple acknowledgement that server 105 received message 208. Although not illustrated in FIG. 9b, if wireless module 101 does not receive response 209 or authenticated response 913 before a timer expires, such as within an exemplary duration of 2 seconds, then wireless module 101 can resend message 208.

At step 914, wireless module 101 can decrypt server encrypted data 905 using wireless module private key 112 as a decryption key. Wireless module 101 can utilize a decryption algorithm in order to decrypt the server encrypted data 905. Note that server 105 can utilize wireless module public key 111 to generate server encrypted data 905. Wireless module private key 112 and wireless module public key 111 can be formatted and recorded as digital certificates according to the X.509 v3 standard, or subsequent and related standards and protocols. Other possibilities exist as well for the formal of public and private keys without departing from the scope of the present invention. The decryption algorithm used in step 914 may be processed according to RSA algorithms, elliptic curve cryptography (ECC) algorithms, or other algorithms for public key cryptography. The use and application of RSA algorithms and cryptography are described within IETF RFC 3447, among other published standards. The use and application of ECC cryptography and algorithms are described within IETF RFC 6637, among other published standards. ECC algorithms may be preferred in order to maintain high security with small key lengths, compared to RSA, in order to minimize the message lengths, radio frequency spectrum utilization, and processing power required by wireless module 101. Thus, the use of ECC algorithms within a decryption algorithm at step 914 may help conserve battery life of wireless module 101 while maintaining the objective of securing system 100. Note that server encrypted data 905 may also include a security token 902, which could comprise a random string, and thus each server encrypted data 905 received by wireless module in response 209 may be reasonably considered unique.

As noted in FIG. 9a above, response 209 may include a configuration or instruction 903. By including configuration or instruction 903 in server encrypted data 905 and response 209, the configuration or instruction 903 can be read by wireless device 101 at step 915 after the server encrypted data 905 is decrypted at step 914. Although not illustrated in FIG. 9b, wireless module can subsequently apply the configuration or perform the instruction after step 915. Note that server encrypted data 905 may optionally include an acknowledgement that message 208 was received by server 105. In this manner, an "ACK" response to message 208 can be securely transmitted by server 105 and received by wireless module 101. Upon completion of the processing of response 209 illustrated in FIG. 9b, wireless module 101 can perform functions such entering the sleep or dormant states illustrated at step 810 in FIG. 8, and step 505 in FIG. 5, thus conserving battery life while maintaining a secure, robust, and highly scalable system 100.

FIG. 10

FIG. 10 is a simplified message flow diagram illustrating an exemplary message sent from a wireless module to a server and an exemplary response received by the wireless module, in accordance with exemplary embodiments. FIG. 10 illustrates exemplary details within message 208 sent by wireless module 101 and also response 209 sent by server 105. Message 208 may comprise a UDP Lite datagram 1001a sent from wireless module 101 source IP:port 204 to server 105 destination IP:port 207. Source IP:port 204 and destination IP:port 207 in message 208 may be included within a header in UDP Lite datagram 1001a. Although a UDP Lite datagram 1001a is illustrated in FIG. 10, message 208 could comprise a regular UDP packet, or a TCP datagram. Although a single message 208, response 209, wireless module 101, and server 105 are shown in FIG. 10, system 100 as illustrated in FIG. 2 may comprise a plurality of each of these elements.

UDP Lite Datagram 1001a may include a body 1001b, which can represent the data payload of UDP Lite Datagram 1001a. The data payload of message 208 can preferably include channel coding 908 as described in FIG. 9a above. Although channel coding 908 in FIG. 9a described adding channel coding 908 by a server 105 for a response 209, channel coding 908 could also be added by a wireless module 101 in a message 208. Without UDP Lite formatting, message 208 can be sent by wireless module 101 as a UDP datagram. Note that in this case wireless network 102 and nodes within Internet 107 would likely include channel coding on the data link layers of the OSI stack in order to maintain robustness to bit errors. Note that if message 208 comprises (i) regular UDP formatting (i.e. not UDP Lite or similar variations) within an IPv6 network, or (ii) a UDP format within an IPv4 network with checksums enabled, then channel coding 908 may optionally be omitted.

The body 1001b can include a module identity 110, a module digital signature 1003, module encrypted data 1004, and channel coding 908. Module identity 110 is illustrated in FIG. 10 as external to module encrypted data 1004, although module identity 110 may optionally only be included in module encrypted data 1004, and thus wireless module identity 110 would not be external to module encrypted data 1004 in a body 1001b. By including module identity 110 as external to module encrypted data 1004, server 105 can use the unencrypted module identity 110 in order to select the appropriate wireless module public key 111 to verify module digital signature 1003. Wireless module public key 111 may preferably be recorded in a database 105d, such that server 105 can access a plurality of public keys for a plurality of wireless modules 101. Thus, by including wireless module identity 110 external to module encrypted data 1004, server 105 can utilize the wireless module identity 110 to query a database 105d and select the appropriate wireless module public key 111. If module identity 110 is both (i) within module encrypted data 1004 and (ii) not external to module encrypted data 1004, server 105 can still utilize server private key 105c to, in sequence, decrypt module encrypted data 1004, extract module identity 110 from body 1001b, and then select wireless module public key 111 to verify a module digital signature 1003. Note that if a module identity 1003 is in body 1001b but external to module encrypted data 1004, then module identity 1003 could be obfuscated or otherwise ciphered according to a pre-agreed algorithm with server 105.

The module digital signature 1003 can be calculated using the equivalent steps and algorithms described for a server to create server digital signature 907 in FIG. 9a above. Module digital signature 1003 can be a secure hash string or number, and can be calculated using wireless module private key 112. Server 105 can verify module digital signature 1003 using wireless module public key 111 according to the standard techniques for verifying digital signatures using PKI as described in FIGS. 9a and 9b. Note that module digital signature 1003 can be useful for server 105 to maintain security, since server public key 114 may be shared and potentially other nodes besides wireless module 101 could attempt to send in encrypted data using server public key 114. Thus, server 105 can authenticate message 208 by verifying module digital signature 1003, using steps equivalent to step 912 in FIG. 9b. In addition, although a module digital signature 1003 is included in body 1001b, the module digital signature 1003 may optionally be omitted from instruction 1005 as well. Note that module digital signature 1003 may also optionally be included within module encrypted data 1004, and in this case a server 105 can first utilize a server private key 105c to decrypt module encrypted data 1004 and then verify a module digital signature 1003.

Using a message 209 with a module digital signature 1003 can be both more efficient and overall more secure than digest authentication (such as the digest authentication described in IETF RFC 2069), although using digest-based authentication may be alternatively used. First, the use of a digital signature 1003 requires only a single packet for message 208 and a single packet for response 209 for secure communication between wireless module 101 and server 105. The alternative digest-based authentication would normally require at least 4 packets comprising: (i) message 208, (ii) a challenge to message 208 from server 105 with a security token 902, (iii) a second message from wireless module 101 with a hashed string generated using the challenge and the wireless module private key 112, and then (iv) an acknowledgement from server 105. Thus, digest-based authentication would require approximately twice the time for wireless module 101 to actively transmit data, since two round-trip pair of messages are required with digest-based authentication compared to the single round-trip pair of messages illustrated in FIG. 10. The additional messages with digest-based authentication would thereby drain battery life faster compared to using wireless module digital signature 1003. Second, the use of wireless module digital signature 1003 allows a system 100 to be more highly secured since (i) server 105 may need to be connected to the Public Internet 107 and receive packets from unknown IP addresses, and (ii) by using wireless module digital signature 1003, server 105 can then preferably not respond to incoming packets and messages without a properly signed module digital signature 1003. By server 105 remaining silent to all packets except packets with a properly signed module digital signature 1003, system 100 can thereby remain more secure. In other words, according to preferred exemplary embodiments, server 105 does not send a response 209 to a message 208 that does not include a validated module digital signature 1003, thereby increasing security.

Exemplary energy savings for using module digital signature 1003 compared to digest-based authentication can also be calculated. Round trip time for a packet between wireless module 101 and server 105, including processing at each node, may be an exemplary 250 milliseconds. Since digest authentication may normally require a minimum of 4 packets as described above, then radio 101z must remain active for at least 500 milliseconds with digest-based authentication. Using module digital signature 1003 with the single message 208 and response 209 illustrated in FIG. 10, radio 101z can be active for 250 milliseconds less than with digest based authentication, which would save approximately 0.5 joules of energy, according to the exemplary power graph illustrated in FIG. 4c.

Module encrypted data 1004 can be calculated using the equivalent steps and algorithms described for a server to create server encrypted data 905 in FIG. 9a. Module encrypted data 1004 can encrypted using server public key 114, which results in module encrypted data 1004 only being reasonably decrypted using server private key 105c. Note that encryption by wireless module 101 may optionally be omitted, and the instruction 1005 with corresponding data could be included within a message 208 without encryption. Thus, although a module encrypted data 1004 may preferably be included within a body 1001b, body 1001b may optionally omit module encrypted data 1004 and include data from wireless module 101 that is not encrypted. As one example in this case, instruction 1005 could be included in body 1001b as plaintext. Or, the encryption could be applied through other means, such as a secure tunnel between wireless module 101 and server 105, although setting up and maintaining a secure tunnel and similar or other means of security may require more processing and bandwidth resources than the efficient techniques described herein.

Module encrypted data 1004 can include instruction 1005, a server identity 206, a module identity 110, a security token 902, a timestamp 1002, and sensor data 502. The instruction 1005 can represent the purpose of the message 208 for server 105, and FIG. 10 illustrates an "update" for instruction 1005. An update for instruction 1005 could be used to periodically notify server 105 of regular, periodic sensor data 502 acquired by a sensor 101f. An update for instruction 1005 may also comprise a periodic report regarding monitored unit 119. Other possibilities for instruction 1005 include (i) a query, where wireless module 101 queries server 105 for data from a database 105d, where the data could be associated with monitored unit 119, wireless module provider 109, wireless network 102, or wireless module 101, (ii) a configuration request, where wireless module 101 requests server 105 for configuration parameters or a configuration file, or (iii) an alarm or error instruction, where wireless module 101 detects an alarm or error condition, such as a sensor measurement exceeds a threshold value or another error condition such as loss of contact with monitored unit 119. Instruction 1005 may also comprise information regarding a state, condition, or level for an actuator 101y. Other possibilities for instruction 1005 exist without departing from the scope of the present invention.

Server identity 206 within module encrypted data 1004 can be useful for properly identifying that server 105 is the proper recipient and final destination of message 208. Server identity 206 can be useful if a plurality of servers 105 is utilized by an M2M service provider 108 with potentially hundreds of thousands or millions of wireless modules 101. In this case, with a plurality of servers 105, server private key 105c may represent a private key that is shared among a plurality of servers 105, since otherwise server 105 would not be able to decrypt module encrypted data 1004. Although server identity 206 is illustrated in FIG. 10 and FIG. 2 as belonging to the same server 105, (i) a first server 105 could receive message 208 and decrypt message 208 using the server private key 105c, (ii) server identity 206 could belong to a second server (not shown) different than the first server, and (iii) the first server can forward message 208 to the second server with server identity 206. In this case, the first server can forward message 208 without the encryption both (i) inserted using server public key 114, and (ii) applied to module encrypted data 1004, since the second server may not have access to the server private key 105c.

Module identity 110 within module encrypted data 1004 can represent the identity of wireless module 110. Module identity 110 is described in FIG. 1c and can represent a unique identifier of wireless module 101. Security token 902 within module encrypted data 1004 can represent a random string in order to make message 208 reasonably unique and thus system 100 in FIG. 2 robust against replay attacks. Security token 902 is described in FIG. 9a. Timestamp 1002 can represent a time value that wireless module 101 sends message 208 or a time value that wireless module 101 acquired sensor data 502. Note that multiple timestamps 1002 could be included in message 208, such that a series of measurements from sensor 101f over time are transmitted in a single message 208, and a separate timestamp 1002 is included for each sensor measurement. Sensor data 502 is described in FIG. 5 and represents data wireless module 101 acquires using sensor 101f. Sensor data 502 within message 208 may be stored by server 105 in a database 105d. Although not illustrated in FIG. 10, body 1001b or module encrypted data 1004 may also include an identity of monitored unit 119, which may be associated with sensor data 502. For example, wireless module 101 could collect sensor data for a plurality of monitored units 119, and in this case message 208 would preferably include an identity of monitored unit 119 associated with the sensor data 502.

FIG. 10 also illustrates exemplary details within response 209 sent by server 105. Response 209 may comprise a UDP Lite datagram 1006 sent from server 105 IP:port 207 to IP:port 1007, wherein the IP address within IP:port 1007 is the IP address 210, and wherein IP address 210 represents the external IP address of wireless network firewall 104. Thus, IP:port 1007 may be different than IP:port 204, since the presence of a wireless network firewall 104 may perform NAT routing, which could change the source IP address and source port number from IP:port 204 to IP:port 1007 in message 208, as received by server 105. The use of wireless network firewall 104 in wireless network 102 may require that response 209 be sent from IP:port 207 to IP:port 1007 in order to be properly processed by firewall 104 and forwarded to wireless module 101 at IP:port 204. Source IP:port 207 and destination IP:port 1007 in response 209 may be included within a header in UDP Lite datagram 1006. Although a UDP Lite datagram 1006 is illustrated in FIG. 10, response 209 could comprise a regular UDP packet, or a TCP datagram, or similar protocols supported by an Internet 107.

UDP, TCP, or UDP Lite datagram 1006 within response 209 may include a body 1008. Body 1008 may comprise the payload or data within a UDP or UDP Lite datagram 1006. Body 1008 can include a server identity 206, a server digital signature 907, server encrypted data 905, and channel coding 908. Server identity 206 is illustrated in FIG. 10 as external to server encrypted data 905 within body 1008, but server identity 206 may optionally be only included in server encrypted data 907. By including server identity 206 as external to server encrypted data 905, wireless module 101 can use the unencrypted server identity 206 in order to select the appropriate server public key 114 to decrypt server encrypted data 905. Server digital signature 907 in body 1008 can comprise a secure hash signature of body 1008, as depicted and described in connection with FIG. 9a above. In this manner, wireless module 101 can utilize server digital signature 907 to authenticate that response 209 was sent by server 105. Channel coding 908 in body 1008 is also depicted and described in connection with FIG. 9a above, and channel coding 908 can be utilized by wireless module 101 to correct any potential bit errors propagated in body 1008 as response 209 traverses the Internet 107 and wireless network 102. As noted above in FIG. 9a, any uncorrected bit errors in body 1008 may break the ability of wireless module 101 to decrypt server encrypted data 905 or server digital signature 907.

Body 1008 may include server encrypted data 905. Server encrypted data 905 is depicted and described in connection with FIG. 9a above. Server encrypted data 905 may include an acknowledgement 901, wherein acknowledgement 901 can notify wireless module 101 that message 208 has been received by server 105. As illustrated in FIG. 10, server encrypted data 905 may optionally also include a configuration or instruction 903 for wireless module 101. The configuration or instruction 903 could be a string that contains instructions or configuration parameters for wireless module 101, such as an order to change state, parameters regarding the monitoring of monitored unit 119, server names or addresses, radio frequency parameters, timer values, settings for actuator 101y, etc. The exemplary configuration or instruction 903 illustrated in FIG. 10 comprises an instruction for wireless module to enter a sleep state for 600 seconds. Other possibilities for a configuration or instruction within a response 209 are possible as well without departing from the scope of the present invention. Also, although a server encrypted data 905 may preferably be included within a body 1008, body 1008 may optionally omit server encrypted data 905 and include data from server 105 that is not encrypted. As one example in this case, acknowledgement 901 could be included in body 1008 as plaintext. In addition, although a server digital signature 907 is included in body 1008 and external to server encrypted data 905, the server digital signature 907 may (i) optionally be omitted as well, or (ii) included within server encrypted data 905.

Acknowledgement 901 within server encrypted data 905 may include a security token 902. Security token 902 may be a random string and may also be generated by either server 105 or wireless module 101. If security token 902 is generated by wireless module 101, then security token 902 may be included in message 208 as illustrated in FIG. 10. By including security token 902 in acknowledgement 901, system 100 can be made robust to replay attacks since each response 209 can be reasonably unique for each response 209 sent by server 105.

Conclusion

Various exemplary embodiments have been described above. Those skilled in the art will understand, however, that changes and modifications may be made to those examples without departing from the scope of the claims.

What is claimed is:

1. A system for supporting machine-to-machine communications, the system comprising:
a wireless module for changing a processor between a sleep state and an active state, for changing a radio between a radio off state and a connected state, for recording a private key and a wireless module identity in a memory, and for sending a message comprising an Internet Protocol (IP) packet and receiving a response, wherein the message includes (i) a module digital signature processed using the private key, (ii) a sensor measurement, and (iii) the wireless module identity, wherein the wireless module, in sequence, (a) changes the processor from the sleep state to the active state, (b) changes the radio from the radio off state to the connected state, (c) sends the message and receives the response, wherein, after the wireless module receives the response, the wireless module (d) sends a detach message before receiving a radio bearer reconfiguration message and a radio resource control connection release, and then (e) changes the radio to the radio off state and the processor to the sleep state, and wherein the wireless module sends the detach message (x) while the wireless module comprises a 4G radio resource control connected (RRC_CONNECTED) state and (y) before the wireless module utilizes a discontinuous reception (DRX) state.

2. The system of claim 1, wherein the message comprises a first user datagram protocol (UDP) datagram sent to an IP address and port (IP:port) number, wherein the response comprises a second UDP datagram from the IP:port number, and wherein the wireless module sends a single UDP datagram between (i) changing the radio to the connected state and (ii) changing the radio to the off state.

3. The system of claim 2, wherein the message comprises a UDP Lite datagram, and wherein the message includes a channel coding.

4. The system of claim 1, wherein the wireless module comprises a mobile device and includes a battery and a sensor, and wherein the wireless module uses a sleep timer to change the processor from the sleep state to the active state (i) in order to record data from the sensor and (ii) without any user input.

5. The system of claim 1, wherein the wireless module sends the detach message before sending a radio control message after receiving the response.

6. The system of claim 1, wherein the sleep state of the processor comprises at least one of (i) a dormant state where a first power level used by all cores in the processor is less than 0.01 milliwatts during a period of at least one second, and (ii) a shutdown state where a second power level used by the processor is less than 0.002 milliwatt during the period of at least one second.

7. The system of claim 6, wherein the dormant state of the processor comprises a random access memory (RAM) in the processor continuing to record data, and wherein the shutdown state of the processor comprises the RAM being flushed.

8. The system of claim 1, wherein the wireless module includes a public key associated with a server, wherein the message includes a module encrypted data, wherein the module encrypted data includes the sensor measurement, and wherein the wireless module uses the public key to encrypt the module encrypted data.

9. The system of claim 8, wherein the public key includes an elliptic curve cryptography (ECC) algorithm.

10. The system of claim 1, wherein the module digital signature comprises a hash string, wherein the wireless module processes the hash string using the private key, wherein the message includes a body, wherein the body includes the wireless module identity and a module encrypted data, and wherein the module encrypted data includes the sensor measurement.

11. The system of claim 10, wherein a server sends the response to the message, wherein the response includes a server encrypted data, wherein the server utilizes a wireless module public key to process the server encrypted data, and wherein the wireless module sends the detach message after the wireless module decrypts the server encrypted data using the private key.

12. The system of claim 1, wherein a server includes a server private key, wherein the response sent by the server includes a server digital signature, and wherein the wireless module uses the server public key to process the server digital signature.

13. The system of claim 1, wherein the radio off state comprises the radio operating at a sufficiently low power where at least two of (i) a layer 1 message received at an antenna of the wireless module is not processed by a baseband processing unit, (ii) a base transceiver station beacon is not monitored by the wireless module, (iii) power to a radio frequency power amplifier is reduced below an operating threshold value, and (iv) the radio does not utilize a discontinuous receive (DRX) timer.

14. A system for reporting a sensor measurement, the system comprising:
a wireless module for changing a radio in the wireless module between a radio off state and a connected state, for recording a key in a memory, and for sending a message comprising an Internet Protocol (IP) packet and receiving a response to the message, wherein the message includes a module identity and a module encrypted data encrypted using the key, wherein the module encrypted data includes the sensor measurement, wherein the wireless module, in sequence, (i) changes the radio to the connected state from the radio off state, (ii) sends the message and receives the response, wherein after the wireless module receives the response, the wireless module (iii) changes the radio to the radio off state from the connected state before receiving (a) a radio bearer reconfiguration message, and (b) a radio resource control connection release, and wherein the wireless module changes the radio from the connected state to the radio off state (x) after the wireless module enters a 4G Long Term Evolution (LTE) radio resource control connected (RRC_CONNECTED) state and (y) before the wireless module utilizes a discontinuous reception (DRX) state.

15. The system of claim 14, wherein, after receiving the response, the wireless module changes the radio to the radio off state from the connected state before sending a radio control message.

16. The system of claim 14, wherein the message comprises a first user datagram protocol (UDP) datagram sent to an IP address and port (IP:port) number, wherein the response comprises a second UDP message from the IP:port number, and wherein the wireless module sends a single UDP datagram between (i) changing the radio to the connected state and (ii) changing the radio to the off state.

17. The system of claim 16, wherein the message comprises a UDP Lite datagram, and wherein the message includes a channel coding.

18. The system of claim 14, wherein the wireless module comprises a mobile device and includes a battery and a sensor, wherein the message includes data from the sensor, and wherein wireless module uses a sleep timer to change the radio from the radio off state to the connected state.

19. The system of claim 14, wherein the wireless module includes a wireless module private key, wherein the message includes a module digital signature, and wherein the wireless module uses the wireless module private key to process the module digital signature.

20. The system of claim 14, wherein the key comprises a public key associated with a server, wherein the module encrypted data includes a security token, and wherein the message includes a module digital signature, and wherein the public key includes an elliptic curve cryptography (ECC) algorithm.

21. The system of claim 14, wherein the message includes a module digital signature, wherein the module digital signature comprises a hash string, wherein the wireless module processes the hash string using the wireless module private key, wherein the private key includes an elliptic curve cryptography (ECC) algorithm.

22. The system of claim 14, wherein a server sends the response, wherein the response includes a server encrypted data, wherein the server utilizes a wireless module public key to process the server encrypted data, and wherein the wireless module changes the radio from the connected state to the radio off state after the wireless module decrypts the server encrypted data using a wireless module private key.

23. The system of claim 22, wherein the server encrypted data includes a server digital signature and an instruction for the wireless module, and wherein the wireless module processes the instruction after verifying the server digital signature with a server public key.

24. The system of claim 14, wherein a server includes a server private key, wherein the response sent by the server includes a server digital signature, and wherein the wireless module uses a server public key to process the server digital signature.

25. The system of claim 14, wherein the radio off state comprises the radio operating at a sufficiently low power where at least one of (i) a layer 1 message received at an antenna of the wireless module is not processed by a baseband processing unit, (ii) a base transceiver station beacon is not monitored by the wireless module, (iii) power to a radio frequency power amplifier is reduced below an operating threshold value, and (iv) the radio does not utilize a discontinuous receive (DRX) timer.

26. The system of claim 25, wherein the radio off state further comprises the radio using a lower power than both (i) a radio resource control idle (RRC_IDLE) state and a (ii) 3G idle state, and wherein the radio off state has a duration of at least 60 seconds.

27. The system of claim 14, wherein the radio off state comprises powering down at least two of (i) a power amplifier, (ii) a baseband processing unit, (iii) a radio modem, and (iv) a radio.

28. The system of claim 14, wherein the radio changes from the connected state to the radio off state after receiving the response and before the radio enters a radio resource connected idle state (RRC_IDLE).

29. The system of claim 14, wherein the connected state comprises the wireless module in the RRC_Connected state.

30. A method for supporting machine-to-machine communications, the method comprising a wireless module, in sequence:
reading a public key, an address, and a wireless module private key from a nonvolatile memory;
changing a radio in the wireless module from a radio off state to a connected state, wherein the radio off state comprises the radio not utilizing a discontinuous receiver (DRX) timer;
sending a message to the address, wherein the message comprises a user datagram protocol (UDP) packet, wherein the UDP packet includes (i) a module encrypted data processed using the public key, and (ii) a module digital signature processed using the wireless module private key, and wherein the module encrypted data includes a sensor measurement;
receiving a response to the message, and;
sending a detach message before (i) receiving a radio bearer reconfiguration message after receiving the response, and (ii) receiving a radio resource control connection release after receiving the response.

31. The method of claim 30, wherein the connected state for the radio comprises the wireless module in one of a RRC_Connected state, a Cell_DCH state, a FACH state, and a GRPS ready state.

32. The method of claim 30, after sending the detach message the wireless module changes the radio to the radio off state, and wherein the radio off state comprises powering down at least two of (i) a power amplifier, (ii) a baseband processing unit, (iii) a radio modem, or (iv) the radio.

33. The method of claim 32, wherein the radio off state further comprises the radio using a lower power than both (i) a radio resource control idle (RRC_IDLE) state and a (ii) 3G idle state, and wherein the radio off state has a duration of at least 60 seconds.

34. The method of claim 30, wherein the wireless module sends the detach message after receiving the response and before the radio enters at least one of (i) a radio resource connected idle state (RRC_IDLE), (ii) a 3G idle state, and (iii) a GPRS idle state.

35. The method of claim 30, wherein the message comprises a first user datagram protocol (UDP) datagram sent to an IP address and port (IP:port) number, wherein the response comprises a second UDP message from the IP:port number, and wherein the wireless module sends a single UDP datagram between (i) changing the radio to the connected state and (ii) changing the radio to the off state.

36. The method of claim 30, wherein the message comprises a UDP Lite datagram, and wherein the message includes a channel coding.

37. The method of claim 30, wherein the wireless module comprises a mobile device and includes a battery and a sensor, and wherein the wireless module uses a sleep timer to change the radio from the radio off state to the connected state.

38. The method of claim 30, wherein the wireless module sends the detach message (i) while the wireless module comprises a 3G dedicated channel (3G DCH) state, and (ii) before the wireless module utilizes a 3G forward access channel (3G FACH) state.

39. The method of claim 30, wherein the wireless module sends the detach message (i) while the wireless module comprises a radio resource control connected (RRC_CONNECTED) state and (ii) before the wireless module utilizes a discontinuous reception (DRX) state.

40. The method of claim 30, wherein the module digital signature comprises a hash string, wherein the wireless module processes the hash string using the wireless module private key, wherein the message includes a body, wherein the body includes a wireless module identity.

41. The method of claim 30, wherein the public key includes an elliptic curve cryptography (ECC) algorithm.

42. The method of claim 30, wherein a server includes a wireless module public key, and wherein the server (i) processes the module digital signature using the wireless module public key and (i) decrypts the module encrypted data using a server private key.

43. The method of claim 42, wherein the server sends the response, wherein the response includes a server encrypted data, wherein the server utilizes the wireless module public key to process the server encrypted data, and wherein the wireless module changes the radio from the connected state to the radio off state after the wireless module decrypts the server encrypted data using the wireless module private key.

44. The method of claim 30, wherein a server includes a server private key, wherein the response sent by the server includes a server digital signature, and wherein the wireless module uses a server public key to process the server digital signature.

* * * * *